(12) United States Patent
Amin et al.

(10) Patent No.: US 11,378,719 B2
(45) Date of Patent: Jul. 5, 2022

(54) OPTICAL FILM STRUCTURES AND ARTICLES FOR HIDDEN DISPLAYS AND DISPLAY DEVICES

(71) Applicant: Corning Incorporated, Corning, NY (US)

(72) Inventors: Jaymin Amin, Corning, NY (US); Shandon Dee Hart, Elmira, NY (US); Karl William Koch, III, Elmira, NY (US); Carlo Anthony Kosik Williams, Painted Post, NY (US); Thien An Thi Nguyen, Mountain View, CA (US)

(73) Assignee: Corning Incorprated, Corning, NY (US)

( * ) Notice: Subject to any disclaimer, the term of this patent is extended or adjusted under 35 U.S.C. 154(b) by 92 days.

(21) Appl. No.: 17/004,562

(22) Filed: Aug. 27, 2020

(65) Prior Publication Data

US 2021/0063607 A1 Mar. 4, 2021

Related U.S. Application Data

(60) Provisional application No. 62/892,255, filed on Aug. 27, 2019.

(51) Int. Cl.
*G02F 1/13357* (2006.01)
*G02B 1/00* (2006.01)
*G02F 1/1335* (2006.01)

(52) U.S. Cl.
CPC ......... *G02B 1/007* (2013.01); *G02F 1/13362* (2013.01); *G02F 1/133502* (2013.01); *G09G 2320/068* (2013.01); *G09G 2358/00* (2013.01)

(58) Field of Classification Search
CPC ........ G02B 1/007; G02B 1/14; G02B 5/3041; G02B 5/30; G02B 5/3025;

(Continued)

(56) References Cited

U.S. PATENT DOCUMENTS 8,312,739 B2   11/2012   Lee et al.
8,503,122 B2   8/2013    Liu et al.
(Continued)

FOREIGN PATENT DOCUMENTS

JP   2012-517617 A   8/2012
WO   2019/046762 A1   3/2019

OTHER PUBLICATIONS

Charles Kittel, Introduction to Solid State Physics, seventh edition, John Wiley & Sons, Inc., NY, 1996, pp. 611-627.

(Continued)

*Primary Examiner* — Michael H Caley
*Assistant Examiner* — Jonathan Y Jung
(74) *Attorney, Agent, or Firm* — William J. Tucker

(57) ABSTRACT

An article is described herein that includes: a translucent substrate comprising opposing major surfaces; and an optical film structure disposed on a first major surface of the substrate, the optical film structure comprising an outer surface and a plurality of periods such that each period comprises an alternating low refractive index layer and high refractive index layer. The article exhibits a hardness of 10 GPa or greater measured at an indentation depth of about 100 nm by a Berkovich Indenter Hardness Test. Further, the article exhibits a single side average photopic light reflectance of at least 50% of non-polarized light as measured at the outer surface from near-normal incidence to an incident angle of 60 degrees over a portion of at least 10 nm within the visible spectrum. In addition, each low refractive index layer comprises $SiO_2$ or doped-$SiO_2$ and each high refractive index layer comprises $AlO_xN_y$, $SiO_xN_y$, $Si_uAl_vO_xN_y$, $SiN_x$ or $ZrO_2$.

20 Claims, 18 Drawing Sheets

(58) Field of Classification Search
CPC .......... G09G 2320/068; G09G 2358/00; G02F
1/133502; B29D 11/00865; C03C
17/3435; C03C 2217/91
See application file for complete search history.

(56) References Cited

U.S. PATENT DOCUMENTS

| | | |
|---|---|---|
| 8,561,429 B2 | 10/2013 | Allan et al. |
| 10,162,084 B2 | 12/2018 | Hart et al. |
| 2003/0223118 A1* | 12/2003 | Sakamoto ............ G02B 5/3025 359/489.17 |
| 2008/0247044 A1* | 10/2008 | Kuwabara ............ G02B 5/0891 359/838 |
| 2010/0201242 A1 | 8/2010 | Liu et al. |
| 2014/0113083 A1 | 4/2014 | Lee et al. |
| 2016/0333526 A1* | 11/2016 | MacPherson ........ B42D 25/324 |
| 2018/0011225 A1* | 1/2018 | Bellman ............... C23C 14/081 |
| 2020/0158931 A1* | 5/2020 | Guo .......................... B32B 7/02 |

OTHER PUBLICATIONS

Invitation to Pay Additional Fees; PCT/US2020/046587; dated Nov. 27, 2020; 15 Pages; European Patent Office.

James F. Shackelford, Introduction to Materials Science for Engineers, Sixth Edition, Pearson Prentice Hall, New Jersey, 2005, pp. 404-418.

Oliver et al., "An improved technique for determining hardness and elastic modulus using load and displacement sensing indentation experiments". J. Mater. Res., vol. 7, No. 6, 1992, pp. 1564-1583.

Oliver et al., "Measurement of hardness and elastic modulus by instrumented indentation: Advances in understanding and refinements to methodology." J. Maler. Res. 2004,19, pp. 3-20.

Smart and Moore, "Solid State Chemistry, An introduction", Chapman & Hall University and Professional Division, London, 1992, pp. 136-151.

\* cited by examiner

OPTICAL FILM STRUCTURES AND ARTICLES FOR HIDDEN DISPLAYS AND DISPLAY DEVICES

CLAIM OF PRIORITY

This application claims the benefit of priority under 35 U.S.C. § 119 of U.S. Provisional Application No. 62/892,255, filed on Aug. 27, 2019, the content of which is incorporated herein by reference in its entirety.

FIELD

The disclosure relates to durable optical structures and articles for hidden displays and hidden display devices, including such articles and structures with a combination of mechanical properties and visible reflectance and transmittance properties suitable for hidden display applications, such as privacy screens and dead-front displays.

BACKGROUND

Cover articles are often used to protect devices within electronic products, to provide a user interface for input and/or display, and/or for many other functions. Such products include mobile devices, for example, smart phones, smart watches, mp3 players and computer tablets. Cover articles also include architectural articles, transportation articles (e.g., interior and exterior display and non-display articles used in automotive applications, trains, aircraft, sea craft, etc.), appliance articles, or any article that may benefit from some transparency, scratch-resistance, abrasion resistance or a combination thereof. These applications often demand scratch-resistance and strong optical performance characteristics, in terms of maximum light transmittance and minimum reflectance.

The optical performance of cover articles can be improved by using various anti-reflective coatings; however, known anti-reflective coatings are susceptible to wear or abrasion. Such abrasion can compromise any optical performance improvements achieved by the anti-reflective coating. For example, optical filters are often made from multi-layer coatings having differing refractive indices and made from optically transparent dielectric material (e.g., oxides, nitrides, and fluorides). Most of the typical oxides used for such optical filters are wide band-gap materials, which do not have the requisite mechanical properties, for example, hardness, for use in mobile devices, architectural articles, transportation articles or appliance articles. Most nitrides and diamond-like coatings may exhibit high hardness values, which can be correlated to improved abrasion resistance, but such materials do not exhibit the desired transmittance for such applications.

Abrasion damage can include reciprocating sliding contact from counter face objects (e.g., fingers). In addition, abrasion damage can generate heat, which can degrade chemical bonds in the film materials and cause flaking and other types of damage to the cover glass. Since abrasion damage is often experienced over a longer term than the single events that cause scratches, the coating materials disposed experiencing abrasion damage can also oxidize, which further degrades the durability of the coating.

While these cover articles generally require suitable mechanical properties (e.g., high hardness) and optical performance (e.g., high transmittance and low reflectance), hidden display applications require additional, optical properties. For example, some of the cover articles in these display applications include privacy displays that are hidden from viewers looking at the display at high angles when the display is on. These viewers could be sitting or standing to the left or right side of the primary user of the display, such as adjacent passengers on a train, airplane or bus. In contrast, the primary user views the display at or close to normal incidence. Other hidden display applications include aesthetic or dead-front displays that are hidden by appearing to blend in with surroundings, thus creating a desirable aesthetic effect, particularly when the display is turned off. Examples of these displays include a colored rear side of a smartphone, which appears to be as a simple colored metal or glass when the display is turned off, but the display then appears when the display is turned on. Similarly, in auto interior applications, dead-front displays are desired in which the display surface might appear metallic when the display is turned off (e.g., to match surrounding materials and surfaces), but the display then appears when the display is turned on.

Accordingly, there is a need for durable optical film structures and articles that offer a combination of mechanical properties and visible reflectance and transmittance properties that are suitable for hidden display applications.

SUMMARY

According to some embodiments of the disclosure, an article for a display device is provided that includes: a translucent substrate comprising opposing major surfaces; and an optical film structure disposed on a first major surface of the substrate, the optical film structure comprising an outer surface opposing the first major surface and a plurality of periods such that each period comprises an alternating low refractive index layer and high refractive index layer. Each high refractive index layer has a refractive index of greater than 1.9 and each low refractive index layer has a refractive index of less than 1.7. The article exhibits a hardness of 10 GPa or greater measured at an indentation depth of about 100 nm, the hardness measured by a Berkovich Indenter Hardness Test. Further, the article exhibits a single side average photopic light reflectance of at least 50% of non-polarized light as measured at the outer surface from near-normal incidence to an incident angle of 60 degrees over a portion of at least 10 nm within visible spectrum from 400 nm to 700 nm. The article further exhibits a single side average photopic reflectance of greater than 30% of s-polarized light emitted from the display device at incident angles from 40 degrees to 60 degrees over a portion of at least 10 nm within the visible spectrum from 400 nm to 700 nm. The plurality of periods is at least five (5) periods. In addition, each low refractive index layer comprises $SiO_2$ or doped-$SiO_2$ and each high refractive index layer comprises $AlO_xN_y$, $SiO_xN_y$, $Si_uAl_vO_xN_y$, $SiN_x$ or $ZrO_2$.

According to some embodiments of the disclosure, an article for a display device is provided that includes: a translucent substrate comprising opposing major surfaces; and an optical film structure disposed on a first major surface of the substrate, the optical film structure comprising an outer surface opposing the first major surface and a plurality of periods such that each period comprises an alternating low refractive index layer and high refractive index layer. Each high refractive index layer has a refractive index of greater than 1.9 and each low refractive index layer has a refractive index of less than 1.7. The article exhibits a hardness of 10 GPa or greater measured at an indentation depth of about 100 nm, the hardness measured by a Berkovich Indenter Hardness Test. The article exhibits a single side average photopic light reflectance of at least 50% of non-polarized light as measured at the outer surface from near-normal incidence to an incident angle of 60 degrees over a plurality of portions of the visible spectrum from 400 nm to 700 nm, wherein each portion is at least 10 nm in width. The article further exhibits a single side average photopic reflectance of greater than 30% of s-polarized light emitted from the display device at incident angles from 40 degrees to 60 degrees over a plurality of portions of the visible spectrum from 400 nm to 700 nm, wherein each portion is at least 10 nm in width. The plurality of periods is at least ten (10) periods. In addition, each low refractive index layer comprises $SiO_2$ or doped-$SiO_2$ and each high refractive index layer comprises $AlO_xN_y$, $SiO_xN_y$, $Si_uAl_vO_xN_y$, $SiN_x$ or $ZrO_2$.

According to some embodiments of the disclosure, an article for a display device is provided that includes: a translucent substrate comprising opposing major surfaces; and an optical film structure disposed on a first major surface of the substrate, the optical film structure comprising an outer surface opposing the first major surface and a plurality of periods such that each period comprises an alternating low refractive index layer and high refractive index layer. Each high refractive index layer has a refractive index of greater than 1.9 and each low refractive index layer has a refractive index of less than 1.7. The article exhibits a hardness of 10 GPa or greater measured at an indentation depth of about 100 nm, the hardness measured by a Berkovich Indenter Hardness Test. Further, the article exhibits a single side average photopic light reflectance of greater than 12% of non-polarized light as measured at the outer surface from near-normal incidence to an incident angle of 90 degrees over the visible spectrum from 400 nm to 700 nm. The article further exhibits a single side average photopic transmittance of greater than 80% of p-polarized light emitted from the display device at incident angles from 0 degrees to 90 degrees over the visible spectrum from 400 nm to 700 nm. The plurality of periods is at least three (3) periods. In addition, each low refractive index layer comprises $SiO_2$ or doped-$SiO_2$ and each high refractive index layer comprises $AlO_xN_y$, $SiO_xN_y$, $Si_uAl_vO_xN_y$, $SiN_x$ or $ZrO_2$.

According to some embodiments of the disclosure, an article for a display device is provided that includes: a translucent substrate comprising opposing major surfaces; and an optical film structure disposed on a first major surface of the substrate, the optical film structure comprising an outer surface opposing the first major surface and a plurality of periods such that each period comprises an alternating low refractive index layer and high refractive index layer. Each high refractive index layer has a refractive index of greater than 1.9 and each low refractive index layer has a refractive index of less than 1.7. The article exhibits a hardness of 10 GPa or greater measured at an indentation depth of about 100 nm, the hardness measured by a Berkovich Indenter Hardness Test. The article exhibits a single side average photopic light reflectance of greater than 20% of non-polarized light as measured at the outer surface from near-normal incidence to an incident angle of 90 degrees over the visible spectrum from 400 nm to 700 nm. The article further exhibits a single side average photopic transmittance of greater than 50% of p-polarized light emitted from the display device at incident angles from 0 degrees to 90 degrees over the visible spectrum from 400 nm to 700 nm. The plurality of periods is at least five (5) periods. Further, each low refractive index layer comprises $SiO_2$ or doped-$SiO_2$ and each high refractive index layer comprises $AlO_xN_y$, $SiO_xN_y$, $Si_uAl_vO_xN_y$, $SiN_x$ or $ZrO_2$.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims.

The accompanying drawings are included to provide a further understanding, and are incorporated in and constitute a part of this specification. The drawings illustrate one or more embodiment(s) and, together with the description, serve to explain, by way of example, principles and operation of the disclosure. It is to be understood that various features of the disclosure disclosed in this specification and in the drawings can be used in any and all combinations. By way of non-limiting examples, the various features of the disclosure may be combined with one another according to the following embodiments.

BRIEF DESCRIPTION OF THE DRAWINGS

These and other features, aspects and advantages of the present disclosure are better understood when the following detailed description of the disclosure is read with reference to the accompanying drawings, in which.

DETAILED DESCRIPTION

Figure 1:
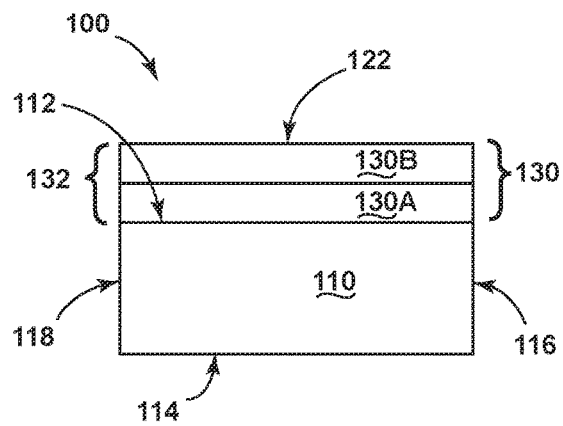
FIG. 1 is a side view of an article for a display device, according to one or more embodiments.

In the following detailed description, for purposes of explanation and not limitation, example embodiments disclosing specific details are set forth to provide a thorough understanding of various principles of the present disclosure. However, it will be apparent to one having ordinary skill in the art, having had the benefit of the present disclosure, that the present disclosure may be practiced in other embodiments that depart from the specific details disclosed herein. Moreover, descriptions of well-known devices, methods and materials may be omitted so as not to obscure the description of various principles of the present disclosure. Finally, wherever applicable, like reference numerals refer to like elements.

Ranges can be expressed herein as from "about" one particular value, and/or to "about" another particular value. As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, for example, within about 5% of each other, or within about 2% of each other.

Directional terms as used herein—for example, up, down, right, left, front, back, top, bottom—are made only with reference to the figures as drawn and are not intended to imply absolute orientation.

Unless otherwise expressly stated, it is in no way intended that any method set forth herein be construed as requiring that its steps be performed in a specific order. Accordingly, where a method claim does not actually recite an order to be followed by its steps, or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

As used herein, the singular forms "a," "an" and "the" include plural referents unless the context clearly dictates otherwise. Thus, for example, reference to a "component" includes embodiments having two or more such components, unless the context clearly indicates otherwise.

As used herein, the term "dispose" includes coating, depositing and/or forming a material onto a surface. The disposed material may constitute a layer, as defined herein. The phrase "disposed on" includes the instance of forming a material onto a surface such that the material is in direct contact with the surface and also includes the instance where the material is formed on a surface, with one or more intervening material(s) between the disposed material and the surface. The intervening material(s) may constitute a layer, as defined herein.

Embodiments of the disclosure relate to articles and optical film structures that exhibit a combination of mechanical and optical properties suitable to enable various hidden display applications. Embodiments of these articles possess multi-layer optical film structures that exhibit hardness (e.g., >10 GPa hardness according to a Berkovich Indenter Hardness Test), abrasion resistance and optical properties associated with the hidden display applications for these articles (e.g., privacy screens, dead-front displays, etc.). These multi-layer optical film structures can include a plurality of periods such that each period comprises an alternating low refractive index (low RI) layer and a high refractive index (high RI) layer. In some aspects, the low RI layer comprises $SiO_2$ or doped-$SiO_2$ and each high RI layer comprises $AlO_xN_y$, $SiO_xN_y$, $SiN_x$ or $ZrO_2$.

Some of these optical film structures exhibit one or more of the following optical property characteristics to enable these hidden display applications: (a) a high-reflectance band and a low-reflectance band within the visible spectrum and high coloration; (b) multiple high-reflectance bands and multiple low-reflectance bands within the visible spectrum and medium color; and (c) a single broad reflectance band with low coloration. Display system configurations that can employ optical film structures (a) and (b) may include a display with a linearly polarized light output. In these configurations, the linear polarization is oriented vertically with respect to a primary viewer viewing the display at normal incidence such that s-polarized light is transmitted and/or reflected to the left and right of the primary view, as in a privacy application. That is, in these applications, it is desirable for a viewer normal incidence (i.e., at ~0 degrees incidence) to see the display, but it is not desirable for viewers to the right and left of the display to see the display. Other display configurations that can employ optical film structures (c) may also include a display with a linearly polarized light output. The linear polarization is oriented horizontally with respect to the display normal, such that p-polarized light is transmitted and/or reflected to the left and right of the display normal and may preferably be viewed by multiple viewers to the left and right of the display. That is, in these applications, the display can be a dead-front display or aesthetic display (e.g., as might be employed for an automobile interior display), where it is desirable for viewers to the left and right of the display to be able to see the display when it is turned on.

Figure 1A:
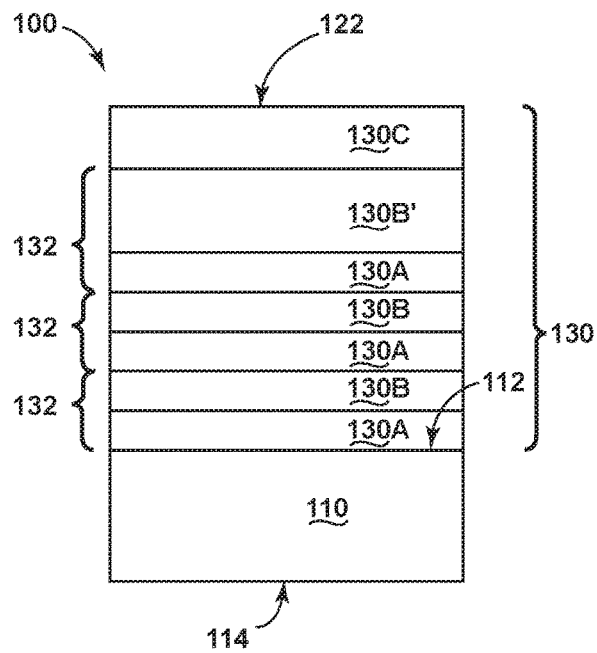
FIG. 1A is a side view of an article for a display device, according to one or more embodiments.
Figure 1B:
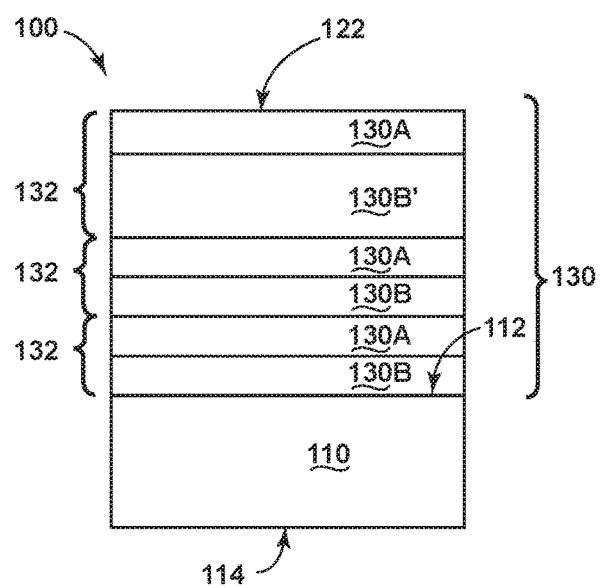
FIG. 1B is a side view of an article for a display device, according to one or more embodiments.

Referring to FIGS. 1-1B, the article 100 according to one or more embodiments may include a substrate 110, and an optical film structure 130 disposed on the substrate. The substrate 110 includes opposing major surfaces 112, 114 and opposing minor surfaces 116, 118. The optical film structure 130 is shown in FIG. 1 as being disposed on a first opposing major surface 112; however, the optical film structure 130 may be disposed on the second opposing major surface 114 and/or one or both of the opposing minor surfaces 116, 118, in addition to, or instead of, being disposed on the first opposing major surface 112. The optical film structure 130 forms an outer surface 122.

As shown in FIGS. 1-1B, the optical film structure 130 includes a plurality of periods 132 such that each period comprises a plurality of layers comprising at least one low RI layer 130A (e.g., a refractive index (n)<~1.7) and at least one high RI layer 130B (e.g., a refractive index (n)>~1.9). In embodiments of the optical film structure 130, such as depicted in FIGS. 1-1B, each period of the plurality of periods 132 comprises an alternating low RI layer and a high RI layer, inclusive of combinations with either of these layers on top of the other and/or intervening layers having a low RI, high RI or an intermediate refractive index (e.g., a refractive index from 1.1 to 2.9).

Referring again to FIGS. 1-1B, according to implementations of the optical film structure 130, the plurality of periods 132 can range from one (1) period to over 200 periods, from (1) period to 100 periods, from two (2) periods to 200 periods, from two (2) periods to 100 periods, or from two (2) periods to 50 periods. For example, the number of periods comprising a plurality of layers comprising at least one low RI layer and at least one high RI layer can be 1, 2, 3, 4, 5, 6, 7, 8, 9, 10, 12, 14, 16, 18, 20, 25, 30, 35, 40, 45, 50, 60, 70, 80, 90, 100, 125, 150, 175, 200 and all numbers of periods between the foregoing number of periods.

As used herein, the term "layer" may include a single layer or may include one or more sub-layers. Such sub-layers may be in direct contact with one another. The sub-layers may be formed from the same material or two or more different materials. In one or more alternative embodiments, such sub-layers may have intervening layers of different materials disposed therebetween. In one or more embodiments a layer may include one or more contiguous and uninterrupted layers and/or one or more discontinuous and interrupted layers (i.e., a layer having different materials formed adjacent to one another). A layer or sub-layers may be formed by a discrete deposition or a continuous deposition process. In one or more embodiments, the layer may be formed using only continuous deposition processes, or, alternatively, only discrete deposition processes.

According to one or more embodiments, the optical film structure 130 of the article 100 (e.g., as shown and described in connection with FIGS. 1-1B) can be characterized with abrasion resistance according to the Alumina SCE Test. As used herein, the "Alumina SCE Test" is conducted by subjecting a sample to a commercial 800 grit alumina sandpaper (10 mm×10 mm) with a total weight of 0.35 kg (350 g) for 500 or 1500 abrasion cycles at 60 cycles/min, using an ~1" stroke length powered by a Taber Industries 5750 linear abrader. Abrasion resistance is then characterized, according to the Alumina SCE Test, by measuring reflected specular component excluded (SCE) values (also referred herein as "reflected haze") from the abraded samples according to principles understood by those with ordinary skill in the field of the disclosure. More particularly, SCE is a measure of diffuse reflection off of the surface of the optical film structure 130, as measured using a Konica-Minolta CM700D with a 6 mm diameter aperture. According to some implementations, it is believed that the optical film structure 130 of the articles 100 can exhibit SCE values (e.g., in view of the hardness values obtained and measured in the Examples), as obtained from the Alumina SCE Test, of less than 2%, less than 1.8%, less than 1.6%, less than 1.4%, less than 1.2%, less than 1%, less than 0.8%, less than 0.6%, less than 0.4%, or even less than 0.2%. Abrasion-induced damage increases the surface roughness leading to the increase in diffuse reflection (i.e., SCE values). Lower SCE values indicates less severe damage, indicative of improved abrasion resistance.

The optical film structure 130 and the article 100 depicted in FIG. 1-1B may be described in terms of a hardness measured by a Berkovich Indenter Hardness Test. Further, those with ordinary skill in the art can recognize that abrasion resistance of the optical film structure 130 and the article 100 can be correlated to the hardness of these elements. As used herein, the "Berkovich Indenter Hardness Test" includes measuring the hardness of a material on a surface thereof by indenting the surface with a diamond Berkovich indenter. The Berkovich Indenter Hardness Test includes indenting the outer surface 122 of the article 100 or the surface of the optical film structure 130 with the diamond Berkovich indenter to form an indent to an indentation depth in the range from about 50 nm to about 1000 nm (or the entire thickness of the optical film structure, whichever is less) and measuring the hardness from this indentation at various points along the entire indentation depth range, along a specified segment of this indentation depth (e.g., in the depth range from about 100 nm to about 500 nm), or at a particular indentation depth (e.g., at a depth of 100 nm, at a depth of 500 nm, etc.) generally using the methods set forth in Oliver, W. C. and Pharr, G. M., "An improved technique for determining hardness and elastic modulus using load and displacement sensing indentation experiments", *J. Mater. Res.*, Vol. 7, No. 6, 1992, 1564-1583; and Oliver, W. C. and Pharr, G. M, "Measurement of hardness and elastic modulus by instrumented indentation: Advances in understanding and refinements to methodology", *J. Mater. Res.*, Vol. 19, No. 1, 2004, 3-20. Further, when hardness is measured over an indentation depth range (e.g., in the depth range from about 100 nm to about 500 nm), the results can be reported as a maximum hardness within the specified range, wherein the maximum is selected from the measurements taken at each depth within that range. As used herein, "hardness" and "maximum hardness" both refer to as-measured hardness values, not averages of hardness values.

Similarly, when hardness is measured at an indentation depth, the value of the hardness obtained from the Berkovich Indenter Hardness Test is given for that particular indentation depth.

Typically, in nanoindentation measurement methods (such as by using a Berkovich indenter) employed for an optical film structure that is harder than the underlying substrate, the measured hardness may appear to increase initially due to development of the plastic zone at shallow indentation depths and then increases and reaches a maximum value or plateau at deeper indentation depths. Thereafter, hardness begins to decrease at even deeper indentation depths due to the effect of the underlying substrate. Where a substrate having an increased hardness compared to the coating is utilized, the same effect can be seen; however, the hardness increases at deeper indentation depths due to the effect of the underlying substrate.

The indentation depth range and the hardness values at certain indentation depth range(s) can be selected to identify a particular hardness response of the optical film structures and layers thereof, described herein, without the effect of the underlying substrate. When measuring hardness of the optical film structure 130 that is disposed on a substrate 110 (see FIGS. 1-1B) with a Berkovich indenter, the region of permanent deformation (plastic zone) of a material is associated with the hardness of the material. During indentation, an elastic stress field extends well beyond this region of permanent deformation. As indentation depth increases, the apparent hardness and modulus are influenced by stress field interactions with the underlying substrate. The substrate influence on hardness occurs at deeper indentation depths (i.e., typically at depths greater than about 10% of the optical film structure or layer thickness). Moreover, a further complication is that the hardness response utilizes a certain minimum load to develop full plasticity during the indentation process. Prior to that certain minimum load, the hardness shows a generally increasing trend.

At small indentation depths (which also may be characterized as small loads) (e.g., up to about 50 nm), the apparent hardness of a material appears to increase dramatically versus indentation depth. This small indentation depth regime does not represent a true metric of hardness; but instead it reflects the development of the aforementioned plastic zone, which is related to the finite radius of curvature of the indenter. At intermediate indentation depths, the apparent hardness approaches maximum levels. At deeper indentation depths, the influence of the substrate becomes more pronounced as the indentation depths increase. Hardness may begin to drop dramatically once the indentation depth exceeds about 30% of the optical film structure thickness or the layer thickness.

As noted above, those with ordinary skill in the art can consider various test-related considerations in ensuring that the hardness and maximum hardness values of the optical film structure 130 and article 100 (see FIGS. 1-1B) obtained from the Berkovich Indenter Hardness Test are indicative of these elements, rather than being unduly influenced by the substrate 110, for example. Further, those with ordinary skill in the art can also recognize that embodiments of the disclosure surprisingly demonstrate high hardness values (e.g., >10 GPa) associated with the optical film structure 130 despite the inclusion of one or more layers having relatively lower hardness levels (e.g., low RI layers comprising $SiO_2$ or doped-$SiO_2$). Indeed, as evidenced by Examples detailed below in subsequent sections, the hardness of certain of the high RI layer(s) 130B, 130B' within an optical film structure (see, e.g., FIGS. 1A and 1B) can significantly influence the overall hardness and maximum hardness of the optical film structure 130 and article 100. This is surprising because of the above test-related considerations, which detail how measured hardness is directly influenced by the thickness of a layer, for example, the thickness of the optical film structure 130. In general, as a film structure (over a thicker substrate) is reduced in thickness, and as the volume of harder material (e.g., as compared to other layers within the coating having a lower hardness) in the film structure decreases, it would be expected that the measured hardness of the film structure will trend toward the hardness of the underlying substrate. Nevertheless, embodiments of the articles 100 of the disclosure, as including the optical film structure 130 (and as also exemplified by the Examples outlined in detail below), surprisingly exhibit significantly high hardness values in comparison to the underlying substrate, thus demonstrating a unique combination of optical film structure thickness (e.g., <7500 nm), volumetric fraction of higher hardness material and optical properties.

In some embodiments, the optical film structure 130 of the article 100 (see FIGS. 1-1B) may exhibit a hardness of about 10 GPa or greater, as measured on the outer surface 122, by a Berkovich Indenter Hardness Test at an indentation depth of about 100 nm. The optical film structure 130 may exhibit a hardness of about 8 GPa or greater, about 9 GPa or greater, about 10 GPa or greater, about 11 GPa or greater, about 12 GPa or greater, about 13 GPa or greater, about 14 GPa or greater, about 15 GPa or greater, about 16 GPa or greater, or any hardness value or range of hardness values within the foregoing ranges by a Berkovich Indenter Hardness Test at an indentation depth of about 100 nm. The article 100, as inclusive of the optical film structure 130 and any additional coatings, as described herein, may exhibit a hardness of about 8 GPa or greater, about 10 GPa or greater, about 12 GPa or greater, about 14 GPa or greater, or about 16 GPa or greater, as measured on the outer surface 122, by a Berkovich Indenter Hardness Test at an indentation depth of about 100 nm or greater. Such measured hardness values may be exhibited by the optical film structure 130 and/or the article 100 over an indentation depth of about 50 nm or greater, or about 100 nm or greater (e.g., from about 100 nm to about 300 nm, from about 100 nm to about 400 nm, from about 100 nm to about 500 nm, from about 100 nm to about 600 nm, from about 200 nm to about 300 nm, from about 200 nm to about 400 nm, from about 200 nm to about 500 nm, or from about 200 nm to about 600 nm). Similarly, maximum hardness values of about 8 GPa or greater, about 9 GPa or greater, about 10 GPa or greater, about 11 GPa or greater, about 12 GPa or greater, about 13 GPa or greater, about 14 GPa or greater, about 15 GPa or greater, about 16 GPa or greater, or any hardness value or range of hardness values within the foregoing ranges by a Berkovich Indenter Hardness Test may be exhibited by the optical film structure 130 and/or the article 100 over an indentation depth of about 50 nm or greater, or about 100 nm or greater (e.g., from about 100 nm to about 300 nm, from about 100 nm to about 400 nm, from about 100 nm to about 500 nm, from about 100 nm to about 600 nm, from about 200 nm to about 300 nm, from about 200 nm to about 400 nm, from about 200 nm to about 500 nm, or from about 200 nm to about 600 nm).

In some implementations of the article 100 depicted in FIGS. 1-1B, the optical film structure 130 may have at least one layer made of material itself having a maximum hardness (as measured on the surface of such a layer, e.g., a surface of one or more of the high RI layers 130B or the high RI layer 130B' (also referred herein as a "scratch resistant layer") shown in FIGS. 1A and 1B) of about 18 GPa or greater, about 19 GPa or greater, about 20 GPa or greater, about 21 GPa or greater, about 22 GPa or greater, about 23 GPa or greater, about 24 GPa or greater, about 25 GPa or greater, and all hardness values therebetween, as measured by the Berkovich Indenter Hardness Test over an indentation depth from about 100 nm to about 500 nm. These measurements are made on a hardness test stack comprising the designated layer (e.g., layer 130B or 130B') of the optical film structure 130 at a physical thickness of about 2 microns, as disposed on a substrate 110, to minimize the thickness-related hardness measurement effects described earlier. The maximum hardness of such a layer may be in the range from about 18 GPa to about 26 GPa, as measured by the Berkovich Indenter Hardness Test over an indentation depth from about 100 nm to about 500 nm. Such maximum hardness values may be exhibited by the material of at least one layer (e.g., one or more of the high RI layer(s) 130B or high RI layer 130B' shown in FIGS. 1A and 1B) over an indentation depth of about 50 nm or greater or 100 nm or greater (e.g., from about 100 nm to about 300 nm, from about 100 nm to about 400 nm, from about 100 nm to about 500 nm, from about 100 nm to about 600 nm, from about 200 nm to about 300 nm, from about 200 nm to about 400 nm, from about 200 nm to about 500 nm, or from about 200 nm to about 600 nm). In one or more embodiments, the article 100 exhibits a hardness that is greater than the hardness of the substrate (which can be measured on the opposite surface from the anti-reflective surface). Similarly, hardness values may be exhibited by the material of at least one layer (e.g., one or more of the high RI layer(s) 130B or high RI layer 130B' shown in FIGS. 1A and 1B) over an indentation depth of about 50 nm or greater or about 100 nm or greater (e.g., from about 100 nm to about 300 nm, from about 100 nm to about 400 nm, from about 100 nm to about 500 nm, from about 100 nm to about 600 nm, from about 200 nm to about 300 nm, from about 200 nm to about 400 nm, from about 200 nm to about 500 nm, or from about 200 nm to about 600 nm). In addition, these hardness and/or maximum hardness values associated with the at least one layer (e.g., the high RI layer(s) 130B or 130B') can also be observed at particular indentation depths (e.g., at 100 nm, 200 nm, etc.) over the measured indentation depth ranges.

Substrate

The substrate 110 of the article 100 depicted in FIGS. 1-1B may include a translucent substrate material, such as an inorganic oxide material. Further, the substrate 110 may include an amorphous substrate, a crystalline substrate or a combination thereof. In one or more embodiments, the substrate exhibits a refractive index in the range from about 1.45 to about 1.55, e.g., 1.45, 1.46, 1.47, 1.48, 1.49, 1.50, 1.51, 1.52, 1.53, 1.54, 1.55, and all refractive indices therebetween.

Suitable substrates 110 may exhibit an elastic modulus (or Young's modulus) in the range from about 30 GPa to about 120 GPa. In some instances, the elastic modulus of the substrate may be in the range from about 30 GPa to about 110 GPa, from about 30 GPa to about 100 GPa, from about 30 GPa to about 90 GPa, from about 30 GPa to about 80 GPa, from about 30 GPa to about 70 GPa, from about 40 GPa to about 120 GPa, from about 50 GPa to about 120 GPa, from about 60 GPa to about 120 GPa, from about 70 GPa to about 120 GPa, and all ranges and sub-ranges therebetween. The Young's modulus values for the substrate itself as recited in this disclosure refer to values as measured by a resonant ultrasonic spectroscopy technique of the general type set forth in ASTM E2001-13, titled "Standard Guide for Resonant Ultrasound Spectroscopy for Defect Detection in Both Metallic and Non-metallic Parts."

In one or more embodiments, the amorphous substrate may include glass, which may be strengthened or non-strengthened. Examples of suitable glass include soda lime glass, alkali aluminosilicate glass, alkali containing borosilicate glass and alkali aluminoborosilicate glass. In some variants, the glass may be free of lithia. In one or more alternative embodiments, the substrate 110 may include crystalline substrates, for example, glass-ceramic or ceramic substrates (which may be strengthened or non-strengthened) or may include a single crystal structure, for example, sapphire. In one or more specific embodiments, the substrate 110 includes an amorphous base (e.g., glass) and a crystalline cladding (e.g., sapphire layer, a polycrystalline alumina layer and/or or a spinel ($MgAl_2O_4$) layer).

The substrate 110 may be substantially planar or sheet-like, although other embodiments may utilize a curved or otherwise shaped or sculpted substrate. The substrate 110 may be substantially optically clear, transparent and free from light scattering. In such embodiments, the substrate may exhibit an average light transmission over the optical wavelength regime of about 85% or greater, about 86% or greater, about 87% or greater, about 88% or greater, about 89% or greater, about 90% or greater, about 91% or greater or about 92% or greater. In one or more alternative embodiments, the substrate 110 may be opaque or exhibit an average light transmission over the optical wavelength regime of less than about 10%, less than about 9%, less than about 8%, less than about 7%, less than about 6%, less than about 5%, less than about 4%, less than about 3%, less than about 2%, less than about 1%, or less than about 0%. In some embodiments, these light reflectance and transmittance values may be a total reflectance or total transmittance (taking into account reflectance or transmittance on both major surfaces of the substrate) or may be observed on a single side of the substrate (i.e., on the outer surface 122 of the optical film structure 130 only, without taking into account the opposite surface). Unless otherwise specified, the average reflectance or transmittance is measured at an incident illumination angle of 0 degrees (however, such measurements may be provided at incident illumination angles of 45 degrees or 60 degrees). The substrate 110 may optionally exhibit a color, for example, white, black, red, blue, green, yellow, orange, etc.

Additionally or alternatively, the physical thickness of the substrate 110 may vary along one or more of its dimensions for aesthetic and/or functional reasons. For example, the edges of the substrate 110 may be thicker as compared to more central regions of the substrate 110. The length, width and physical thickness dimensions of the substrate 110 may also vary according to the application or use of the article 100.

The substrate 110 may be provided using a variety of different processes. For instance, where the substrate 110 includes an amorphous substrate, for example, glass, various forming methods can include float glass processes, rolling processes, updraw processes, and down-draw processes, for example, fusion draw and slot draw.

Once formed, a substrate 110 may be strengthened to form a strengthened substrate. As used herein, the term "strengthened substrate" may refer to a substrate that has been chemically strengthened, for example, through ion-exchange of larger ions for smaller ions in the surface of the substrate. However, other strengthening methods known in the art, for example, thermal tempering, or utilizing a mismatch of the coefficient of thermal expansion between portions of the substrate to create compressive stress and central tension regions, may be utilized to form strengthened substrates.

Where the substrate is chemically strengthened by an ion exchange process, the ions in the surface layer of the substrate are replaced by—or exchanged with—larger ions having the same valence or oxidation state. Ion exchange processes are typically carried out by immersing a substrate in a molten salt bath containing the larger ions to be exchanged with the smaller ions in the substrate. It will be appreciated by those skilled in the art that parameters for the ion exchange process, including, but not limited to, bath composition and temperature, immersion time, the number of immersions of the substrate in a salt bath (or baths), use of multiple salt baths, or additional steps, for example, annealing, washing, and the like, are generally determined by the composition of the substrate, the desired compressive stress (CS), and/or depth of CS layer (or depth of layer) of the substrate that result from the strengthening operation. By way of example, ion exchange of alkali metal-containing glass substrates may be achieved by immersion in at least one molten bath containing a salt, for example, but not limited to, nitrates, sulfates, and chlorides of the larger alkali metal ion. The temperature of the molten salt bath typically is in a range from about 380° C. up to about 450° C., while immersion times range from about 15 minutes up to about 40 hours. However, temperatures and immersion times different from those described above may also be used.

In addition, non-limiting examples of ion exchange processes in which glass substrates are immersed in multiple ion exchange baths, with washing and/or annealing steps between immersions, are described in U.S. patent application Ser. No. 12/500,650, filed Jul. 10, 2009, by Douglas C. Allan et al., entitled "Glass with Compressive Surface for Consumer Applications", claiming priority from U.S. Provisional Patent Application No. 61/079,995, filed Jul. 11, 2008, in which glass substrates are strengthened by immersion in multiple, successive, ion exchange treatments in salt baths of different concentrations; and U.S. Pat. No. 8,312,739, by Christopher M. Lee et al., issued on Nov. 20, 2012, and entitled "Dual Stage Ion Exchange for Chemical Strengthening of Glass", claiming priority from U.S. Provisional Patent Application No. 61/084,398, filed Jul. 29, 2008, in which glass substrates are strengthened by ion exchange in a first bath diluted with an effluent ion, followed by immersion in a second bath having a smaller concentration of the effluent ion than the first bath. The contents of U.S. patent application Ser. No. 12/500,650 and U.S. Pat. No. 8,312,739 are incorporated herein by reference in their entirety.

The degree of chemical strengthening achieved by ion exchange may be quantified based on the parameters of central tension (CT), peak CS, depth of compression (DOC, which is the point along the thickness wherein compression changes to tension), and depth of ion layer. Peak CS, which is a maximum observed compressive stress, may be measured near the surface of the substrate 110 or within the strengthened glass at various depths. A peak CS value may include the measured CS at the surface ($CS_s$) of the strengthened substrate. In other embodiments, the peak CS is measured below the surface of the strengthened substrate. Compressive stress (including $CS_s$) is measured by surface stress meter (FSM) using commercially available instruments such as the FSM-6000, manufactured by Orihara Industrial Co., Ltd. (Japan). Surface stress measurements rely upon the accurate measurement of the stress optical coefficient (SOC), which is related to the birefringence of the glass. SOC in turn is measured according to Procedure C (Glass Disc Method) described in ASTM standard C770-16, entitled "Standard Test Method for Measurement of Glass Stress-Optical Coefficient," the contents of which are incorporated herein by reference in their entirety. As used herein, DOC means the depth at which the stress in the chemically strengthened alkali aluminosilicate glass article described herein changes from compressive to tensile. DOC may be measured by FSM or a scattered light polariscope (SCALP) depending on the ion exchange treatment. Where the stress in the glass article is generated by exchanging potassium ions into the glass article, FSM is used to measure DOC. Where the stress is generated by exchanging sodium ions into the glass article, SCALP is used to measure DOC. Where the stress in the glass article is generated by exchanging both potassium and sodium ions into the glass, the DOC is measured by SCALP, since it is believed the exchange depth of sodium indicates the DOC and the exchange depth of potassium ions indicates a change in the magnitude of the compressive stress (but not the change in stress from compressive to tensile); the exchange depth of potassium ions in such glass articles is measured by FSM. Maximum CT values are measured using a scattered light polariscope (SCALP) with techniques known in the art. Refracted near-field (RNF) method or SCALP may be used to measure (graph, depict visually, or otherwise map out) the complete stress profile. When the RNF method is utilized to measure the stress profile, the maximum CT value provided by SCALP is utilized in the RNF method. In particular, the stress profile measured by RNF is force balanced and calibrated to the maximum CT value provided by a SCALP measurement. The RNF method is described in U.S. Pat. No. 8,854,623, entitled "Systems and Methods for Measuring a Profile Characteristic of a Glass Sample", which is incorporated herein by reference in its entirety. In particular, the RNF method includes placing the glass article adjacent to a reference block, generating a polarization-switched light beam that is switched between orthogonal polarizations at a rate of from 1 Hz to 50 Hz, measuring an amount of power in the polarization-switched light beam and generating a polarization-switched reference signal, wherein the measured amounts of power in each of the orthogonal polarizations are within 50% of each other. The method further includes transmitting the polarization-switched light beam through the glass sample and reference block for different depths into the glass sample, then relaying the transmitted polarization-switched light beam to a signal photodetector using a relay optical system, with the signal photodetector generating a polarization-switched detector signal. The method also includes dividing the detector signal by the reference signal to form a normalized detector signal and determining the profile characteristic of the glass sample from the normalized detector signal.

In some embodiments, a strengthened substrate 110 can have a peak CS of 250 MPa or greater, 300 MPa or greater, 400 MPa or greater, 450 MPa or greater, 500 MPa or greater, 550 MPa or greater, 600 MPa or greater, 650 MPa or greater, 700 MPa or greater, 750 MPa or greater, or 800 MPa or greater. The strengthened substrate may have a DOC of 10 µm or greater, 15 µm or greater, 20 µm or greater (e.g., 25 µm, 30 µm, 35 µm, 40 µm, 45 µm, 50 µm or greater) and/or a CT of 10 MPa or greater, 20 MPa or greater, 30 MPa or greater, 40 MPa or greater (e.g., 42 MPa, 45 MPa, or 50 MPa or greater) but less than 100 MPa (e.g., 95, 90, 85, 80, 75, 70, 65, 60, 55 MPa or less). In one or more specific embodiments, the strengthened substrate has one or more of the following: a peak CS greater than 500 MPa, a DOC greater than 15 µm, and a CT greater than 18 MPa.

Example glasses that may be used in the substrate may include alkali aluminosilicate glass compositions or alkali aluminoborosilicate glass compositions, though other glass compositions are contemplated. Such glass compositions are capable of being chemically strengthened by an ion exchange process. One example glass composition comprises $SiO_2$, $B_2O_3$ and $Na_2O$, where $(SiO_2+B_2O_3) \geq 66$ mol. %, and $Na_2O \geq 9$ mol. %. In some embodiments, the glass composition includes about 6 wt. % aluminum oxide or more. In some embodiments, the substrate includes a glass composition with one or more alkaline earth oxides, such that a content of alkaline earth oxides is about 5 wt. % or more. Suitable glass compositions, in some embodiments, further comprise at least one of $K_2O$, MgO, or CaO. In some embodiments, the glass compositions used in the substrate can comprise 61-75 mol. % $SiO_2$; 7-15 mol. % $Al_2O_3$; 0-12 mol. % $B_2O_3$; 9-21 mol. % $Na_2O$; 0-4 mol. % $K_2O$; 0-7 mol. % MgO; and 0-3 mol. % CaO.

A further example glass composition suitable for the substrate comprises: 60-70 mol. % $SiO_2$; 6-14 mol. % $Al_2O_3$; 0-15 mol. % $B_2O_3$; 0-15 mol. % $Li_2O$; 0-20 mol. % $Na_2O$; 0-10 mol. % $K_2O$; 0-8 mol. % MgO; 0-10 mol. % CaO; 0-5 mol. % $ZrO_2$; 0-1 mol. % $SnO_2$; 0-1 mol. % $CeO_2$; less than 50 ppm $As_2O_3$; and less than 50 ppm $Sb_2O_3$; where 12 mol. % $\leq (Li_2O+Na_2O+K_2O) \leq 20$ mol. % and 0 mol. % $\leq (MgO+CaO) \leq 10$ mol. %.

A still further example glass composition suitable for the substrate comprises: 63.5-66.5 mol. % $SiO_2$; 8-12 mol. % $Al_2O_3$; 0-3 mol. % $B_2O_3$; 0-5 mol. % $Li_2O$; 8-18 mol. % $Na_2O$; 0-5 mol. % $K_2O$; 1-7 mol. % MgO; 0-2.5 mol. % CaO; 0-3 mol. % $ZrO_2$; 0.05-0.25 mol. % $SnO_2$; 0.05-0.5 mol. % $CeO_2$; less than 50 ppm $As_2O_3$; and less than 50 ppm $Sb_2O_3$; where 14 mol. % $\leq (Li_2O+Na_2O+K_2O) \leq 18$ mol. % and 2 mol. % $\leq (MgO+CaO) \leq 7$ mol. %.

In some embodiments, an alkali aluminosilicate glass composition suitable for the substrate 110 comprises alumina, at least one alkali metal and, in some embodiments, greater than 50 mol. % $SiO_2$, in other embodiments 58 mol. % $SiO_2$ or more, and in still other embodiments 60 mol. % $SiO_2$ or more, wherein the ratio $(Al_2O_3+B_2O_3)/\Sigma modifiers$ (i.e., sum of modifiers) is greater than 1, wherein the ratio the components are expressed in mol. % and the modifiers are alkali metal oxides. This glass composition, in particular embodiments, comprises: 58-72 mol. % $SiO_2$; 9-17 mol. % $Al_2O_3$; 2-12 mol. % $B_2O_3$; 8-16 mol. % $Na_2O$; and 0-4 mol. % $K_2O$, wherein the ratio $(Al_2O_3+B_2O_3)/\Sigma modifiers$ (i.e., sum of modifiers) is greater than 1.

In some embodiments, the substrate 110 may include an alkali aluminosilicate glass composition comprising: 64-68 mol. % $SiO_2$; 12-16 mol. % $Na_2O$; 8-12 mol. % $Al_2O_3$; 0-3 mol. % $B_2O_3$; 2-5 mol. % $K_2O$; 4-6 mol. % MgO; and 0-5 mol. % CaO, wherein: 66 mol. % $\leq SiO_2+B_2O_3+CaO \leq 69$ mol. %; $Na_2O+K_2O+B_2O_3+MgO+CaO+SrO > 10$ mol. %; 5 mol. % $\leq MgO+CaO+SrO \leq 8$ mol. %; $(Na_2O+B_2O_3)-Al_2O_3 \leq 2$ mol. %; 2 mol. % $\leq Na_2O-Al_2O_3 \leq 6$ mol. %; and 4 mol. % $\leq (Na_2O+K_2O)-Al_2O_3 \leq 10$ mol. %.

In some embodiments, the substrate 110 may comprise an alkali aluminosilicate glass composition comprising: 2 mol. % or more of $Al_2O_3$ and/or $ZrO_2$, or 4 mol. % or more of $Al_2O_3$ and/or $ZrO_2$.

Where the substrate 110 includes a crystalline substrate, the substrate may include a single crystal, which may include $Al_2O_3$. Such single crystal substrates are referred to as sapphire. Other suitable materials for a crystalline substrate include polycrystalline alumina layer and/or spinel ($MgAl_2O_4$).

Optionally, the crystalline substrate 110 may include a glass-ceramic substrate, which may be strengthened or non-strengthened. Examples of suitable glass-ceramics may include $Li_2O$—$Al_2O_3$—$SiO_2$ system (i.e. LAS-System) glass-ceramics, MgO—$Al_2O_3$—$SiO_2$ system (i.e. MAS-System) glass-ceramics, and/or glass-ceramics that include a predominant crystal phase including β-quartz solid solution, β-spodumene ss, cordierite, and lithium disilicate. The glass-ceramic substrates may be strengthened using the chemical strengthening processes disclosed herein. In one or more embodiments, MAS-System glass-ceramic substrates may be strengthened in $Li_2SO_4$ molten salt, whereby an exchange of $2Li^+$ for $Mg^{2+}$ can occur.

The substrate 110, according to one or more embodiments of the article 100 depicted in FIGS. 1-1B, can have a physical thickness ranging from about 50 µm to about 5 mm. Example substrate 110 physical thicknesses range from about 50 µm to about 500 µm (e.g., 50, 100, 200, 300, 400 or 500 µm). Further example substrate 110 physical thicknesses range from about 500 µm to about 1000 µm (e.g., 500, 600, 700, 800, 900 or 1000 µm). The substrate 110 may have a physical thickness greater than about 1 mm (e.g., about 2, 3, 4, or 5 mm). In one or more specific embodiments, the substrate 110 may have a physical thickness of 2 mm or less or less than 1 mm. The substrate 110 may be acid polished or otherwise treated to remove or reduce the effect of surface flaws.

Optical Film Structure

As shown in FIGS. 1-1B, the optical film structure 130 of the article 100 includes a plurality of layers that includes at least one low RI layer 130A and at least one high RI layer 130B. Further, the low RI layer 130A has a refractive index of less than 1.7 and the high RI layer 130B has a refractive index of greater than 1.9. In some embodiments, one or more layers may be disposed on the opposite side of the substrate 110 from the optical film structure 130 (i.e., on major surface 114) (not shown). In some embodiments of the article 100 (e.g., as depicted in FIG. 1A), an additional layer 130C can serve as a capping layer.

The physical thickness of the optical film structure 130 may be in the range from about 50 nm to less than 10000 nm, from 100 nm to 7500 nm, from 100 nm to 5000 nm, or from 1000 nm to 5000 nm. In some instances, the physical thickness of the optical film structure 130 may be in the range from 50 nm to 10000 nm, from 100 nm to 9000 nm, from 100 nm to 8000 nm, from 100 nm to 7000 nm, from 100 nm to 6000 nm, from 100 nm to 5000 nm, from 500 nm to 10000 nm, from 500 nm to 9000 nm, from 500 nm to 8000 nm, from 500 nm to 7000 nm, from 500 nm to 6000 nm, from 500 nm to 5000 nm, from 1000 nm to 10000 nm, from 1000 nm to 9000 nm, from 1000 nm to 8000 nm, from 1000 nm to 7000 nm, from 1000 nm to 6000 nm, from 1000 nm to 5000 nm, from 1500 nm to 10000 nm, from 1500 nm to 9000 nm, from 1500 nm to 8000 nm, from 1500 nm to 7000 nm, from 1500 nm to 6000 nm, from 1500 nm to 5000 nm, and all ranges and sub-ranges of thickness between the values of the foregoing ranges.

As noted earlier, in one or more embodiments, as shown in FIGS. 1-1B, the optical film structure 130 of the article 100 may include a period 132 comprising two or more alternating layers. In one or more embodiments, the two or more layers may be characterized as having different refractive indices from each another. In some embodiments, the period 132 includes a first low RI layer 130A and a second high RI layer 130B. The difference in the refractive index of the first low RI layer 130A and the second high RI layer 130B may be about 0.2, about 0.25, about 0.3, about 0.35, about 0.4, about 0.45, about 0.5, or even greater differentials. In some implementations, the refractive index of the low RI layer(s) 130A is within the refractive index of the substrate 110 such that the refractive index of the low RI layer(s) 130A is less than about 1.7, and the high RI layer(s) 130B have a refractive index that is greater than 1.9.

Referring now to FIG. 1A, an embodiment of the article 100 is depicted with an optical film structure 130 having a plurality of periods 132 such that each period comprises an alternating low RI layer 130A and a high RI layer 130B. In this configuration, a low RI layer 130A is disposed on the major surface 112 of the substrate 110, with a high RI layer 130B disposed thereon. As also shown in FIG. 1A, the optical film structure 130 includes a capping layer 130C, with an outer surface 122 that serves as the outer surface of the optical film structure 130. In addition, as also depicted in FIG. 1A, the optical film structure 130 includes a scratch resistant, high RI layer 130B' within one of the plurality of periods 132. As depicted in exemplary form in FIG. 1A, the scratch resistant, high RI layer 130B' is located immediately beneath the capping layer 130C. However, in some embodiments, the scratch resistant, high RI layer 130B' can be disposed deeper within the optical film structure 130 beneath more of the alternating low and high RI layers 130A, 130B.

Referring now to FIG. 1B, an embodiment of the article 100 is depicted with an optical film structure 130 having a plurality of periods 132 such that each period comprises an alternating low RI layer 130A and a high RI layer 130B. In this configuration, a high RI layer 130B is disposed on the major surface 112 of the substrate 110, with a low RI layer 130A disposed thereon. As also shown in FIG. 1B, the optical film structure 130 does not employ a capping layer 130C; rather, the top-most low RI layer 130A serves the same function and comprises an outer surface 122 which serves as the outer surface of the optical film structure 130. In addition, as also depicted in FIG. 1B, the optical film structure 130 includes a scratch resistant, high RI layer 130B' within one of the plurality of periods 132. As depicted in exemplary form in FIG. 1B, the scratch resistant, high RI layer 130B' is located immediately beneath the top-most low RI layer 130A. However, in some embodiments, the scratch resistant, high RI layer 130B' can be disposed deeper within the optical film structure 130 beneath more of the alternating low and high RI layers 130A, 130B.

In the embodiments of the article 100 shown in FIGS. 1-1B, the optical film structure 130 may include an additional capping layer 130C (see FIG. 1A), which may include a lower refractive index material than the high RI layer 130B. In some implementations, the refractive index of the capping layer 130C is the same or substantially the same as the refractive index of the low RI layers 130A within the optical film structure 130. Further, in some embodiments, e.g., as shown in FIG. 1A, the capping layer 130C can be excluded from each of the plurality of periods 132 of alternating low and high RI layers 130A, 130B (see FIG. 1A) while still being included within the optical film structure 130.

In the embodiments of the article 100 shown in FIGS. 1A and 1B, the optical film structure 130 includes one or more scratch resistant, high RI layer(s) 130B'. According to embodiments, the scratch resistant, high RI layer(s) 130B' possess a high refractive index (>~1.9) that is within the same refractive index range of the high RI layers 130B within the optical film structure 130. According to some implementations of these optical film structures 130, the scratch resistant, high RI layer(s) have a greater physical thickness and/or Berkovich hardness than each of the high RI layers 130B. In some embodiments, the physical thickness of the each of the scratch resistant, high RI layer(s) exceeds the respective physical thickness of each of the high RI layers 130B by a factor of 1.1, 1.2, 1.3, 1.4, 1.5, 1.6, 1.7, 1.8, 1.9, 2, 3, 4, 5, 6, 7, 8, 9, 10, 15, 20, 25, 30, 40, 50, 60, 70, 80, 90, 100, or even more. In some embodiments, the hardness of the each of the scratch resistant, high RI layer(s) exceeds the respective hardness of each of the high RI layers 130B by a factor of 1.1, 1.2, 1.3, 1.4, 1.5, 1.6, 1.7, 1.8, 1.9, 2, 3, 4, 5, 6, 7, 8, 9, 10, or even more.

As used herein, the terms "low RI" and "high RI" refer to the relative values for the RI of each layer relative to the RI of another layer within the anti-reflective coating 130 (e.g., low RI<high RI). In one or more embodiments, the term "low RI" when used with the low RI layer 130A or with the capping layer 130C, includes a range from about 1.3 to about 1.7, or from about 1.3 to less than 1.7. In one or more embodiments, the term "high RI" when used with the high RI layer 130B, includes a range from about 1.9 to about 2.9, from about 1.9 to about 2.7, from about 1.9 to about 2.5, or greater than 1.9.

Exemplary materials suitable for use in the optical film structure 130 include: doped-$SiO_2$, $SiO_2$, $Al_2O_3$, $GeO_2$, SiO, $AlO_xN_y$, AlN, oxygen-doped $SiN_x$, $SiN_x$, $SiO_xN_y$, $Si_uAl_vO_xN_y$, $TiO_2$, $ZrO_2$, TiN, MgO, $Nb_2O_5$, $Ta_2O_3$, $HfO_2$, $Y_2O_3$, $ZrO_2$, diamond-like carbon, and $MgAl_2O_4$.

Some examples of suitable materials for use in the low RI layer(s) 130A include doped-$SiO_2$, $SiO_2$, $Al_2O_3$, $GeO_2$, SiO, $AlO_xN_y$, $SiO_xN_y$, $Si_uAl_vO_xN_y$, MgO, and $MgAl_2O_4$. Embodiments of the optical film structures 130 depicted in FIGS. 1-1B include low RI layer(s) 130A comprising one or more of doped-$SiO_2$ and $SiO_2$. The nitrogen content of the materials for use in the first low RI layer 130A (i.e., the layer 130A in contact with the substrate 110) may be minimized (e.g., in materials, for example, $Al_2O_3$ and $MgAl_2O_4$). In some embodiments, the low RI layer(s) 130A and a capping layer 130C, if present, in the optical film structure 130 can comprise one or more of a silicon-containing oxide (e.g., silicon dioxide), a silicon-containing nitride (e.g., an oxide-doped silicon nitride, silicon nitride, etc.), and a silicon-containing oxynitride (e.g., silicon oxynitride). In some embodiments of the article 100, the low RI layer(s) 130A and the capping layer 130C comprise a silicon-containing oxide, e.g., $SiO_2$. Embodiments of the optical film structure 130 depicted in FIGS. 1-1B include low RI layer(s) 130A comprising one or more of doped-$SiO_2$ and $SiO_2$.

As used herein, the "$AlO_xN_y$," "$SiO_xN_y$," and "$Si_uAl_xO_yN_z$" materials in the disclosure include various aluminum oxynitride, silicon oxynitride and silicon aluminum oxynitride materials, as understood by those with ordinary skill in the field of the disclosure, described according to certain numerical values and ranges for the subscripts, "u," "x," "y," and "z". That is, it is common to describe solids with "whole number formula" descriptions, for example, $Al_2O_3$. It is also common to describe solids using an equivalent "atomic fraction formula" description, for example, $Al_{0.4}O_{0.6}$, which is equivalent to $Al_2O_3$. In the atomic fraction formula, the sum of all atoms in the formula is 0.4+0.6=1, and the atomic fractions of Al and O in the formula are 0.4 and 0.6, respectively. Atomic fraction descriptions are described in many general textbooks and atomic fraction descriptions are often used to describe alloys. See, for example: (i) Charles Kittel, "Introduction to Solid State Physics," Seventh Edition, John Wiley & Sons, Inc., NY, 1996, pp. 611-627; (ii) Smart and Moore, "Solid State Chemistry, An Introduction," Chapman & Hall University and Professional Division, London, 1992, pp. 136-151; and (iii) James F. Shackelford, "Introduction to Materials Science for Engineers," Sixth Edition, Pearson Prentice Hall, N.J., 2005, pp. 404-418.

Again referring to the "$AlO_xN_y$," "$SiO_xN_y$," and "$Si_uAl_vO_xN_z$" materials in the disclosure, the subscripts allow those with ordinary skill in the art to reference these materials as a class of materials without specifying particular subscript values. To speak generally about an alloy, for example, aluminum oxide, without specifying the particular subscript values, we can speak of $Al_vO_x$. The description $Al_vO_x$ can represent either $Al_2O_3$ or $Al_{0.4}O_{0.6}$. If v+x were chosen to sum to 1 (i.e. v+x=1), then the formula would be an atomic fraction description. Similarly, more complicated mixtures can be described, for example, $Si_uAl_vO_xN_y$, where again, if the sum u+v+x+y were equal to 1, we would have the atomic fractions description case.

Once again referring to the "$AlO_xN_y$," "$SiO_xN_y$," and "$Si_uAl_vO_xN_z$" materials in the disclosure, these notations allow those with ordinary skill in the art to readily make comparisons to these materials and others. That is, atomic fraction formulas are sometimes easier to use in comparisons. For instance, an example alloy consisting of $(Al_2O_3)_{0.3}(AlN)_{0.7}$ is closely equivalent to the formula descriptions $Al_{0.448}O_{0.31}N_{0.241}$ and also $Al_{367}O_{254}N_{198}$. Another example alloy consisting of $(Al_2O_3)_{0.4}(AlN)_{0.6}$ is closely equivalent to the formula descriptions $Al_{0.438}O_{0.375}N_{0.188}$ and $Al_{37}O_{32}N_{16}$. The atomic fraction formulas $Al_{0.448}O_{0.31}N_{0.241}$ and $Al_{0.438}O_{0.375}N_{0.188}$ are relatively easy to compare to one another. For instance, Al decreased in atomic fraction by 0.01, O increased in atomic fraction by 0.065 and N decreased in atomic fraction by 0.053. It takes more detailed calculation and consideration to compare the whole number formula descriptions $Al_{367}O_{254}N_{198}$ and $Al_{37}O_{32}N_{16}$. Therefore, it is sometimes preferable to use atomic fraction formula descriptions of solids. Nonetheless, the use of $Al_vO_xN_y$ is general since it captures any alloy containing Al, O and N atoms.

As understood by those with ordinary skill in the field of the disclosure with regard to any of the foregoing materials (e.g., AlN) for the optical film structure 130, each of the subscripts "u," "x," "y," and "z" can vary from 0 to 1, the sum of the subscripts will be less than or equal to one, and the balance of the composition is the first element in the material (e.g., Si or Al). In addition, those with ordinary skill in the field can recognize that "$Si_uAl_vO_xN_z$" can be configured such that "u" equals zero and the material can be described as "$AlO_xN_y$". Still further, the foregoing compositions for the optical film structure 130 exclude a combination of subscripts that would result in a pure elemental form (e.g., pure silicon, pure aluminum metal, oxygen gas, etc.). Finally, those with ordinary skill in the art will also recognize that the foregoing compositions may include other elements not expressly denoted (e.g., hydrogen), which can result in non-stoichiometric compositions (e.g., $SiN_x$ vs. $Si_3N_4$). Accordingly, the foregoing materials for the optical film can be indicative of the available space within a $SiO_2$—$Al_2O_3$—$SiN_x$—AlN or a $SiO_2$—$Al_2O_3$—$Si_3N_4$—AlN phase diagram, depending on the values of the subscripts in the foregoing composition representations.

Some examples of suitable materials for use in the high RI layer(s) 130B, 130B' of the optical film structures 130 depicted in FIGS. 1-1B include $Si_uAl_vO_xN_y$, AlN, oxygen-doped $SiN_x$, $SiN_x$, $Si_3N_4$, $AlO_xN_y$, $SiO_xN_y$, $Nb_2O_5$, $Ta_2O_5$, $HfO_2$, $TiO_2$, $ZrO_2$, $Y_2O_3$, $ZrO_2$, $Al_2O_3$, and diamond-like carbon. The oxygen content of the materials for the high RI layer(s) 130B, 130B' may be minimized, especially in $SiN_x$ or $AlN_x$ materials. The foregoing materials may be hydrogenated up to about 30% by weight. In some embodiments, the high RI layer(s) 130B, 130B' in the optical film structure 130 can comprise one or more of a silicon-containing oxide (e.g., silicon dioxide), a silicon-containing nitride (e.g., an oxide-doped silicon nitride, silicon nitride, etc.), and a silicon-containing oxynitride (e.g., silicon oxynitride). In some embodiments of the article 100, the high RI layer(s) 130B, 130B' of the optical film structure 130 comprise one or more of $AlO_xN_y$, $SiO_xN_y$, $SiN_x$, and $ZrO_2$. In some embodiments of the article 100, the scratch resistant high RI layer(s) 130B' of the optical film structure 130 comprise one or more of $AlO_xN_y$, $SiO_xN_y$, and $SiN_x$. Where a material having a medium refractive index is desired between a high RI and a low RI layer (e.g., as an intervening layer in one of the periods 132 not shown in FIGS. 1-1B), some embodiments may utilize AlN and/or $SiO_xN_y$. The hardness of one or more of the high RI layers 130B or 130B' may be characterized specifically. In some embodiments, the maximum hardness of one or more of the high RI layer(s) 130B or 130B', as measured by the Berkovich Indenter Hardness Test over an indentation depth from about 100 nm to about 500 nm (i.e., as on a hardness test stack with a 2 micron thick layer of the material of the layer 130B or 130B' disposed on a substrate 110), may be about 18 GPa or greater, about 20 GPa or greater, about 22 GPa or greater, about 24 GPa or greater, about 26 GPa or greater, and all values therebetween.

Referring again to the optical film structure 130 depicted in FIGS. 1-1B, each of the low RI layers 130A and high RI layers 130B can have a physical thickness from about 1 nm to about 500 nm, from about 5 nm to about 500 nm, from about 10 nm to about 500 nm, from about 5 nm to about 400 nm, from about 10 nm to about 400 nm, from about 20 nm to about 500 nm, from about 20 nm to about 400 nm, from about 20 nm to about 300 nm, and all physical thickness ranges between the foregoing ranges. For example, each of the low RI layers 130A and high RI layers 130B can have a physical thickness of 1 nm, 5 nm, 10 nm, 15 nm, 20 nm, 25 nm, 30 nm, 40 nm, 50 nm, 60 nm, 70 nm, 80 nm, 90 nm, 100 nm, 110 nm, 120 nm, 130 nm, 140 nm, 150 nm, 160 nm, 170 nm, 180 nm, 190 nm, 200 nm, 225 nm, 250 nm, 275 nm, 300 nm, 350 nm, 400 nm, 450 nm, 500 nm, and all physical thickness values between the foregoing values. Also referring to the optical film structure 130 depicted in FIGS. 1-1B, each of the scratch-resistant, high RI layer(s) 130B' can have a physical thickness from about 100 nm to 10000 nm, from about 250 nm to 10000 nm, from about 500 nm to about 10000 nm, from about 100 nm to 5000 nm, from about 250 nm to 5000 nm, from about 1500 nm to 5000 nm, from about 1500 nm to 3000 nm, and all physical thickness ranges and sub-range ranges between the foregoing ranges of physical thickness values. For example, each of the high RI layers 130B' can have a physical thickness of 100 nm, 250 nm, 500 nm, 750 nm, 1000 nm, 1250 nm, 1500 nm, 1750 nm, 2000 nm, 2250 nm, 2500 nm, 2750 nm, 3000 nm, 4000 nm, 5000 nm, 6000 nm, 7000 nm, 8000 nm, 9000 nm, 10000 nm, and all physical thickness values between these values.

In one or more embodiments at least one of the layers of the optical film structure 130 of the article 100 may include a specific optical thickness range. As used herein, the term "optical thickness" is determined by (n*d), where "n" refers to the RI of the sub-layer and "d" refers to the physical thickness of the layer. In one or more embodiments, at least one of the low RI layers 130A and high RI layers 130B of the optical film structure 130 may include an optical thickness in the range from about 2 nm to about 400 nm, from about 2 nm to about 350 nm, from about 2 nm to about 300 nm, from about 2 nm to about 250 nm, from about 2 nm to about 200 nm, from about 10 nm to about 100 nm, or from about 15 nm to about 100 nm. In some embodiments, one or more of the layers 130A, 130B in the optical film structure 130 may each have an optical thickness in the range from about 2 nm to about 400 nm, from about 2 nm to about 300 nm, from about 2 nm to about 200 nm, from about 10 nm to about 100 nm, or from about 15 nm to about 100 nm. In some cases, at least one of the layers 130A, 130B of the optical film structure 130 has an optical thickness of about 50 nm or greater. In some cases, each of the low RI layers 130A have an optical thickness in the range from about 2 nm to about 400 nm, from about 2 nm to about 300 nm, from about 2 nm to about 200 nm, from about 10 nm to about 100 nm, or from about 15 nm to about 100 nm. In other cases, each of the high RI layers 130B have an optical thickness in the range from about 2 nm to about 400 nm, from about 2 nm to about 300 nm, from about 2 nm to about 200 nm, from about 10 nm to about 100 nm, or from about 15 nm to about 100 nm. In some embodiments, each of the high RI layers 130B have an optical thickness in the range from about 2 nm to about 500 nm, or from about 10 nm to about 490 nm, or from about 15 nm to about 480 nm, or from about 25 nm to about 475 nm, or from about 25 nm to about 470 nm, or from about 30 nm to about 465 nm, or from about 35 nm to about 460 nm, or from about 40 nm to about 455 nm, or from about 45 nm to about 450 nm, and any and all sub-ranges between these values. In some embodiments, the capping layer 130C (see FIG. 1A), or the outermost low RI layer 130A (see FIG. 1B) for configurations without a capping layer 130C, has a physical thickness of less than about 100 nm, less than about 90 nm, less than about 85 nm, less than about 80 nm, less than about 70 nm, less than about 60 nm, or less than about 50 nm.

Figure 2A:
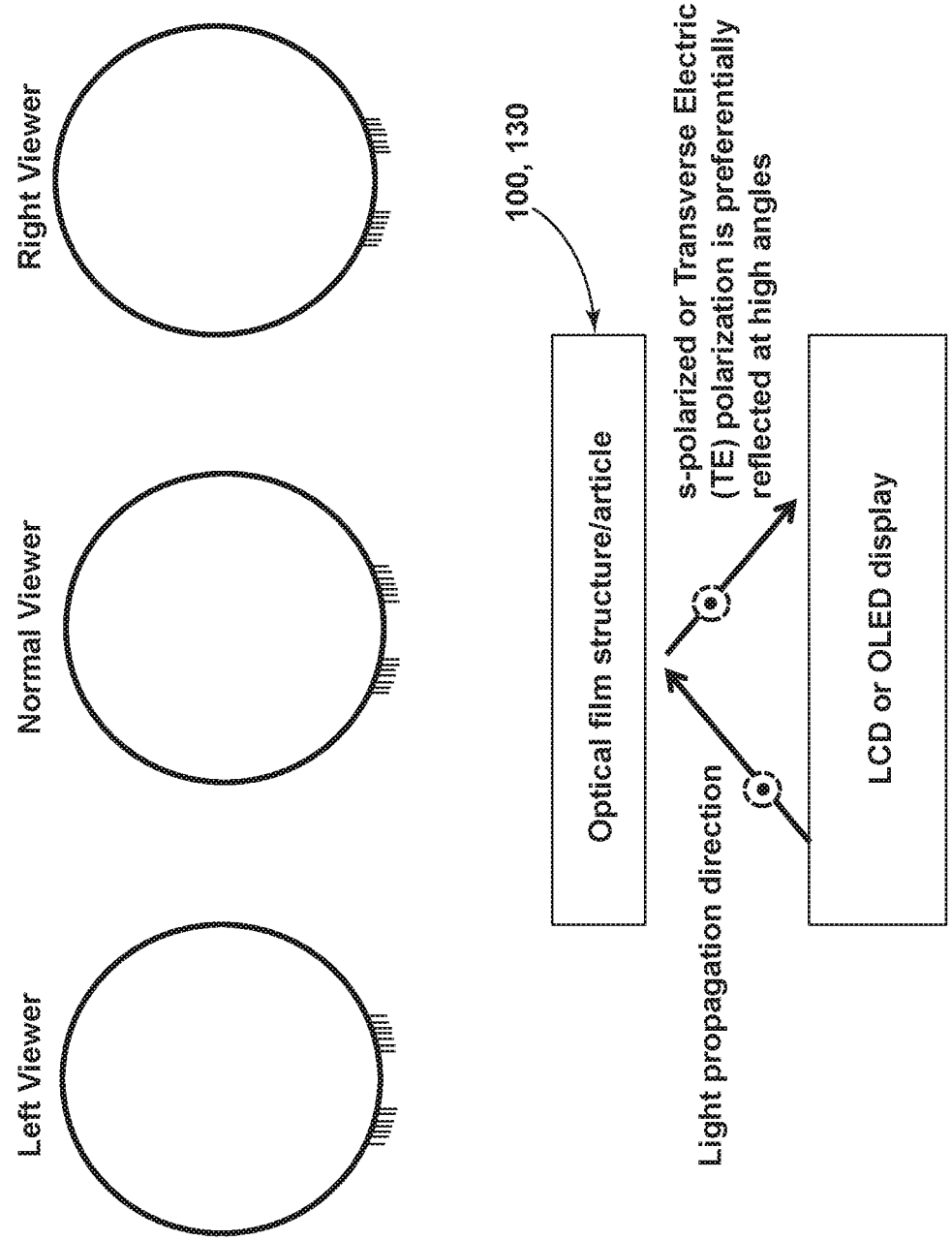
FIG. 2A is a schematic of a display device with an optical film structure, according to one or more embodiments.

Referring now to FIG. 2A, a schematic of a display device article 100 with an optical film structure 130 is provided for use in hidden display device applications, such as privacy displays. In FIG. 2A, a configuration of a privacy display device system is shown, as looking down on the top of all viewers' heads (shown in schematic form as circles/spheres with vertical lines denoting eyelashes). FIG. 2A also shows the polarization orientation of emitted light from the display (e.g., an LCD or OLED display). In particular, the display emits s-polarized light, which is linearly polarized along an axis that is vertical, or up and down with respect to the "normal viewer" shown in FIG. 2A. The dotted circle as drawn in FIG. 2A represents the direction of light polarization being into and out of the page. S-polarized light in this orientation is preferentially reflected/blocked from reaching viewers to the left and right of the normal viewer. Note that modern OLED displays are commonly configured with a circularly polarized light output. The circularly polarized light, however, can be converted to linear polarization using a quarter-wave film or by removing a quarter-wave film from the optical film structure 130.

According to an implementation of an article 100 (see FIGS. 1-1B) for a display device, such as the privacy display system depicted in FIG. 2A, the article 100 includes: a translucent substrate 110 comprising opposing major surfaces 112, 114; and an optical film structure 130 disposed on a first major surface 112 of the substrate, the optical film structure comprising an outer surface 122 opposing the first major surface and a plurality of periods 132 such that each period comprises an alternating low RI layer 130A and high RI layer 130B. Each high RI layer has a refractive index of greater than 1.9 and each low RI layer has a refractive index of less than 1.7. The article exhibits a hardness of 10 GPa or greater measured at an indentation depth of about 100 nm, the hardness measured by a Berkovich Indenter Hardness Test. Further, the article exhibits a single side average photopic light reflectance of at least 50% of non-polarized light as measured at the outer surface from near-normal incidence to an incident angle of 60 degrees over a portion of at least 10 nm within the visible spectrum from 400 nm to 700 nm. The article further exhibits a single side average photopic reflectance of greater than 30% of s-polarized light emitted from the display device at incident angles from 40 degrees to 60 degrees over a portion of at least 10 nm within the visible spectrum from 400 nm to 700 nm. The plurality of periods is at least five (5) periods. In addition, each low RI layer comprises $SiO_2$ or doped-$SiO_2$ and each high RI layer comprises $AlO_xN_y$, $SiO_xN_y$, $Si_uAl_xO_yN_z$, $SiN_x$ or $ZrO_2$. In some implementations, these articles for a hidden display device, e.g., a privacy screen, can exhibit a high-reflectance band and a low-reflectance band within the visible spectrum, in combination with a high degree of coloration.

According to an embodiment, an article 100 (see FIGS. 1-1B) for a display device, such as the privacy screen depicted in FIG. 2A, can exhibit CIE (L*, a*, b*) color coordinates in single-side reflectance (e.g., at the outer surface 122 of the optical film structure 130) indicative of a high degree of coloration. According to some implementations, the article 100 exhibits CIE color coordinates in single-side reflectance from 0 degrees to 90 degrees incidence such that $-20<a*<+80$, $-15<a*<+60$, or $-10<a*<+40$. For example, article 100 can exhibit a* values in the CIE color coordinate system in single-side reflectance from 0 degrees to 90 degrees incidence of −20, −15, −10, −5, 0, +5, +10, +15, +20, +25, +30, +35+40, +50, +60, +70, +80, and all a* values between the foregoing values. According to some implementations, the article 100 exhibits CIE color coordinates in single-side reflectance from 0 degrees to 90 degrees incidence such that $-5<b*<+130$, $-5<b*<+115$, or $-5<b*<+100$. For example, article 100 can exhibit b* values in the CIE color coordinate system in single-side reflectance from 0 degrees to 90 degrees incidence of −5, −4, −3, −2, −1, 0, +5, +10, +15, +20, +25, +30, +35 +40, +50, +60, +70, +80, +90, +100, +110, +120, +130, and all b* values between the foregoing values. It should also be understood that the foregoing color coordinates associated with single-side reflectance of the article 100 can be observed at incidence angles from 0 degrees to 90 degrees, or a smaller sub-range of viewing angles between 0 degrees and 90 degrees.

An article 100 (see FIGS. 1-1B) for a display device, such as the privacy screen depicted in FIG. 2A, can exhibit a single-side (e.g., at the outer surface 122) average photopic light reflectance of greater than 20%, 30%, 40%, 50%, 60%, 70%, 80%, or 90% of non-polarized light (e.g., ambient light) from near-normal incidence to an incident angle of 60 degrees over a portion of the visible spectrum from 400 nm to 700 nm. Unless otherwise noted, a "portion" of the spectrum, as used herein, is a sub-range that is less than the specified range (e.g., a portion or band of 100 nm wide within the visible spectrum from 400 nm to 700 nm). For example, the "portion" of the spectrum can be 1 nm, 5 nm, 10 nm, 20 nm, 30 nm, 40 nm, 50 nm, 75 nm, 100 nm, 150 nm, 200 nm, 250 nm, 300 nm wide, or any width between any of the foregoing values. According to some implementations, an article 100 for a display device, such as a privacy screen in FIG. 2A, can exhibit a single-side (e.g., at the outer surface 122) average photopic light reflectance of greater than at least 70% of non-polarized light (e.g., ambient light) from near-normal incidence to an incident angle of 60 degrees over a portion of the visible spectrum from 400 nm to 700 nm.

An article 100 (see FIGS. 1-1B) for a display device, such as the privacy screen depicted in FIG. 2A, can exhibit a single-side (e.g., at the outer surface 122) average photopic light reflectance of greater than 30%, 40%, 50%, 60%, 70%, 75%, 80%, 85%, or 90% of s-polarized light (e.g., from an OLED, LCD, RGB-LED backlit LCD or micro-LED display) from an incident angle of greater than 30 degrees (e.g., from 30 degrees to 60 degrees, from 40 degrees to 60 degrees, etc.) over a portion of the visible spectrum from 400 nm to 700 nm. According to some implementations, an article 100 for a display device, such as a privacy screen in FIG. 2A, can exhibit a single-side (e.g., at the outer surface 122) average photopic light reflectance of greater than at least 40%, 75% or 90% of s-polarized light from an incident angle of greater than 30 degrees (e.g., from 40 degrees to 60 degrees) over a portion of the visible spectrum from 400 nm to 700 nm.

An article 100 (see FIGS. 1-1B) for a display device, such as the privacy screen depicted in FIG. 2A, can exhibit a single-side (e.g., at the outer surface 122) average photopic light transmittance of less than 40%, 30%, 20%, 10%, 5%, 4%, 3%, 2%, or 1% of s-polarized light (e.g., from an OLED, LCD, RGB-LED backlit LCD or micro-LED display) from an incident angle of greater than 30 degrees (e.g., from 40 degrees to 60 degrees) over a portion of the visible spectrum from 400 nm to 700 nm. According to some implementations, an article 100 for a display device, such as a privacy screen in FIG. 2A, can exhibit a single-side (e.g., at the outer surface 122) average photopic light transmittance of less than 20% of s-polarized light from an incident angle of greater than 30 degrees (e.g., from 40 degrees to 60 degrees) over a portion of the visible spectrum from 400 nm to 700 nm.

An article 100 (see FIGS. 1-1B) for a display device, such as the privacy screen depicted in FIG. 2A, can exhibit a single-side (e.g., at the outer surface 122) average photopic light transmittance of greater than 50%, 60%, 70%, 80%, or 90% of polarized or non-polarized light from an incident angle at or near-normal incidence (e.g., from 0 degrees to 15 degrees) over a portion of the visible spectrum from 400 nm to 700 nm. Similarly, an article 100 (see FIGS. 1-1B) for a display device, such as the privacy screen depicted in FIG. 2A, can exhibit a single-side (e.g., at the outer surface 122) average photopic light reflectance of less than 10%, 5%, 3%, 2%, 1%, or 0.5% of polarized or non-polarized light from an incident angle at or near-normal incidence (e.g., from 0 degrees to 15 degrees) over a portion of the visible spectrum from 400 nm to 700 nm.

In some embodiments, the article 100 configurations (see FIGS. 1-1B) for applications, such as the privacy screen depicted in FIG. 2A, start out in the 'red' portion of the visible spectrum and shift to shorter wavelengths at higher incident angles, eventually reflecting more than 90% of s-polarized light, on average, from 510 nm to 680 nm at 60 degrees incidence. As such, the color of the optical film structure 130 of these articles can shift from red to gold.

Figure 2B:
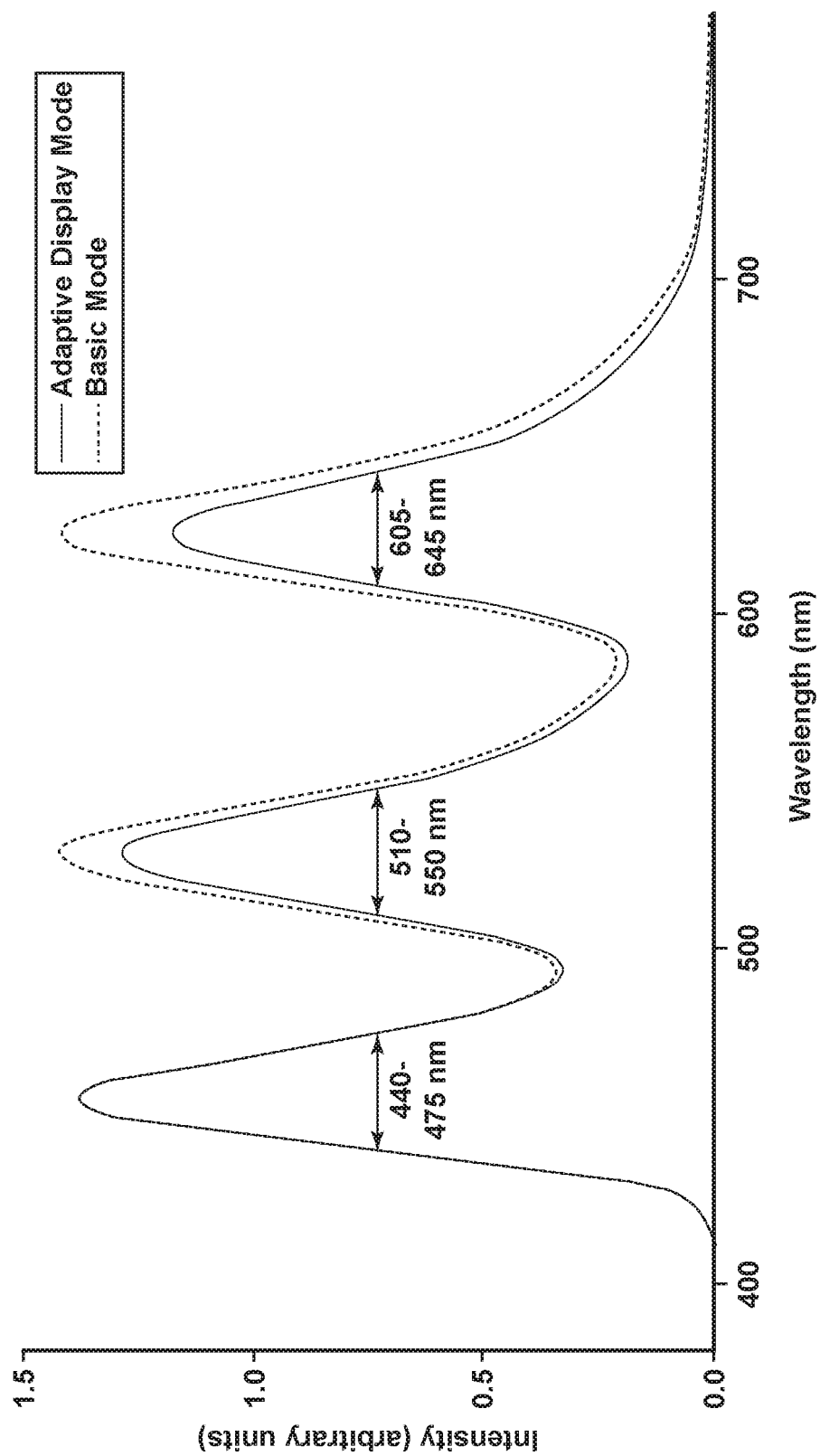
FIG. 2B is an emission spectrum from a commercially available mobile display device.

Referring now to FIG. 2B, an emission spectrum from a commercially available OLED-based mobile display device is provided. The display spectrum shown in FIG. 2B can be employed in the display device system shown in FIG. 2A, as outlined earlier. In particular, the OLED display spectrum, as shown in FIG. 2B, preferentially transmits light at particular emission wavelength ranges (e.g., 440 nm to 475 nm; 510 nm to 550 nm; and 605 nm to 645 nm). Embodiments of an article 100 (see FIGS. 1-1B) can serve as a privacy screen for an arrangement as depicted in FIG. 2B by preferentially transmitting light at these wavelength ranges and reflecting or blocking light transmission at the other wavelengths outside of these ranges. The actual wavelengths employed in the privacy display application can differ from those depicted in FIG. 2B, depending on the type of display device (e.g., OLED, LCD with an RGB-LED backlight, or micro-LED spectrum) and, accordingly, the optical film structure 130 of the article 100 can be adjusted to preferentially transmit light in these wavelength ranges and block light at the other wavelengths outside of these ranges.

According to an implementation of an article 100 (see FIGS. 1-1B) for a display device, such as the privacy display system depicted in FIG. 2A in view of the spectrum shown in FIG. 2B, the article 100 includes: a translucent substrate 110 comprising opposing major surfaces 112, 114; and an optical film structure 130 disposed on a first major surface of the substrate 112, the optical film structure 130 comprising an outer surface 122 opposing the first major surface and a plurality of periods 132 such that each period comprises an alternating low RI layer 130A and high RI layer 130B. Each high RI layer has a refractive index of greater than 1.9 and each low RI layer has a refractive index of less than 1.7. The article exhibits a hardness of 10 GPa or greater measured at an indentation depth of about 100 nm, the hardness measured by a Berkovich Indenter Hardness Test. The article exhibits a single side average photopic light reflectance of at least 50% of non-polarized light as measured at the outer surface from near-normal incidence to an incident angle of 60 degrees over a plurality of portions of the visible spectrum from 400 nm to 700 nm, wherein each portion is at least 10 nm in width. The article further exhibits a single side average photopic reflectance of greater than 30% of s-polarized light emitted from the display device at incident angles from 40 degrees to 60 degrees over a plurality of portions of the visible spectrum from 400 nm to 700 nm, wherein each portion is at least 10 nm in width. The plurality of periods is at least ten (10) periods. In addition, each low RI layer comprises $SiO_2$ or doped-$SiO_2$ and each high RI layer comprises $AlO_xN_y$, $SiO_xN_y$, $Si_uAl_xO_yN_z$, $SiN_x$ or $ZrO_2$. In some implementations, these articles for a hidden display device, e.g., a privacy screen, can exhibit multiple high-reflectance bands and multiple low-reflectance bands within the visible spectrum, in combination with a medium degree of coloration.

According to an embodiment, an article 100 (see FIGS. 1-1B) for a display device, such as the privacy screen depicted in FIG. 2A in view of the spectrum shown in FIG. 2B, can exhibit CIE (L*, a*, b*) color coordinates in single-side reflectance (e.g., at the outer surface 122 of the optical film structure 130) indicative of a high degree of coloration. According to some implementations, the article 100 exhibits CIE color coordinates in single-side reflectance from 0 degrees to 90 degrees incidence such that −10<a*<+15, −8<a*<+10, or −6<a*<+5. For example, article 100 can exhibit a* values in the CIE color coordinate system in single-side reflectance from 0 degrees to 90 degrees incidence of −10, −7, −5, −3, 0, +3, +5, +7, +10, and all a* values between the foregoing values. According to some implementations, the article 100 exhibits CIE color coordinates in single-side reflectance from 0 degrees to 90 degrees incidence such that −30<b*<+20, −20<b*<+10, or −10<b*<+5. For example, article 100 can exhibit b* values in the CIE color coordinate system in single-side reflectance from 0 degrees to 90 degrees incidence of −30, −25, −20, −15, −10, −5, 0, +1, +2, +3, +4, +5, +6, +7, +8, +9, +10, and all b* values between the foregoing values. It should also be understood that the foregoing color coordinates associated with single-side reflectance of the article 100 can be observed at incidence angles from 0 degrees to 90 degrees, or a smaller sub-range of viewing angles between 0 degrees and 90 degrees.

According to some implementations, such an article 100 can possess multiple transmission bands in the visible spectrum (i.e., from 400 nm to 700 nm), e.g., three (3) transmission bands and four (4) distinct reflection bands. The reflection bands shift to shorter wavelengths at higher incidence angles, eventually blocking the same wavelength bands that are highly transmissive at normal incidence. In some embodiments of the article 100, the first transmission band resides in the 'blue' range from 400 nm to 500 nm, the second transmission band resides in the 'green' range from 500 nm to 600 nm, and the third transmission band resides in the 'red' range from 600 nm to 700 nm. Further, each transmission band can represent a continuous range of wavelengths of least 4 nm, 5 nm, 6 nm 7 nm, 8 nm, 9 nm, and 10 nm in width, or even larger widths (e.g. from 10 nm to 50 nm), in which the average photopic transmittance is greater than 80%, 85%, 90%, 95%, 96%, 97%, or 98% within each of these transmission bands at a normal or near-normal incidence angle (e.g., from 0 to 15 degrees). Similarly, the article 100 can possess four (4) or more reflectance bands of at least 10 nm in width between or outside of the transmission bands having an average photopic reflectance of greater than 40%, 50%, 60%, 70%, 80% or 90% at a normal or near-normal incidence angle.

An article 100 (see FIGS. 1-1B) for a display device, such as the privacy screen depicted in FIG. 2A in view of the spectrum shown in FIG. 2B, can exhibit a single-side (e.g., at the outer surface 122) average photopic light reflectance of greater than 20%, 30%, 40%, 50%, 60%, 70%, 80%, or 90% of non-polarized light (e.g., ambient light) from near-normal incidence to an incident angle of 60 degrees over a plurality of portions (e.g., four (4) reflectance bands) of the visible spectrum from 400 nm to 700 nm. According to some implementations, an article 100 for a display device, such as a privacy screen in FIG. 2A, can exhibit a single-side (e.g., at the outer surface 122) average photopic light reflectance of greater than at least 70% of non-polarized light (e.g., ambient light) from near-normal incidence to an incident angle of 60 degrees over a plurality of portions of the visible spectrum from 400 nm to 700 nm.

An article 100 (see FIGS. 1-1B) for a display device, such as the privacy screen depicted in FIG. 2A in view of the spectrum shown in FIG. 2B, can exhibit a single-side (e.g., at the outer surface 122) average photopic light reflectance of greater than 40%, 50%, 60%, 70%, 75%, 80%, 85%, or 90% of s-polarized light (e.g., from an OLED, LCD, RGB-LED backlit LCD or micro-LED display) from an incident angle of greater than 30 degrees (e.g., from 40 degrees to 60 degrees) over a plurality of portions (e.g., over three (3) transmission bands that correspond to the peak wavelength ranges of a display device) of the visible spectrum from 400 nm to 700 nm. According to some implementations, an article 100 for a display device, such as a privacy screen in FIG. 2A, can exhibit a single-side (e.g., at the outer surface 122) average photopic light reflectance of greater than at least 40%, 75% or 90% of s-polarized light from an incident angle of greater than 30 degrees (e.g., from 40 degrees to 60 degrees) over a plurality of portions of the visible spectrum from 400 nm to 700 nm.

An article 100 (see FIGS. 1-1B) for a display device, such as the privacy screen depicted in FIG. 2A in view of the spectrum shown in FIG. 2B, can exhibit a single-side (e.g., at the outer surface 122) average photopic light transmittance of less than 40%, 30%, 20%, 10%, 5%, 4%, 3%, 2%, or 1% of s-polarized light (e.g., from an OLED, LCD, RGB-LED backlit LCD or micro-LED display) from an incident angle of greater than 30 degrees (e.g., from 40 degrees to 60 degrees) over a plurality of portions (e.g., within three (3) transmission bands that correspond to the peak wavelength ranges of a display device) of the visible spectrum from 400 nm to 700 nm. According to some implementations, an article 100 for a display device, such as a privacy screen in FIG. 2A, can exhibit a single-side (e.g., at the outer surface 122) average photopic light transmittance of less than 20% of s-polarized light from an incident angle of greater than 30 degrees (e.g., from 40 degrees to 60 degrees) over a plurality of portions of the visible spectrum from 400 nm to 700 nm.

An article 100 (see FIGS. 1-1B) for a display device, such as the privacy screen depicted in FIG. 2A in view of the spectrum shown in FIG. 2B, can exhibit a single-side (e.g., at the outer surface 122) average photopic light transmittance of greater than 50%, 60%, 70%, 80%, or 90% of polarized or non-polarized light from an incident angle at or near-normal incidence (e.g., from 0 degrees to 15 degrees) over a plurality of portions (e.g., within three (3) transmission bands that correspond to the peak wavelength ranges of a display device) of the visible spectrum from 400 nm to 700 nm. Similarly, an article 100 (see FIGS. 1-1B) for a display device, such as the privacy screen depicted in FIG. 2A, can exhibit a single-side (e.g., at the outer surface 122) average photopic light reflectance of less than 10%, 5%, 3%, 2%, 1%, or 0.5% of polarized or non-polarized light from an incident angle at or near-normal incidence (e.g., from 0 degrees to 15 degrees) over a portion of the visible spectrum from 400 nm to 700 nm.

According to an implementation of the article 100 (see FIGS. 1-1B) for a display device in view of the system shown in FIG. 2A and spectrum shown in FIG. 2B, the article can exhibit a single-side (e.g., at the outer surface 122) average photopic light reflectance of greater than 90% of s-polarized light (e.g., from an OLED, LCD, RGB-LED backlit LCD or micro-LED display) from an incident angle of greater than 30 degrees (e.g., from 40 degrees to 60 degrees) over each of the wavelength ranges from 440 nm to 470 nm, from 520 nm to 545 nm and from 610 nm to 645 nm (e.g., over three (3) transmission bands that correspond to the peak wavelength ranges of a display device). As noted earlier, the optical film structure 130 can be adjusted to exhibit similar average photopic light reflectance levels over three (3) or more bands that correspond to peak transmission wavelength ranges of the display device employed with the article 100. According to another implementation of the article 100 (see FIGS. 1-1B) for a display device in view of the system shown in FIG. 2A and spectrum shown in FIG. 2B, the article can exhibit a single-side (e.g., at the outer surface 122) average photopic light reflectance of greater than 60% of non-polarized light (e.g., ambient light) from an incident angle of greater than 30 degrees (e.g., from 40 degrees to 60 degrees) over each of the wavelength ranges from 440 nm to 470 nm, from 520 nm to 545 nm and from 610 nm to 645 nm.

Figure 2C:
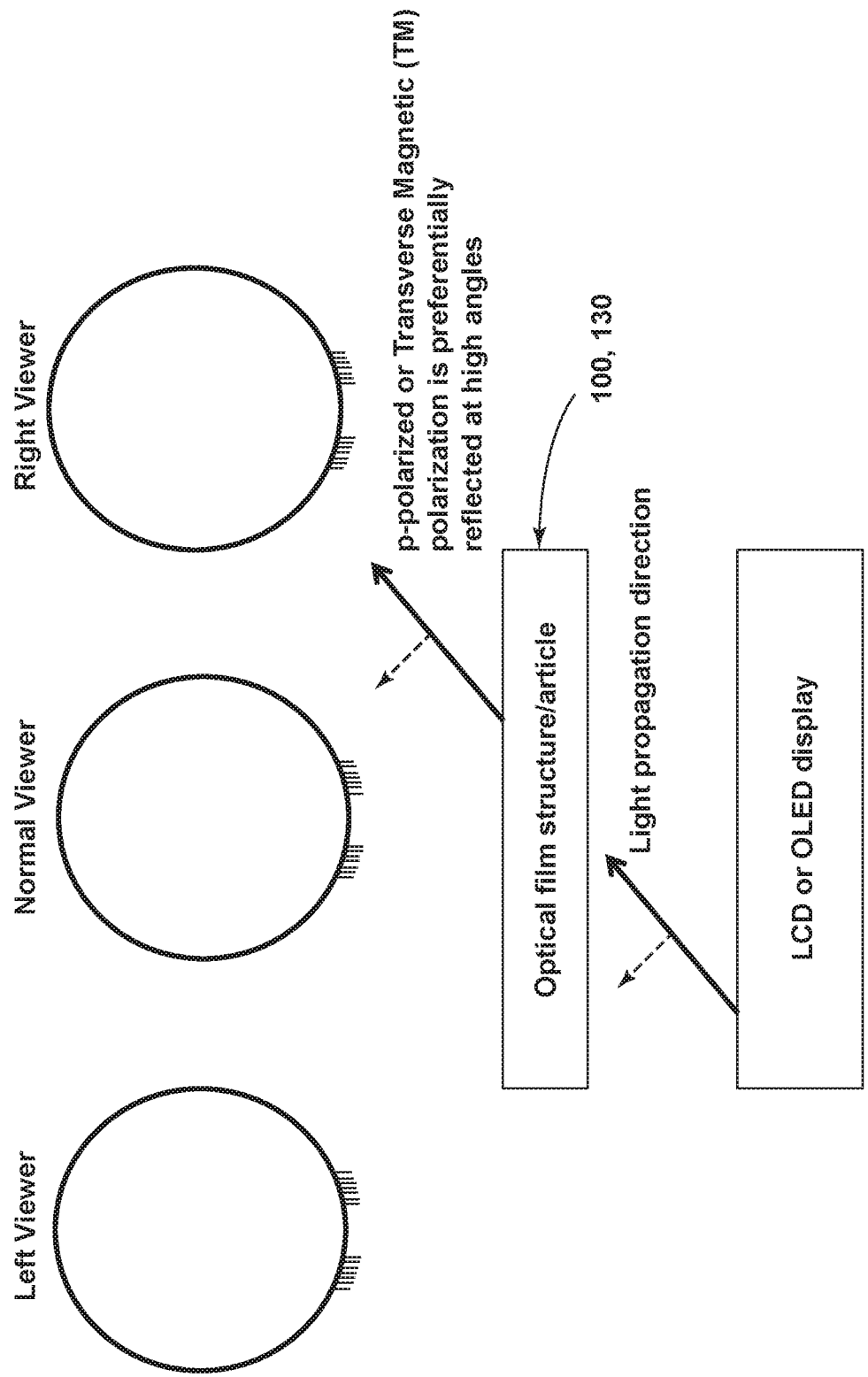
FIG. 2C is a schematic of a display device with an optical film structure, according to one or more embodiments.

Referring now to FIG. 2C, a schematic of a display device article 100 with an optical film structure 130 is provided. In FIG. 2C, a configuration of a hidden display device system used in aesthetic or dead-front applications is shown, as looking down on the top of all viewers' heads (shown in schematic form as circles/spheres with vertical lines denoting eyelashes). FIG. 2C also shows the polarization orientation of emitted light from the display (e.g., an LCD or OLED display). In particular, the display emits p-polarized light, which is linearly polarized along an axis that is horizontal, or left-to-right with respect to the "normal viewer" shown in FIG. 2C. The dotted line shown in FIG. 2C represents the direction of light polarization being toward the left and right of the page. P-polarized light in this orientation is preferentially transmitted toward viewers to the left and right of the normal viewer.

According to an implementation of an article 100 (see FIGS. 1-1B) for a display device, such as the aesthetic or dead-front display system depicted in FIG. 2C, the article 100 includes: a translucent substrate 110 comprising opposing major surfaces 112, 114; and an optical film structure 130 disposed on a first major surface 112 of the substrate, the optical film structure comprising an outer surface 122 opposing the first major surface and a plurality of periods 132 such that each period comprises an alternating low RI layer 130A and high RI layer 130B. Each high RI layer has a refractive index of greater than 1.9 and each low RI layer has a refractive index of less than 1.7. The article exhibits a hardness of 10 GPa or greater measured at an indentation depth of about 100 nm, the hardness measured by a Berkovich Indenter Hardness Test. Further, the article exhibits a single side average photopic light reflectance of greater than 12% of non-polarized light as measured at the outer surface from near-normal incidence to an incident angle of 90 degrees over the visible spectrum from 400 nm to 700 nm. The article further exhibits a single side average photopic transmittance of greater than 80% of p-polarized light emitted from the display device at incident angles from 0 degrees to 90 degrees over the visible spectrum from 400 nm to 700 nm. The plurality of periods is at least three (3) periods. In addition, each low RI layer comprises $SiO_2$ or doped-$SiO_2$ and each high RI layer comprises $AlO_xN_y$, $SiO_xN_y$, $Si_uAl_xO_yN_z$, $SiN_x$ or $ZrO_2$.

According to another implementation of an article 100 (see FIGS. 1-1B) for a display device, such as the aesthetic or dead-front display system depicted in FIG. 2C, the article 100 includes: a translucent substrate 110 comprising opposing major surfaces 112, 114; and an optical film structure 130 disposed on a first major surface 112 of the substrate, the optical film structure comprising an outer surface 122 opposing the first major surface and a plurality of periods 132 such that each period comprises an alternating low RI layer 130A and high RI layer 130B. Each high RI layer has a refractive index of greater than 1.9 and each low RI layer has a refractive index of less than 1.7. The article exhibits a hardness of 10 GPa or greater measured at an indentation depth of about 100 nm, the hardness measured by a Berkovich Indenter Hardness Test. Further, the article exhibits a single side average photopic light reflectance of greater than 20% of non-polarized light as measured at the outer surface from near-normal incidence to an incident angle of 90 degrees over the visible spectrum from 400 nm to 700 nm. The article further exhibits a single side average photopic transmittance of greater than 50% of p-polarized light emitted from the display device at incident angles from 0 degrees to 90 degrees over the visible spectrum from 400 nm to 700 nm. The plurality of periods is at least five (5) periods. In addition, each low RI layer comprises $SiO_2$ or doped-$SiO_2$ and each high RI layer comprises $AlO_xN_y$, $SiO_xN_y$, $Si_uAl_xO_yN_z$, $SiN_x$ or $ZrO_2$.

In some implementations, these articles 100 (see FIGS. 1-1B) for a hidden display device such as depicted in FIG. 2C, e.g., an aesthetics-oriented or dead-front screen, can exhibit a single, broad reflectance band with a relatively low level of coloration. In such configurations, the article 100 can employ an optical film structure 130 suitable for hidden display applications intended for viewing by multiple views—whether at normal incidence angles or at high angles adjacent to the primary viewer. The articles 100 for these hidden display applications, for example, can exhibit a metallic or mirror-like appearance, due to their relatively low p-polarized reflectance and/or high p-polarized transmittance at high incidence angles (e.g., incident angles greater than 30 degrees), which encourage visibility for multiple viewers at different positions relative to the primary viewer in front of the display.

According to an embodiment, an article 100 (see FIGS. 1-1B) for a display device, such as the privacy screen depicted in FIG. 2C, can exhibit CIE (L*, a*, b*) color coordinates in single-side reflectance (e.g., at the outer surface 122 of the optical film structure 130) indicative of a low degree of coloration. According to some implementations, the article 100 exhibits CIE color coordinates in single-side reflectance from 0 degrees to 90 degrees incidence such that −5<a*, b*<+5, −4<a*, b*<+4, or −3<a*, b*<+3. For example, article 100 can exhibit a*, b* values in the CIE color coordinate system in single-side reflectance from 0 degrees to 90 degrees incidence of −5, −4, −3, −2, −1, 0, +1, +2, +3, +4, +5, and all a*, b* values between the foregoing values. It should also be understood that the foregoing color coordinates associated with single-side reflectance of the article 100 can be observed at incidence angles from 0 degrees to 90 degrees, or a smaller sub-range of viewing angles between 0 degrees and 90 degrees.

An article 100 (see FIGS. 1-1B) for a display device, such as the aesthetics-oriented or dead-front screen depicted in FIG. 2C, can exhibit a single-side (e.g., at the outer surface 122) average photopic light reflectance of greater than 10%, 13%, 15%, 17%, or 20% of non-polarized light (e.g., ambient light) from near-normal incidence to an incident angle of 90 degrees over the visible spectrum from 400 nm to 700 nm. According to some implementations, an article 100 for a display device, such as the hidden display of FIG. 2C, can exhibit a single-side (e.g., at the outer surface 122) average photopic light reflectance of greater than at least 17% of non-polarized light (e.g., ambient light) from near-normal incidence to an incident angle of 90 degrees, and/or greater than 24% at 60 degrees incidence, over the visible spectrum from 400 nm to 700 nm.

An article 100 (see FIGS. 1-1B) for a display device, such as the aesthetics-oriented or dead-front screen depicted in FIG. 2C, can exhibit a single-side (e.g., at the outer surface 122) average photopic light transmittance of greater than 80%, 85%, 90%, 91%, 92%, 93%, 94%, 95%, or 96% of p-polarized light (e.g., from a display device) from near-normal incidence to an incident angle of 90 degrees over the visible spectrum from 400 nm to 700 nm. According to some implementations, an article 100 for a display device, such as the hidden display of FIG. 2C, can exhibit a single-side (e.g., at the outer surface 122) average photopic light transmittance of greater than at least 92% of p-polarized light at an incident angle of 50 degrees, at least 96.5% of p-polarized light at an incident angle of 60 degrees, and/or at least 98.5% of p-polarized light at an incident angle of 70 degrees, over the visible spectrum from 400 nm to 700 nm.

As used herein, "photopic average reflectance" mimics the response of the human eye by weighting the reflectance versus wavelength spectrum according to the human eye's sensitivity. Photopic average reflectance may also be defined as the luminance, or tristimulus Y value of reflected light, according to known conventions, for example, CIE color space conventions. Those with ordinary skill in the field of the disclosure can obtain or otherwise measure the "average photopic transmittance" according to these sample principles for obtaining the average photopic reflectance. The photopic average reflectance is defined in Equation (1) as the spectral reflectance, R(λ) multiplied by the illuminant spectrum, I(λ), and the CIE's color matching function $\bar{y}(λ)$, related to the eye's spectral response:

$$\langle R_p \rangle = \int_{380\ nm}^{720\ nm} R(λ) \times I(λ) \times \bar{y}(λ) dλ. \quad (1)$$

According to some implementations of the articles 100 depicted in FIGS. 1-1B, the article (i.e., as including the optical film structure 130) may exhibit an elastic modulus (or Young's modulus) in the range from about 30 GPa to about 120 GPa. In some instances, the elastic modulus of the article 100 may be in the range from about 30 GPa to about 110 GPa, from about 30 GPa to about 100 GPa, from about 30 GPa to about 90 GPa, from about 30 GPa to about 80 GPa, from about 30 GPa to about 70 GPa, from about 40 GPa to about 120 GPa, from about 50 GPa to about 120 GPa, from about 60 GPa to about 120 GPa, from about 70 GPa to about 120 GPa, and all ranges and sub-ranges therebetween. According to some embodiments, the elastic modulus of the article 100 may be greater than 80 GPa, greater than 85 GPa, greater than 90 GPa, greater than 95 GPa, or any modulus value or sub-range of values between the foregoing values.

The articles 100 depicted in FIGS. 1-1B may include one or more additional coatings disposed on the optical film structure 130 (not shown in the figures). In one or more embodiments, the additional coating may include an easy-to-clean coating. An example of a suitable easy-to-clean coating is described in U.S. Patent Application Publication No. 2014/0113083, entitled "Process for Making of Glass Articles with Optical and Easy-To-Clean Coatings", which is incorporated herein in its entirety by reference. The easy-to-clean coating may have a physical thickness in the range from about 5 nm to about 50 nm and may include known materials, for example, fluorinated silanes. In some embodiments, the easy-to-clean coating may have a physical thickness in the range from about 1 nm to about 40 nm, from about 1 nm to about 30 nm, from about 1 nm to about 25 nm, from about 1 nm to about 20 nm, from about 1 nm to about 15 nm, from about 1 nm to about 10 nm, from about 5 nm to about 50 nm, from about 10 nm to about 50 nm, from about 15 nm to about 50 nm, from about 7 nm to about 20 nm, from about 7 nm to about 15 nm, from about 7 nm to about 12 nm or from about 7 nm to about 10 nm, and all ranges and sub-ranges therebetween.

In some embodiments, the additional coating (not shown in FIGS. 1-1B) includes a combination of easy-to-clean material and scratch resistant material. In one example, the combination includes an easy-to-clean material and diamond-like carbon. Such additional coatings may have a physical thickness in the range from about 5 nm to about 20 nm. The constituents of the additional coating may be provided in separate layers. For example, the diamond-like carbon material may be disposed as a first layer and the easy-to-clean material can be disposed as a second layer on the first layer of diamond-like carbon. The physical thicknesses of the first layer and the second layer may be in the ranges provided above for the additional coating. For example, the first layer of diamond-like carbon may have a physical thickness of about 1 nm to about 20 nm or from about 4 nm to about 15 nm (or more specifically about 10 nm) and the second layer of easy-to-clean material may have a physical thickness of about 1 nm to about 10 nm (or more specifically about 6 nm). The diamond-like coating may include tetrahedral amorphous carbon (Ta—C), Ta—C:H, and/or Ta—C—H.

A further aspect of this disclosure pertains to a method for forming the articles 100 described herein (e.g., as shown in FIGS. 1-1B). In some embodiments, the method includes providing a substrate having a major surface in a coating chamber, forming a vacuum in the coating chamber, forming a durable optical film structure 130 on a major surface 112 of the substrate 110, optionally forming an additional coating, and removing the substrate from the coating chamber. In one or more embodiments, the optical film structure 130 and the additional coating are formed in either the same coating chamber or without breaking vacuum in separate coating chambers. In one or more embodiments, the method may include loading the substrate (e.g., substrate 110) on carriers which are then used to move the substrate in and out of different coating chambers, under load lock conditions so that a vacuum is preserved as the substrate is moved.

The optical film structure 130 (i.e., as including low RI and high RI layers 130A, 130B) and/or any additional coating (e.g., additional coating(s) not shown in FIGS. 1-1B) may be formed using various deposition methods, for example, chemical vapor deposition (e.g., plasma-enhanced chemical vapor deposition, low-pressure chemical vapor deposition, atmospheric pressure chemical vapor deposition, and plasma-enhanced atmospheric pressure chemical vapor deposition), physical vapor deposition (e.g., reactive or nonreactive sputtering or laser ablation), thermal or e-beam evaporation and/or atomic layer deposition. Liquid-based methods may also be used, for example, spraying or slot coating. Where vacuum deposition is utilized, inline processes may be used to form the optical film structure 130 and/or the additional coating in one deposition run. In some instances, the vacuum deposition can be made by a linear plasma-enhanced chemical vapor deposition source. In some implementations of the method, and articles 100 made according to the method, the optical film structure 130 can be prepared using a sputtering process (e.g., a reactive sputtering process), chemical vapor deposition process, plasma-enhanced chemical vapor deposition process, or some combination of these processes. In one implementation, an optical film structure 130 comprising low RI layer(s) 130A and high RI layer(s) 130B can be prepared according to a reactive sputtering process. According to some embodiments, the optical film structure 130 (including low RI layer 130A, high RI layer 130B and capping layer 130C) of the article 100 is fabricated using a metal-mode, reactive sputtering in a rotary drum coater. The reactive sputtering process conditions were defined through careful experimentation to achieve the desired combinations of hardness, refractive index, optical transparency, low color and controlled film stress.

Figure 3A:
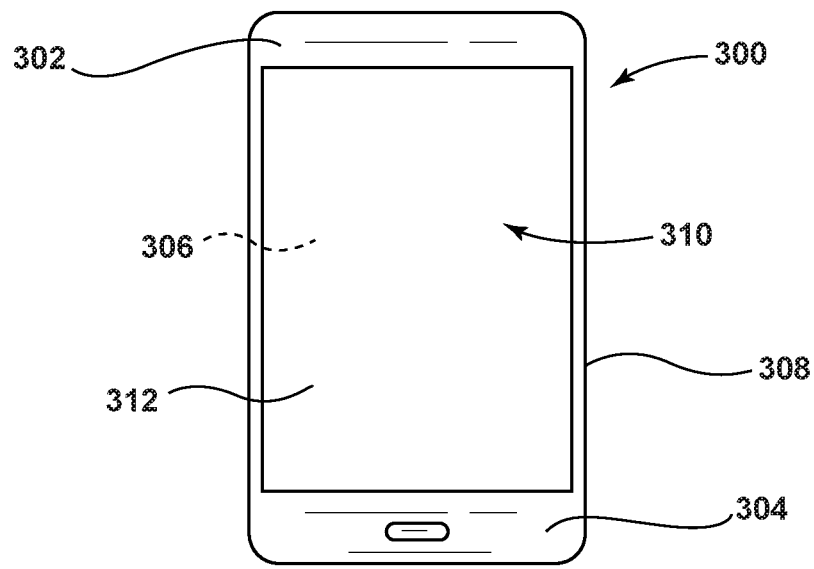
FIG. 3A is a plan view of an exemplary electronic device incorporating any of the articles disclosed herein.
Figure 3B:
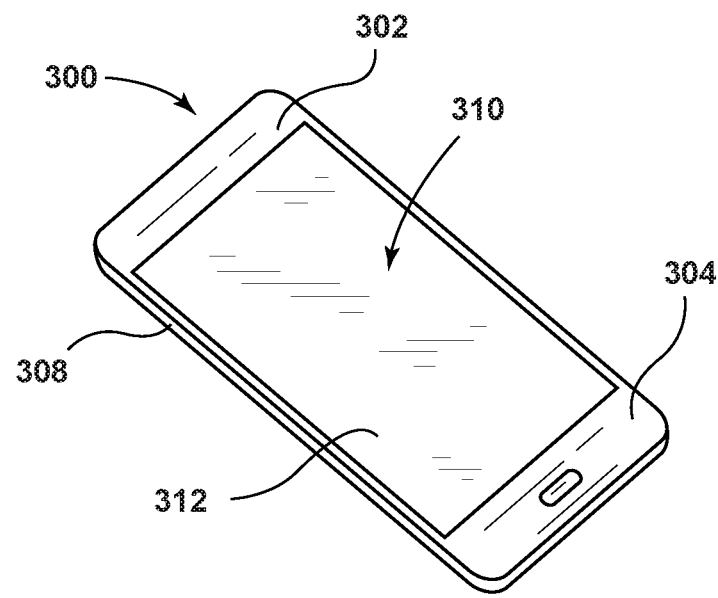
FIG. 3B is a perspective view of the exemplary electronic device of FIG. 2A.

The articles 100 disclosed herein (e.g., as shown in FIGS. 1-1B) may be incorporated into a hidden display device (e.g., consumer electronics, including mobile phones, tablets, computers, navigation systems, wearable devices (e.g., watches) and the like), augmented-reality displays, heads-up displays, glasses-based displays, architectural device articles, transportation device articles (e.g., automotive, trains, aircraft, sea craft, etc.), appliance device articles, or any device article that benefits from some transparency, scratch-resistance, abrasion resistance or a combination thereof. An exemplary 'hidden display' device article, such as a privacy screen, incorporating any of the articles disclosed herein (e.g., as consistent with the articles 100 depicted in FIGS. 1-1B, and FIGS. 2A and 2B) is shown in FIGS. 3A and 3B. Specifically, FIGS. 3A and 3B show a consumer electronic device 300 including a housing 302 having a front 304, a back 306, and side surfaces 308; electrical components (not shown) that are at least partially inside or entirely within the housing and including at least a controller, a memory, and a display 310 at or adjacent to the front surface of the housing; and a cover substrate 312 at or over the front surface of the housing such that it is over the display. In some embodiments, the cover substrate 312 may include any of the articles disclosed herein. In some embodiments, at least one of a portion of the housing or the cover glass comprises the articles disclosed herein.

Figure 4:
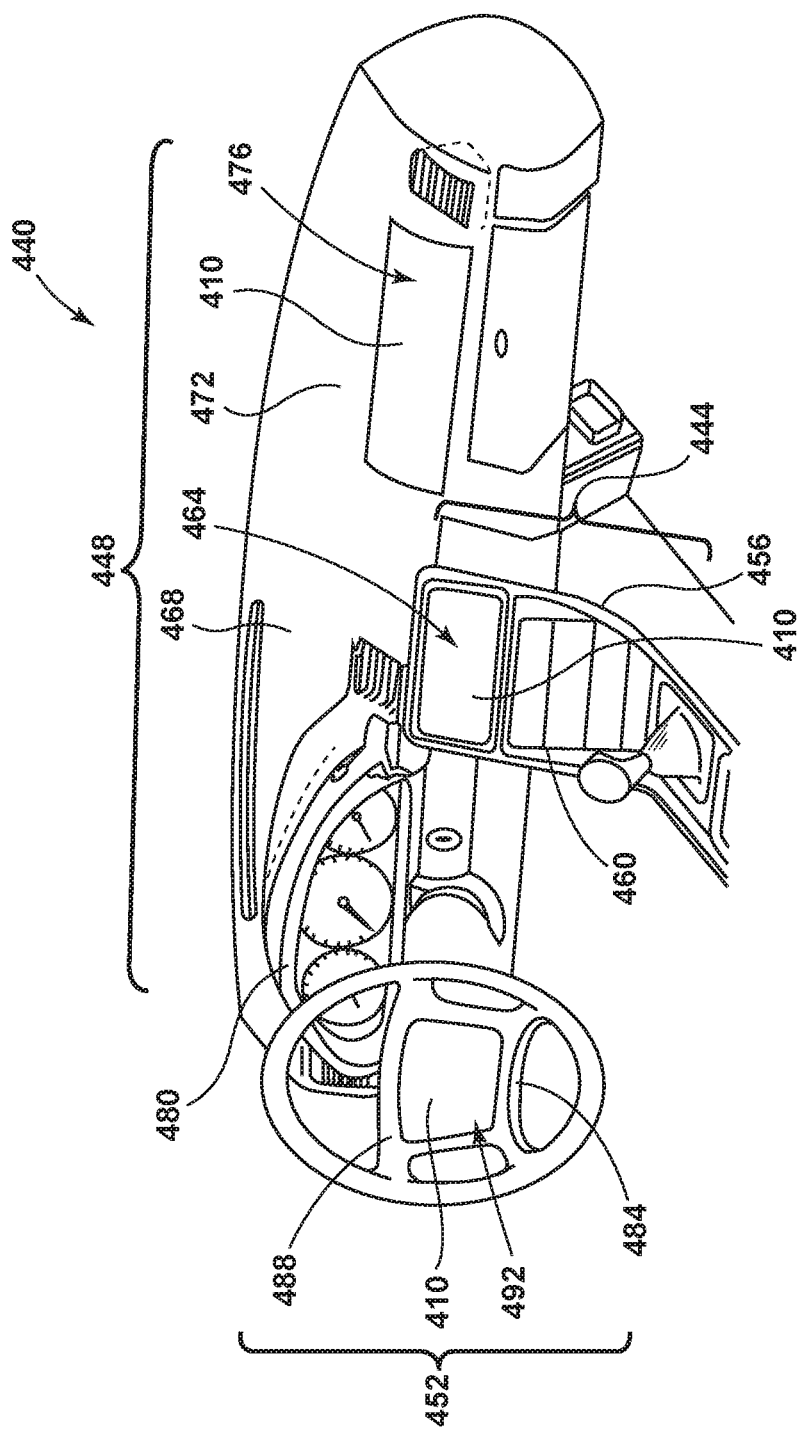
FIG. 4 is a perspective view of a vehicle interior with vehicular interior systems that may incorporate any of the articles disclosed herein.

According to some embodiments, the articles 100 (e.g., as shown in FIGS. 1-1B, and FIG. 2C) may be incorporated as a 'hidden display' device article within a vehicle interior with vehicular interior systems, e.g., as an aesthetics-oriented or dead-front display, as depicted in FIG. 4. More particularly, the article 100 may be used in conjunction with a variety of vehicle interior systems. A vehicle interior 440 is depicted that includes three different examples of a vehicle interior system 444, 448, 452. Vehicle interior system 444 includes a center console base 456 with a surface 460 including a display 464. Vehicle interior system 448 includes a dashboard base 468 with a surface 472 including a display 476. The dashboard base 468 typically includes an instrument panel 480 which may also include a display. Vehicle interior system 452 includes a dashboard steering wheel base 484 with a surface 488 and a display 492. In one or more examples, the vehicle interior system may include a base that is an armrest, a pillar, a seat back, a floor board, a headrest, a door panel, or any portion of the interior of a vehicle that includes a surface. It will be understood that the article 100 described herein can be used interchangeably in each of vehicle interior systems 444, 448 and 452.

Referring again to FIG. 4, the displays 464, 476 and 492 may each include a housing having front, back, and side surfaces. At least one electrical component is at least partially within the housing. A display element is at or adjacent to the front surface of the housings. The article 100 (see FIGS. 1-1B) is disposed over the display elements. It will be understood that the article 100 may also be used on, or in conjunction with, the armrest, the pillar, the seat back, the floor board, the headrest, the door panel, or any portion of the interior of a vehicle that includes a surface, as explained above. According to various examples, the displays 464, 476 and 492 may be a vehicle visual display system or vehicle infotainment system. It will be understood that the article 100 may be incorporated in a variety of displays and structural components of autonomous vehicles and that the description provided herein with relation to conventional vehicles is not limiting.

EXAMPLES

Various embodiments will be further clarified by the following examples.

Example 1

The as-fabricated samples of Example 1 ("Ex. 1") were formed by providing a glass substrate having a nominal composition of 69 mol. % $SiO_2$, 10 mol. % $Al_2O_3$, 15 mol. % $Na_2O$, and 5 mol % MgO and disposing an optical film structure having twenty-five (25) layers on the glass substrate, as shown in Table 1 below. As noted in Table 1, the optical film structure has 12 periods of alternating low RI layers ($SiO_2$) and high RI layers ($SiN_x$), a capping layer comprising $SiO_2$ and a scratch-resistant high RI layer ($SiN_x$, layer 24). Physical thicknesses (nm) and refractive index values (n at 550 nm) are also provided for each of the layers of the optical film structure. Further, the optical film structure (e.g., as consistent with the optical film structure 130 of the article 100 outlined in the disclosure as shown in FIGS. 1 and 1A) of each of the as-fabricated samples in this example was deposited using a reactive sputtering process.

Figure 5A:
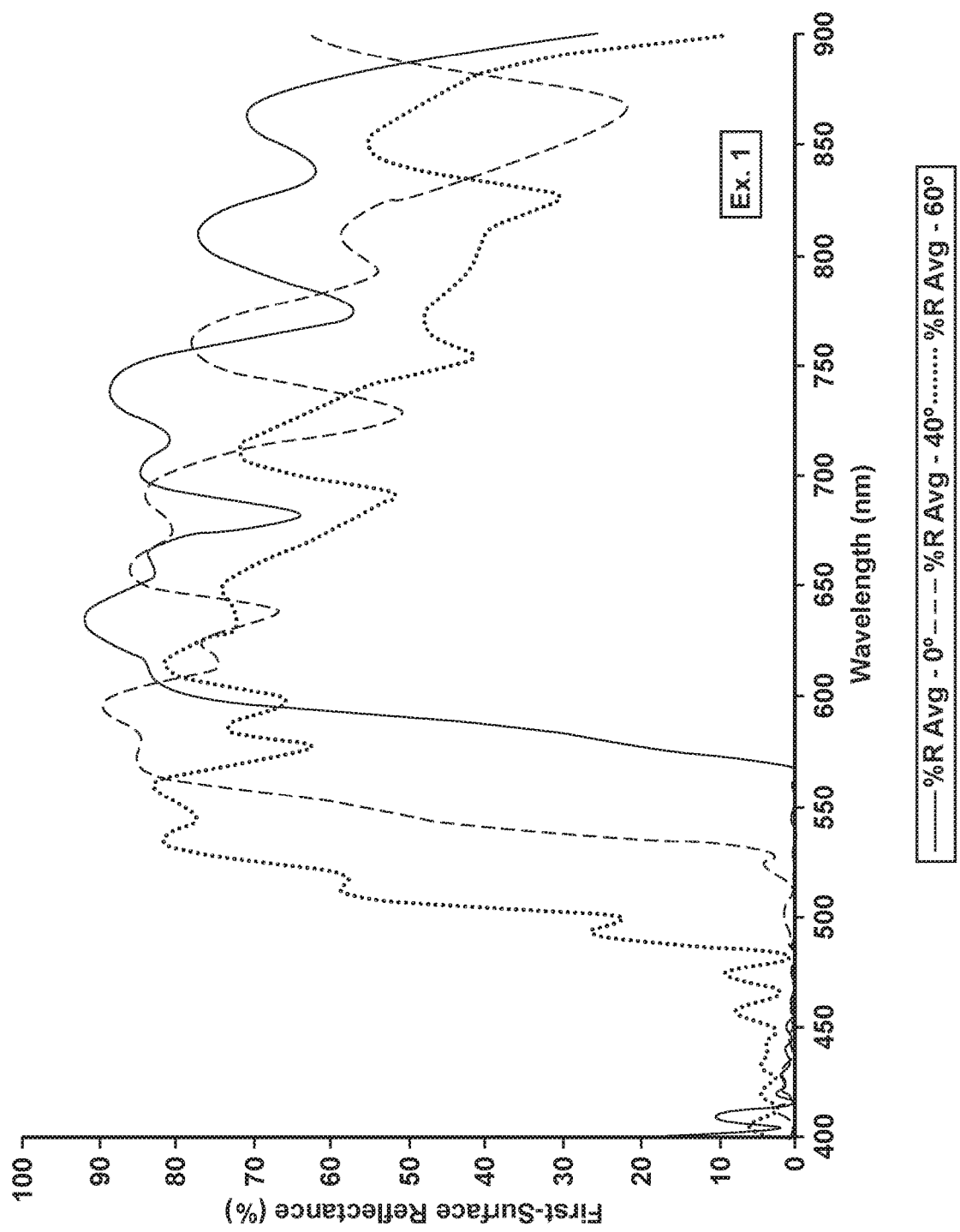
FIG. 5A is a plot of first-surface reflectance vs. wavelength of an article for a display device at incident angles of 0 degrees, 40 degrees and 60 degrees of non-polarized light, according to one or more embodiments.

Optical properties, including first-surface CIE color coordinates (a*, b*), reflectance and transmittance, of samples of Example 1 were also obtained, as shown in FIGS. 5A-5D. Referring to FIG. 5A, a plot is provided of first-surface reflectance vs. wavelength of an article for a display device from this example (Ex. 1) at incident angles of 0 degrees, 40 degrees and 60 degrees of non-polarized light. As is evident from this figure, the portion of the visible spectrum with high reflectance values increases in size (i.e., shifts to the left) as a function of increasing incident angle.

Figure 5B:
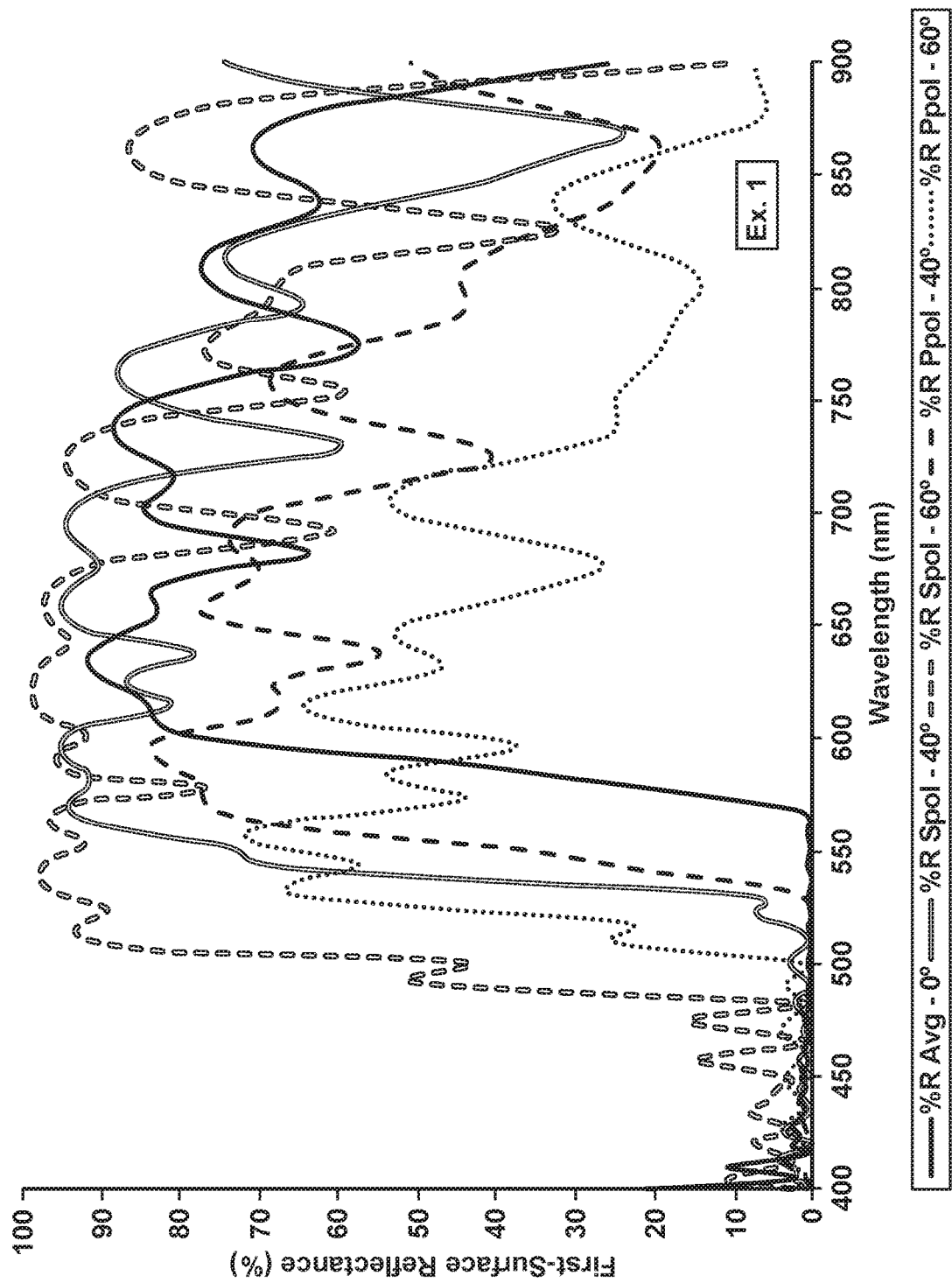
FIG. 5B is a plot of first-surface reflectance vs. wavelength of an article for a display device at an incident angle of 0 degrees of non-polarized light, and incident angles of 40 degrees and 60 degrees of s- and p-polarized light, according to one or more embodiments.
Figure 5C:
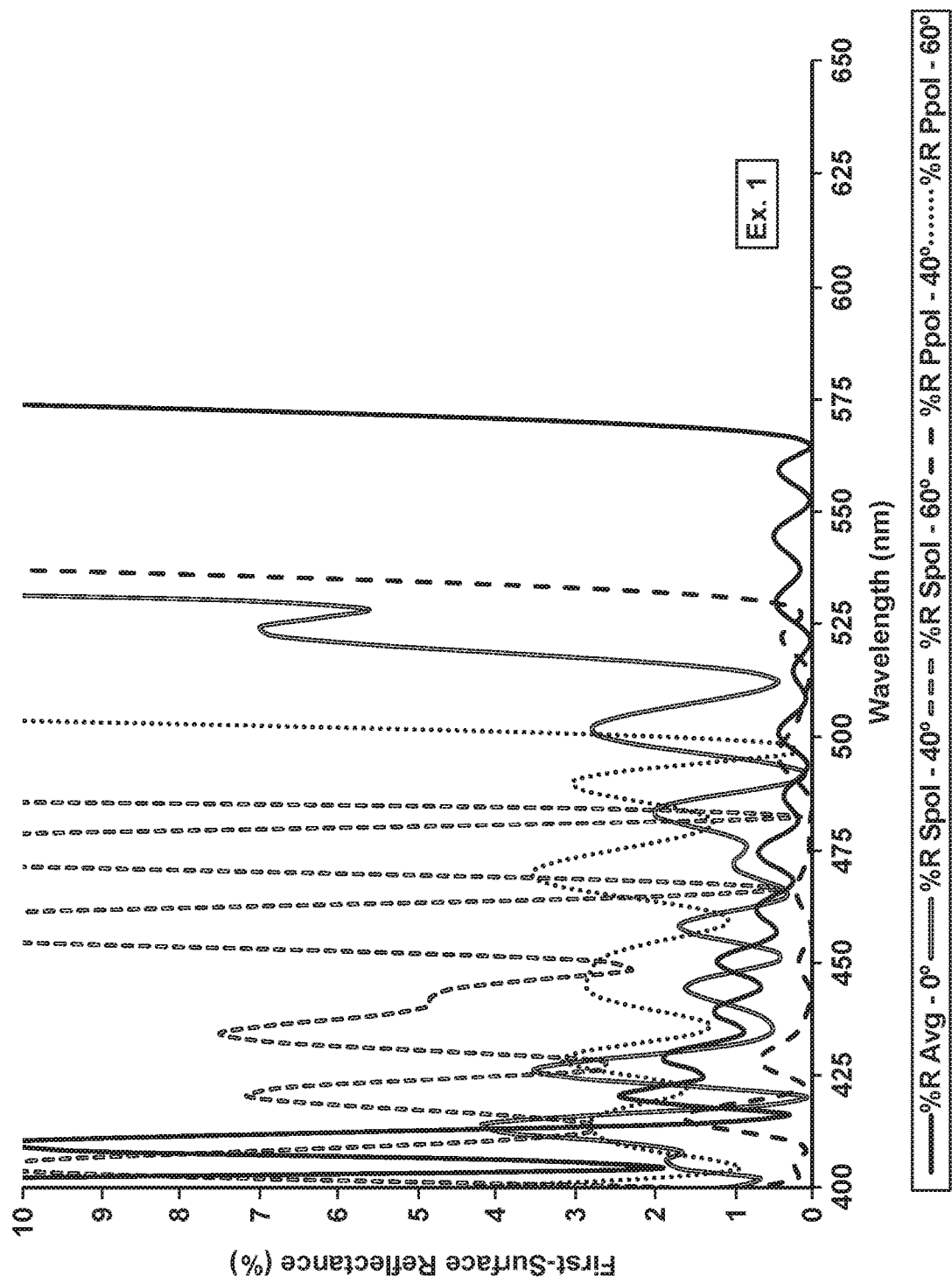
FIG. 5C is a shorter-wavelength and low reflectance portion of the plot depicted in FIG. 5B.

Referring now to FIG. 5B, a plot is provided of first-surface reflectance vs. wavelength of an article for a display device from this example (Ex. 1) at an incident angle of 0 degrees of non-polarized light, and incident angles of 40 degrees and 60 degrees of s- and p-polarized light. Combined with an appropriately oriented linearly polarized output from a display, s-polarized light can preferably be blocked from viewers to the left and right of the display (for a privacy application). As shown in FIG. 5B, the reflectance band reflects more than 75%, or more than 90%, of s-polarized light at selected wavelengths. For this example (Ex. 1), reflectance of s-polarized light exceeds 75% from about 560-720 nm at 40 degrees incidence and exceeds 75% from about 505-680 nm at 60 degrees incidence. Referring now to FIG. 5C, a shorter-wavelength and low reflectance portion of the plot depicted in FIG. 5B is provided. The measured reflectance is <1% for wavelengths from 460-565 nm at normal incidence and <0.5% from 480-560 nm wavelength at normal incidence. Further, the measured reflectance is <2% from about 425-570 nm at normal incidence.

Figure 5D:
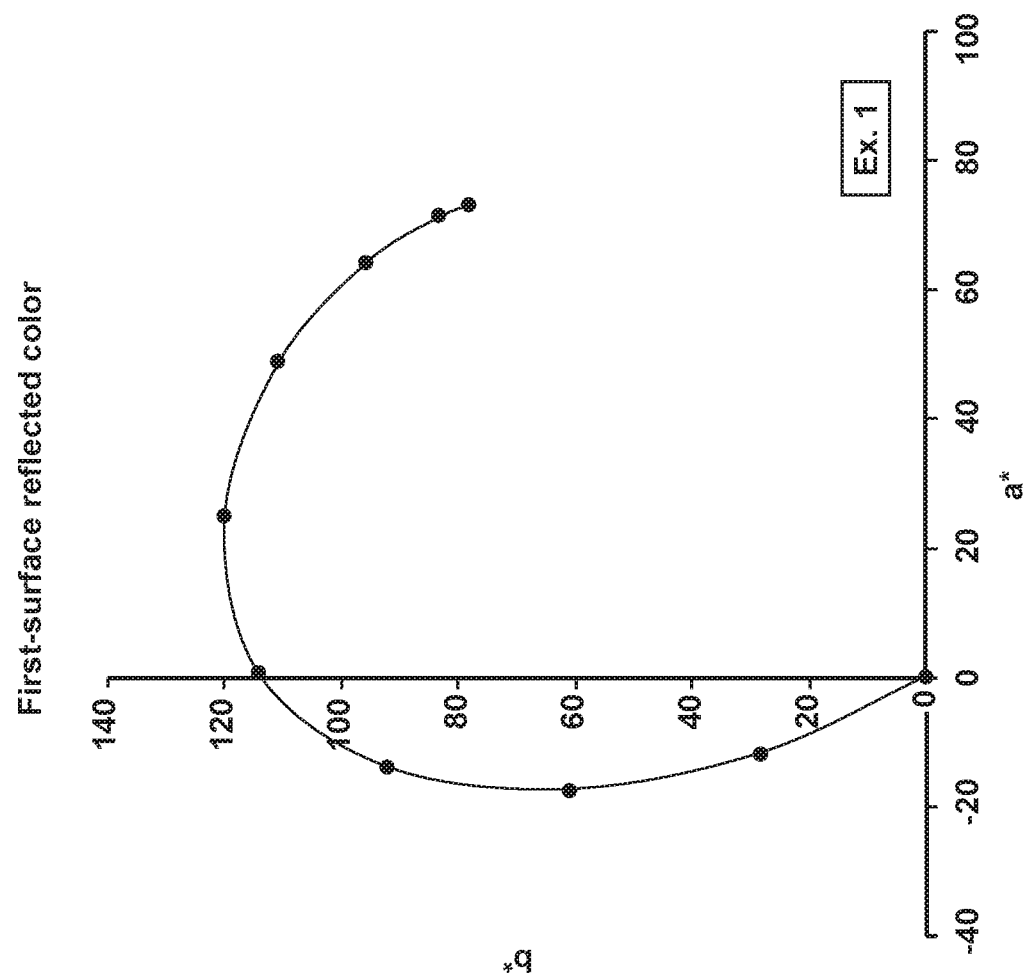
FIG. 5D is a plot of first-surface reflected color coordinates (a*, b*) of an article for a display device at incident angles from 0 degrees to 90 degrees, according to one or more embodiments.

Referring now to FIG. 5D, a plot is provided of first-surface reflected color coordinates (a*, b*) of an article for a display device from this example (Ex. 1) at incident angles from 0 degrees to 90 degrees, according to one or more embodiments. Each dot on the curve represents an increment of 10 degrees in viewing angle. As is evident form FIG. 5D, the CIE color coordinates (a*, b*) are indicative of high coloration, −20<a*<+80 and −5<b*<+120.

TABLE 1

Optical film structure (Ex. 1) with a single high-reflectance band, single low-reflectance band and high color for a hidden display device, e.g., a privacy screen

| Layer | Material Substrate | n (550 nm) 1.51 | Thickness (nm) ** |
|---|---|---|---|
| 1 | $SiO_2$ | 1.4762 | 146.33 |
| 2 | $SiN_x$ | 2.0135 | 115.06 |
| 3 | $SiO_2$ | 1.4762 | 89.47 |
| 4 | $SiN_x$ | 2.0135 | 39.33 |
| 5 | $SiO_2$ | 1.4762 | 21.23 |
| 6 | $SiN_x$ | 2.0135 | 50.47 |
| 7 | $SiO_2$ | 1.4762 | 48.56 |
| 8 | $SiN_x$ | 2.0135 | 97.7 |
| 9 | $SiO_2$ | 1.4762 | 120.91 |
| 10 | $SiN_x$ | 2.0135 | 78.42 |

TABLE 1-continued

Optical film structure (Ex. 1) with a single high-reflectance band, single low-reflectance band and high color for a hidden display device, e.g., a privacy screen

| Layer | Material Substrate | n (550 nm) 1.51 | Thickness (nm) ** |
|---|---|---|---|
| 11 | SiO$_2$ | 1.4762 | 111.19 |
| 12 | SiN$_x$ | 2.0135 | 83.67 |
| 13 | SiO$_2$ | 1.4762 | 111.6 |
| 14 | SiN$_x$ | 2.0135 | 83.44 |
| 15 | SiO$_2$ | 1.4762 | 119.3 |
| 16 | SiN$_x$ | 2.0135 | 103.52 |
| 17 | SiO$_2$ | 1.4762 | 177.8 |
| 18 | SiN$_x$ | 2.0135 | 110.11 |
| 19 | SiO$_2$ | 1.4762 | 121.05 |
| 20 | SiN$_x$ | 2.0135 | 98.33 |
| 21 | SiO$_2$ | 1.4762 | 120.93 |
| 22 | SiN$_x$ | 2.0135 | 13.31 |
| 23 | SiO$_2$ | 1.4762 | 19 |
| 24 | SiN$_x$ | 2.0135 | 2070 |
| 25 | SiO$_2$ | 1.4762 | 87 |
|  | Air | 1 |  |

Example 2

The as-fabricated samples of Example 2 ("Ex. 2") were formed by providing a glass substrate having a nominal composition of 69 mol. % SiO$_2$, 10 mol. % Al$_2$O$_3$, 15 mol. % Na$_2$O, and 5 mol. % MgO and disposing an optical film structure having forty-five (25) layers on the glass substrate, as shown in Table 2 below. As noted in Table 2, the optical film structure has 22 periods of alternating low RI layers (SiO$_2$) and high RI layers (SiN$_x$), a capping layer comprising SiO$_2$ and a scratch-resistant high RI layer (SiN$_x$, layer 40). Physical thicknesses (nm) and refractive index values (n at 550 nm) are also provided for each of the layers of the optical film structure. Further, the optical film structure (e.g., as consistent with the optical film structure 130 of the article 100 outlined in the disclosure as shown in FIGS. 1 and 1A) of each of the as-fabricated samples in this example was deposited using a reactive sputtering process.

Figure 6A:
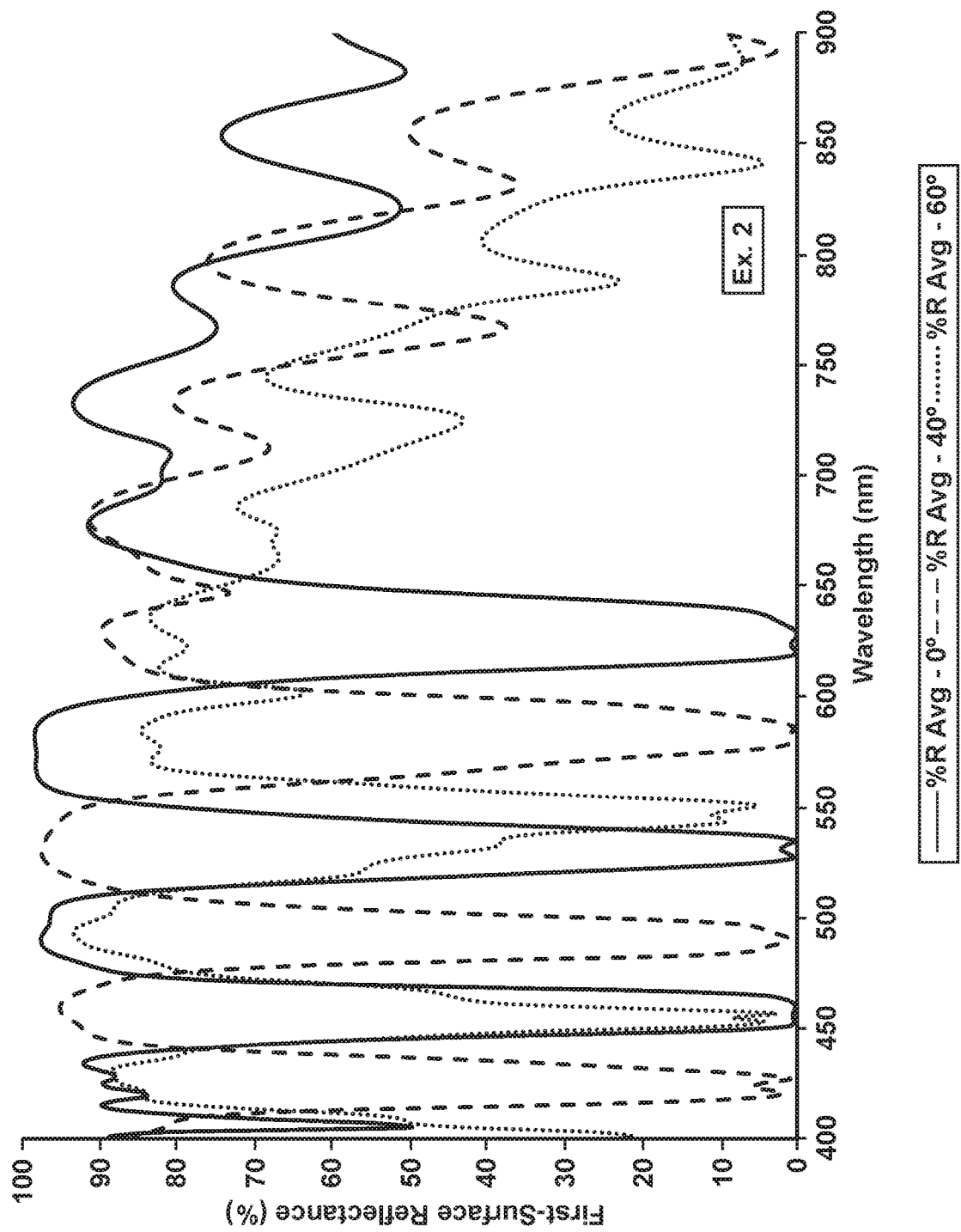
FIG. 6A is a plot of first-surface reflectance vs. wavelength of an article for a display device at incident angles of 0 degrees, 40 degrees and 60 degrees of non-polarized light, according to one or more embodiments.

Optical properties, including first-surface CIE color coordinates (a*, b*), reflectance and transmittance, of samples of Example 2 were also obtained, as shown in FIGS. 6A-6D. Referring to FIG. 6A, a plot is provided of first-surface reflectance vs. wavelength of an article for a display device from this example (Ex. 2) at incident angles of 0 degrees, 40 degrees and 60 degrees of non-polarized light. As is evident from this figure, the a linear average reflectance from 400 nm to 700 nm for non-polarized ambient light is from 63% to 66% for all incidence angles from 0 to 70 degrees.

Figure 6B:
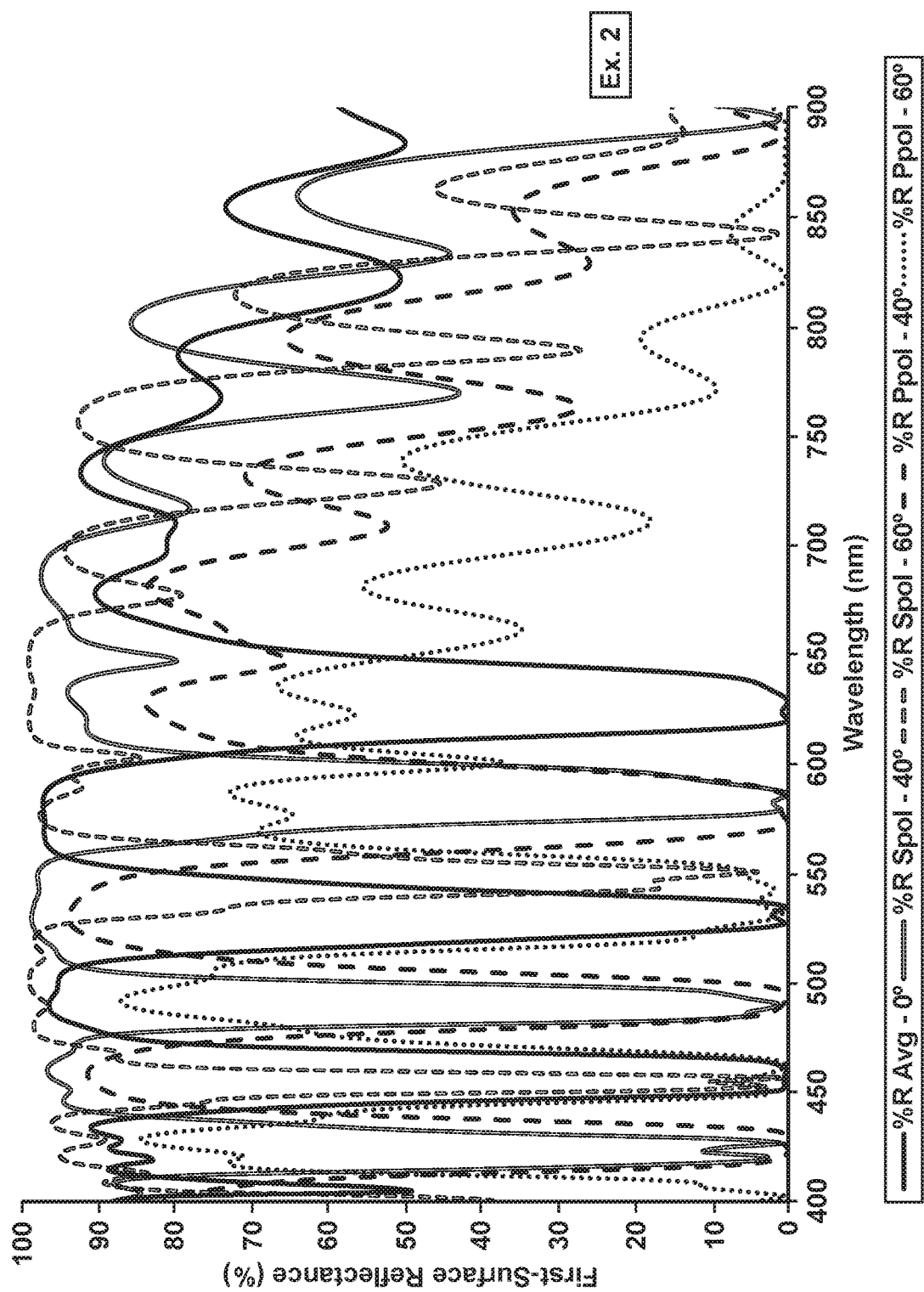
FIG. 6B is a plot of first-surface reflectance vs. wavelength of an article for a display device at an incident angle of 0 degrees of non-polarized light, and incident angles of 40 degrees and 60 degrees of s- and p-polarized light, according to one or more embodiments.
Figure 6C:
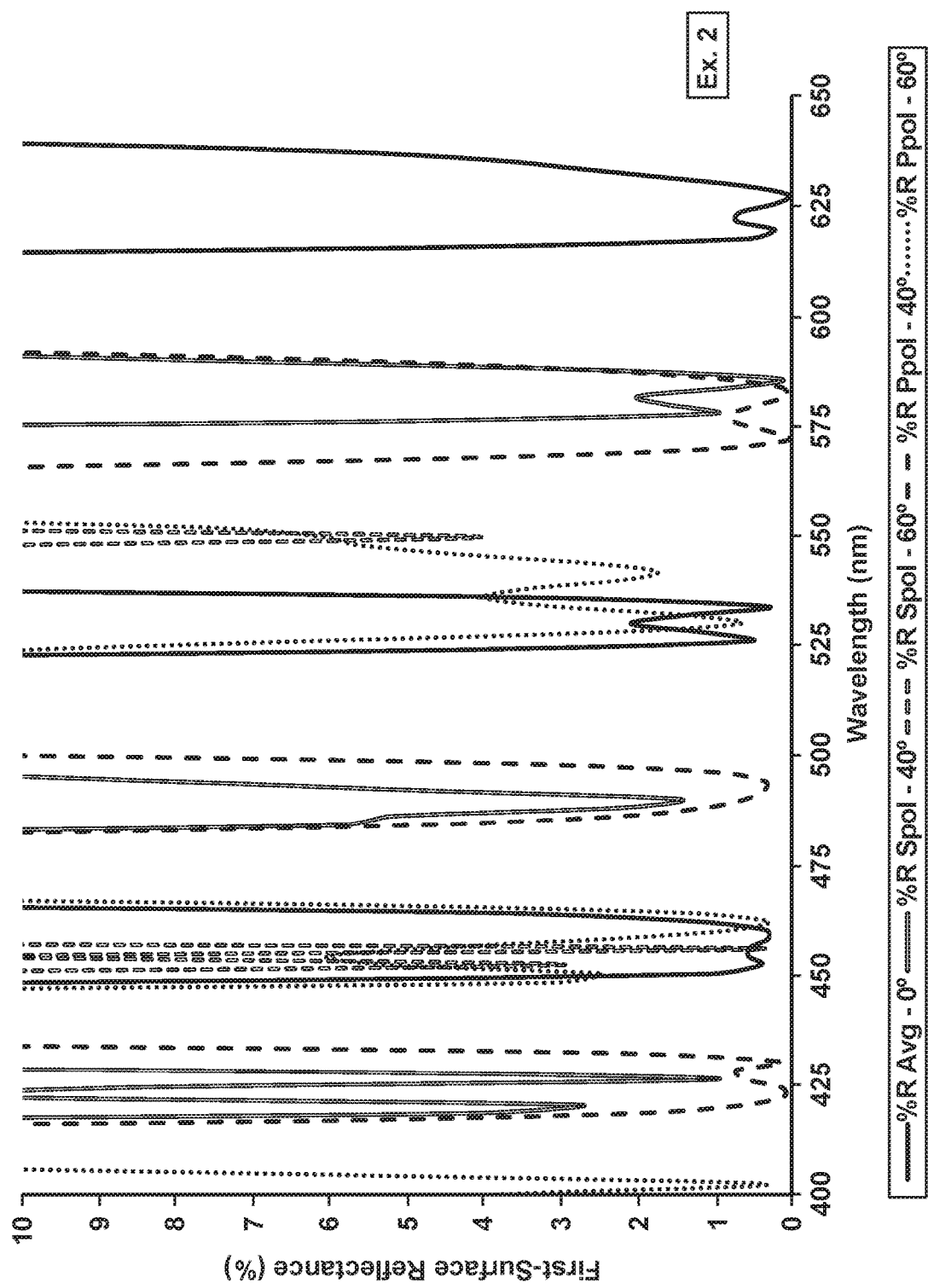
FIG. 6C is a shorter-wavelength and low reflectance portion of the plot depicted in FIG. 6B.

Referring now to FIG. 6B, a plot is provided of first-surface reflectance vs. wavelength of an article for a display device from this example (Ex. 2) at an incident angle of 0 degrees of non-polarized light, and incident angles of 40 degrees and 60 degrees of s- and p-polarized light. At normal incidence, the optical film structure has high transmittance (>90%) and low reflectance (<2.5%) in three distinct bands: 450-464 nm (blue), 524-536 nm (green), and 616-638 nm (red). In these same wavelength bands, the linear average s-polarized transmittance at 40 degrees incidence drops to <1.25%, <0.75%, and <7.0% for the blue, green, and red bands, respectively. Linear average reflectance in these wavelength bands for s-polarized light at 40 degrees incidence is >95.5%, >98.5%, and >92% for the blue, green, and red bands, respectively. Referring now to FIG. 6C, a shorter-wavelength and low reflectance portion of the plot depicted in FIG. 6B is provided. As is evident from FIG. 6C, at normal incidence (0 degrees), the reflectance is <4%, <2.5% or even <1% in three wavelength bands: 450-464 nm (blue), 524-536 nm (green), and 616-638 nm (red).

Figure 6D:
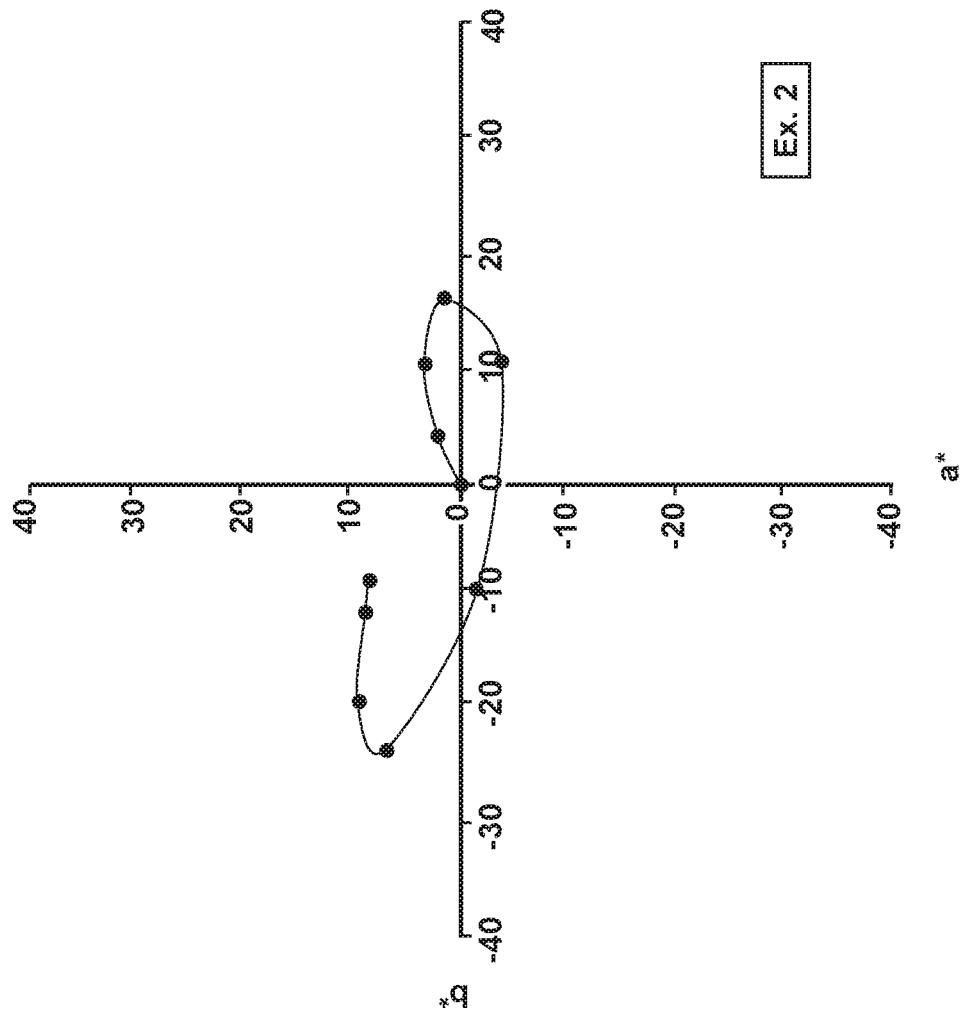
FIG. 6D is a plot of first-surface reflected color coordinates (a*, b*) of an article for a display device at incident angles from 0 degrees to 90 degrees, according to one or more embodiments.

Referring now to FIG. 6D, a plot is provided of first-surface reflected color coordinates (a*, b*) of an article for a display device from this example (Ex. 2) at incident angles from 0 degrees to 90 degrees, according to one or more embodiments. Each dot on the curve represents an increment of 10 degrees in viewing angle. As is evident form FIG. 6D, the CIE color coordinates (a*, b*) are indicative of medium coloration, −30<a*<+20 and −10<b*<+10.

TABLE 2

Optical film structure (Ex. 2) with multiple (4) high-reflectance bands, multiple (3) low-reflectance bands and medium color for a hidden display device, e.g., a privacy screen

| Layer | Material Substrate | n(550) 1.51 | Thickness (nm) ** |
|---|---|---|---|
| 1 | SiO$_2$ | 1.4762 | 85.74 |
| 2 | SiN$_x$ | 2.0135 | 62.23 |
| 3 | SiO$_2$ | 1.4762 | 78.24 |
| 4 | SiN$_x$ | 2.0135 | 25.02 |
| 5 | SiO$_2$ | 1.4762 | 51.04 |
| 6 | SiN$_x$ | 2.0135 | 57.88 |
| 7 | SiO$_2$ | 1.4762 | 78.94 |
| 8 | SiN$_x$ | 2.0135 | 59.67 |
| 9 | SiO$_2$ | 1.4762 | 18.68 |
| 10 | SiN$_x$ | 2.0135 | 47.06 |
| 11 | SiO$_2$ | 1.4762 | 83.41 |
| 12 | SiN$_x$ | 2.0135 | 59.09 |
| 13 | SiO$_2$ | 1.4762 | 69.07 |
| 14 | SiN$_x$ | 2.0135 | 47.32 |
| 15 | SiO$_2$ | 1.4762 | 81.19 |
| 16 | SiN$_x$ | 2.0135 | 65.5 |
| 17 | SiO$_2$ | 1.4762 | 98.03 |
| 18 | SiN$_x$ | 2.0135 | 84.21 |
| 19 | SiO$_2$ | 1.4762 | 117.57 |
| 20 | SiN$_x$ | 2.0135 | 80.31 |
| 21 | SiO$_2$ | 1.4762 | 131.15 |
| 22 | SiN$_x$ | 2.0135 | 77.16 |
| 23 | SiO$_2$ | 1.4762 | 94.71 |
| 24 | SiN$_x$ | 2.0135 | 63.26 |
| 25 | SiO$_2$ | 1.4762 | 74.85 |
| 26 | SiN$_x$ | 2.0135 | 49.63 |
| 27 | SiO$_2$ | 1.4762 | 83.37 |
| 28 | SiN$_x$ | 2.0135 | 66.86 |
| 29 | SiO$_2$ | 1.4762 | 99.26 |
| 30 | SiN$_x$ | 2.0135 | 78.81 |
| 31 | SiO$_2$ | 1.4762 | 139.12 |
| 32 | SiN$_x$ | 2.0135 | 131.44 |
| 33 | SiO$_2$ | 1.4762 | 187.33 |
| 34 | SiN$_x$ | 2.0135 | 75.94 |
| 35 | SiO$_2$ | 1.4762 | 110.96 |
| 36 | SiN$_x$ | 2.0135 | 80.73 |
| 37 | SiO$_2$ | 1.4762 | 224.1 |
| 38 | SiN$_x$ | 2.0135 | 36.47 |
| 39 | SiO$_2$ | 1.4762 | 178.99 |
| 40 | SiN$_x$ | 2.0135 | 2000 |
| 41 | SiO$_2$ | 1.4762 | 9 |
| 42 | SiN$_x$ | 2.0135 | 46.3 |
| 43 | SiO$_2$ | 1.4762 | 16.6 |
| 44 | SiN$_x$ | 2.0135 | 150.2 |
| 45 | SiO$_2$ | 1.4762 | 90.5 |
|  | Air | 1 |  |

Example 3

The as-fabricated samples of Example 3 ("Ex. 3") were formed by providing a glass substrate having a nominal composition of 69 mol. % SiO$_2$, 10 mol. % Al$_2$O$_3$, 15 mol. % Na$_2$O, and 5 mol. % MgO and disposing an optical film structure having thirteen (13) layers on the glass substrate, as shown in Table 3 below. As noted in Table 3, the optical film structure has 6 periods of alternating low RI layers ($SiO_2$) and high RI layers ($SiN_x$), a capping layer comprising $SiO_2$ and a scratch-resistant high RI layer ($SiN_x$, layer 8). Physical thicknesses (nm) and refractive index values (n at 550 nm) are also provided for each of the layers of the optical film structure. Further, the optical film structure (e.g., as consistent with the optical film structure 130 of the article 100 outlined in the disclosure as shown in FIGS. 1 and 1A) of each of the as-fabricated samples in this example was deposited using a reactive sputtering process.

Figure 7A:
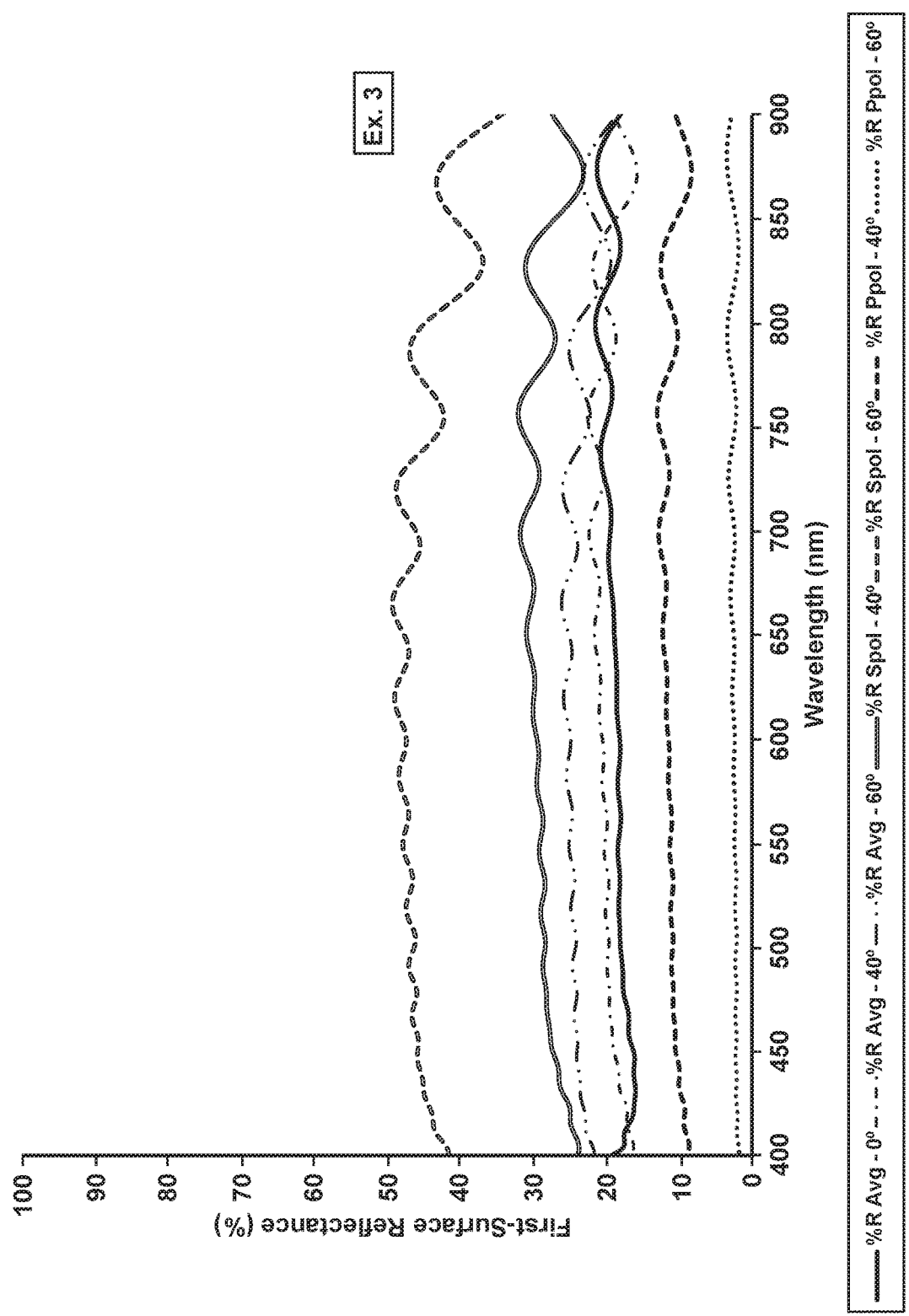
FIG. 7A is a plot of first-surface reflectance vs. wavelength of an article for a display device at an incident angle of 0 degrees of non-polarized light, and incident angles of 40 degrees and 60 degrees of non-polarized, s-polarized light and p-polarized light, according to one or more embodiments.
Figure 7B:
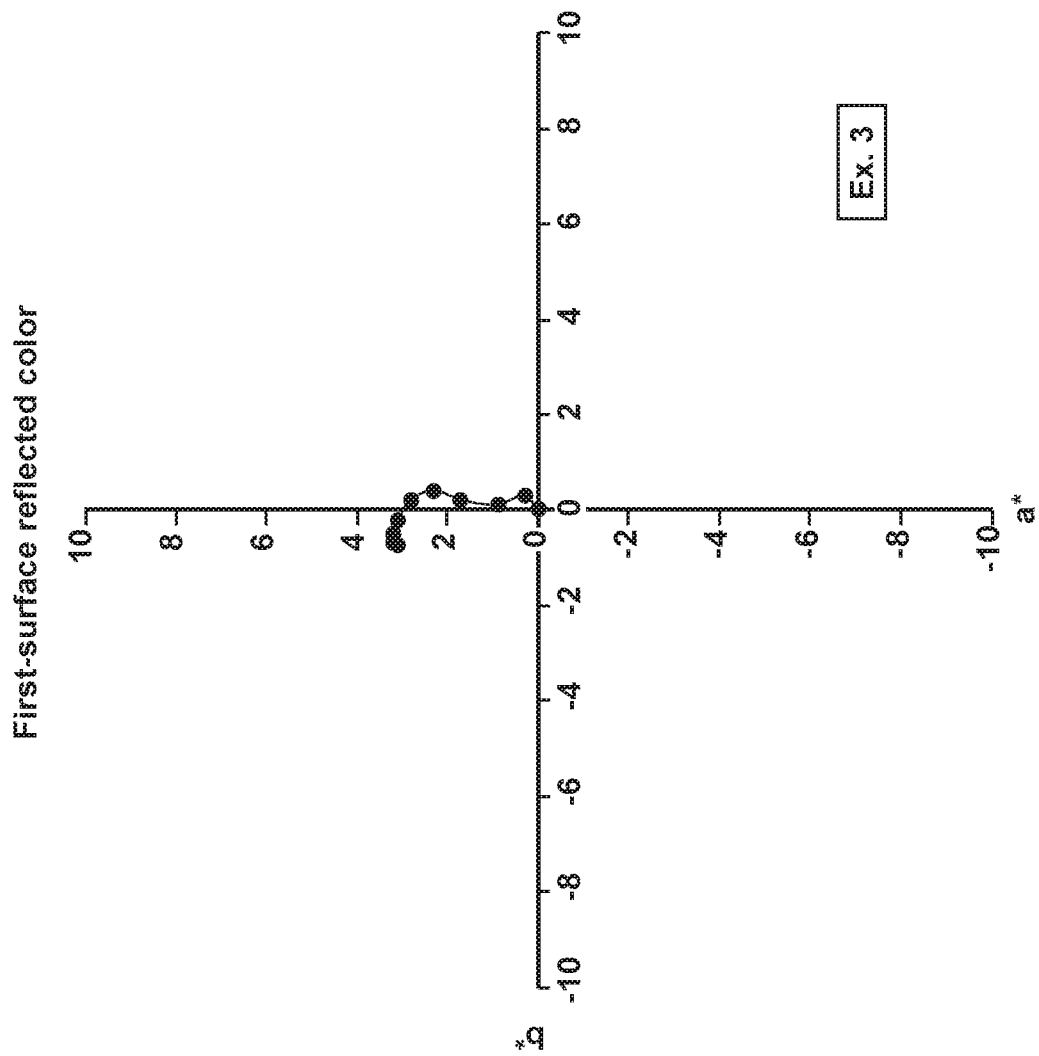
FIG. 7B is a plot of first-surface reflected color coordinates (a*, b*) of an article for a display device at incident angles from 0 degrees to 90 degrees, according to one or more embodiments.

Optical properties, including first-surface CIE color coordinates (a\*, b\*) and reflectance, of samples of Example 3 were also obtained, as shown in FIGS. 7A and 7B. Referring to FIG. 7A, a plot is provided of first-surface reflectance vs. wavelength of an article for a display device from this example (Ex. 3) at an incident angle of 0 degrees of non-polarized light, and incident angles of 40 degrees and 60 degrees of non-polarized, s-polarized light and p-polarized light. As is evident from FIG. 7A, this design has the advantage of lower color, with the disadvantage of less display hiding power due to lower average reflectance. However, this example is well suited for a multi-viewer hidden display, such as a dead-front display with a metallic appearance, due to the low reflectance and high transmittance of p-polarized light at high angles.

Referring now to FIG. 7B, a plot is provided of first-surface reflected color coordinates (a\*, b\*) of an article for a display device from this example (Ex. 3) at incident angles from 0 degrees to 90 degrees, according to one or more embodiments. Each dot on the curve represents an increment of 10 degrees in viewing angle. As is evident form FIG. 7B, the CIE color coordinates (a\*, b\*) are indicative of low coloration, $-1<a^*<+1$ and $-1<b^*<+4$.

TABLE 3

Optical film structure (Ex. 3) with a single, broad reflectance band and low color for a hidden display device, e.g., a dead-front or aesthetics-oriented display

| Layer | Material Substrate | n (550 nm) 1.51 | Thickness (nm) |
|---|---|---|---|
| 1 | $SiO_2$ | 1.4762 | 20 |
| 2 | $SiN_x$ | 2.0135 | 9.16 |
| 3 | $SiO_2$ | 1.4762 | 53.76 |
| 4 | $SiN_x$ | 2.0135 | 25.67 |
| 5 | $SiO_2$ | 1.4762 | 30.26 |
| 6 | $SiN_x$ | 2.0135 | 44.2 |
| 7 | $SiO_2$ | 1.4762 | 8.57 |
| 8 | $SiN_x$ | 2.0135 | 2000 |
| 9 | $SiO_2$ | 1.4762 | 19.8 |
| 10 | $SiN_x$ | 2.0135 | 29.09 |
| 11 | $SiO_2$ | 1.4762 | 174.22 |
| 12 | $SiN_x$ | 2.0135 | 49.57 |
| 13 | $SiO_2$ | 1.4762 | 10 |
|  | Air | 1 |  |

Example 4

The as-fabricated samples of Example 4 ("Ex. 4") were formed by providing a glass substrate having a nominal composition of 69 mol. % $SiO_2$, 10 mol. % $Al_2O_3$, 15 mol. % $Na_2O$, and 5 mol. % MgO and disposing an optical film structure having twenty (20) layers on the glass substrate, as shown in Table 4 below. As noted in Table 4, the optical film structure has 10 periods of alternating low RI layers ($SiO_2$) and high RI layers ($SiN_x$) and a scratch-resistant high RI layer ($SiO_xN_y$, layer 19). In this design, the reflective layers are buried under the thickest, scratch-resistant layer to maximize scratch resistance and minimize reflectance and color change when scratches and damage does occur. Physical thicknesses (nm) and refractive index values (n at 550 nm) are also provided for each of the layers of the optical film structure. Further, the optical film structure (e.g., as consistent with the optical film structure 130 of the article 100 outlined in the disclosure as shown in FIGS. 1 and 1B) of each of the as-fabricated samples in this example was deposited using a reactive sputtering process.

Figure 8A:
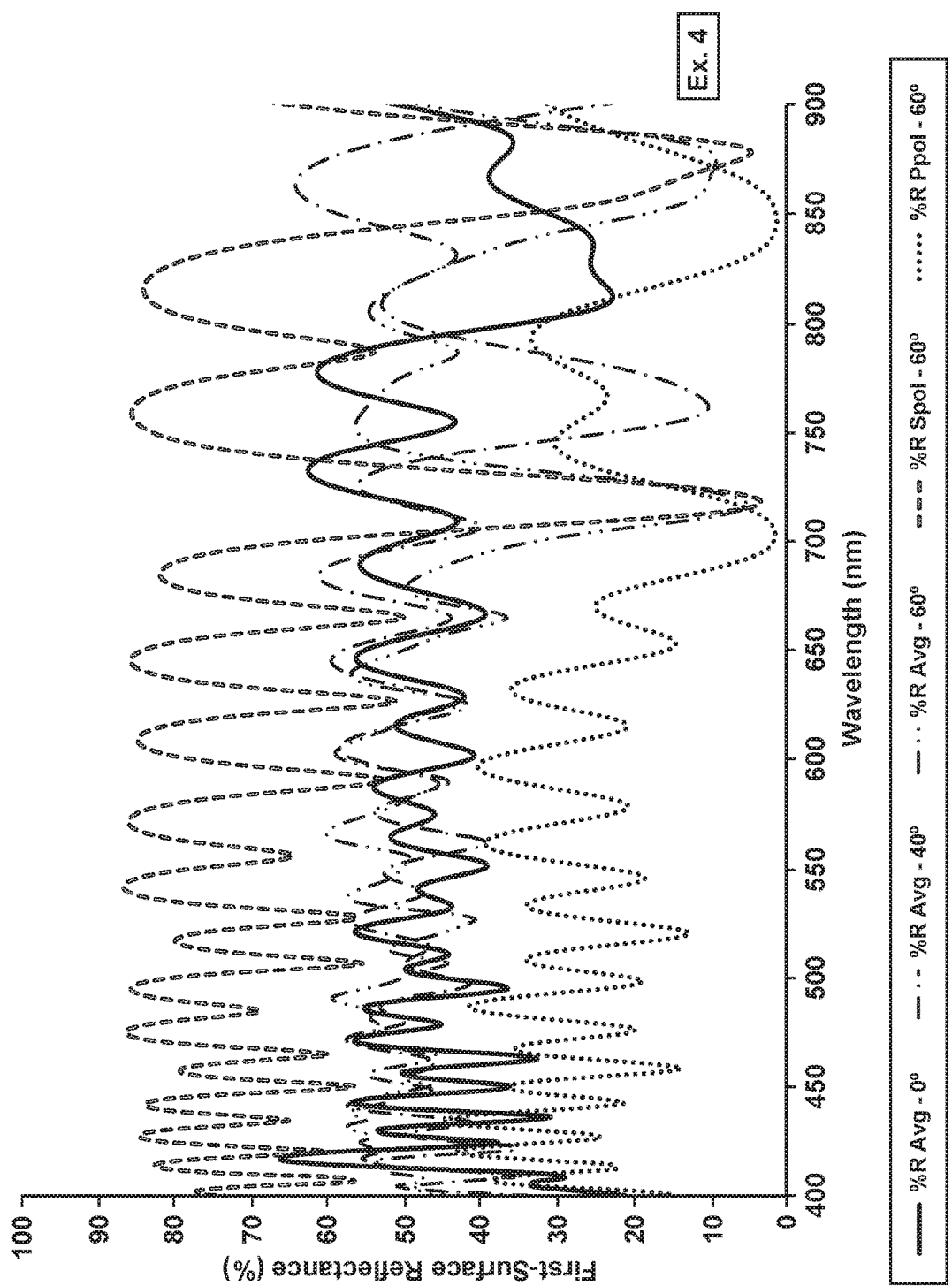
FIG. 8A is a plot of first-surface reflectance vs. wavelength of an article for a display device at an incident angle of 0 degrees of non-polarized light, and incident angles of 40 degrees and 60 degrees of non-polarized, s-polarized light and p-polarized light, according to one or more embodiments.
Figure 8B:
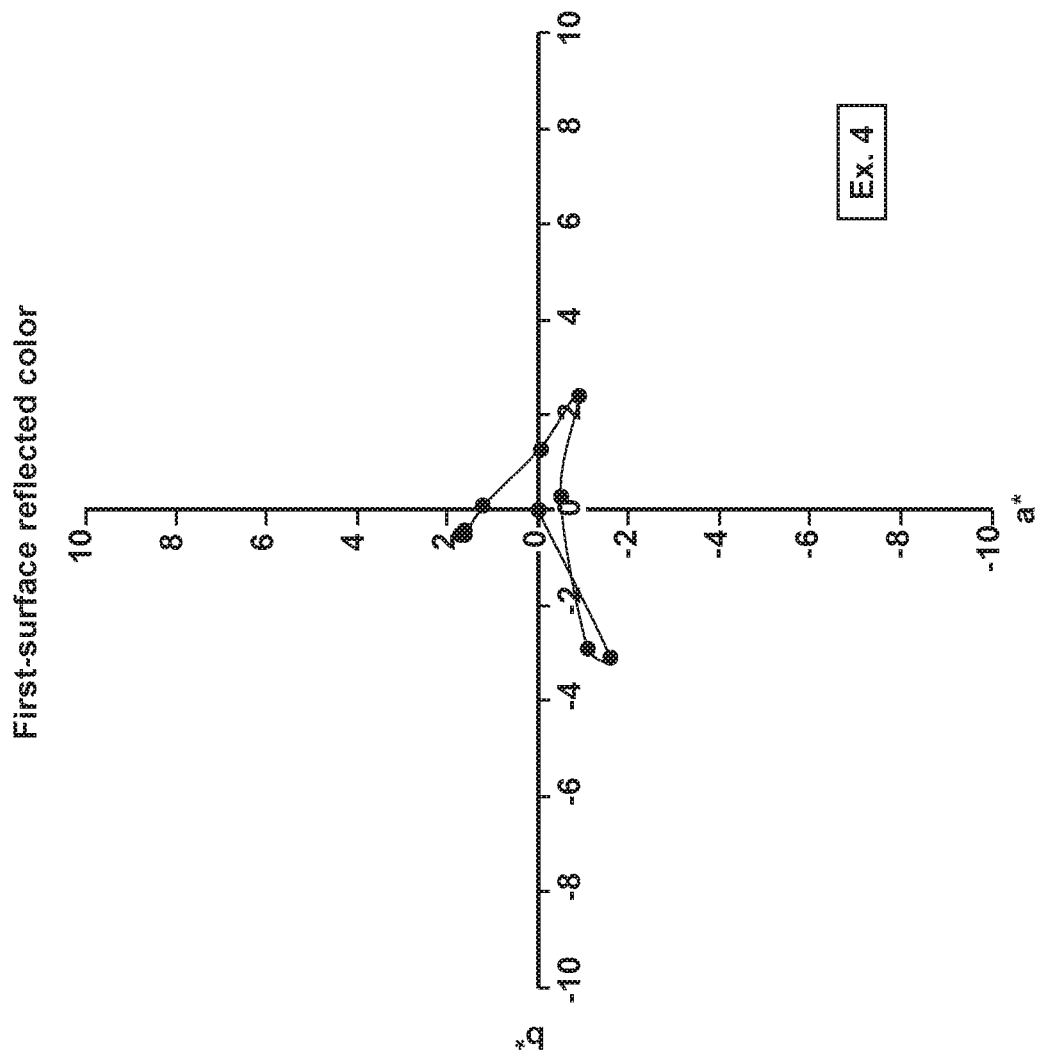
FIG. 8B is a plot of first-surface reflected color coordinates (a*, b*) of an article for a display device at incident angles from 0 degrees to 90 degrees, according to one or more embodiments.

Optical properties, including first-surface CIE color coordinates (a\*, b\*) and reflectance, of samples of Example 4 were also obtained, as shown in FIGS. 8A and 8B. Referring to FIG. 8A, a plot is provided of first-surface reflectance vs. wavelength of an article for a display device from this example (Ex. 4) at an incident angle of 0 degrees of non-polarized light, and incident angles of 40 degrees and 60 degrees of non-polarized, s-polarized light and p-polarized light. As is evident from FIG. 8A, this design has the advantage of low color (neutral/silver color) and relatively high display hiding, with the disadvantage of less display transmittance due to relatively high reflectance at normal incidence viewing angles. However, this example is well suited for some applications, such as a 'mirror display' or dead-front applications where high display brightness can overcome external reflections when the display is turned on.

Referring now to FIG. 8B, a plot is provided of first-surface reflected color coordinates (a\*, b\*) of an article for a display device from this example (Ex. 4) at incident angles from 0 degrees to 90 degrees, according to one or more embodiments. Each dot on the curve represents an increment of 10 degrees in viewing angle. As is evident form FIG. 8B, the CIE color coordinates (a\*, b\*) are indicative of low or neutral coloration, $-4<a^*<+3$ and $-2<b^*<+2$.

TABLE 4

Optical film structure (Ex. 4) with a single, broad reflectance band and low color for a hidden display device, e.g., a dead-front or aesthetics-oriented display

| Layer | Material Substrate | n (550 nm) 1.51 | Thickness (nm) |
|---|---|---|---|
| 1 | $SiN_x$ | 2.014 | 146.1 |
| 2 | $SiO_2$ | 1.476 | 118.9 |
| 3 | $SiN_x$ | 2.014 | 45.7 |
| 4 | $SiO_2$ | 1.476 | 70.2 |
| 5 | $SiN_x$ | 2.014 | 52.6 |
| 6 | $SiO_2$ | 1.476 | 113.6 |
| 7 | $SiN_x$ | 2.014 | 41.8 |
| 8 | $SiO_2$ | 1.476 | 150.3 |
| 9 | $SiN_x$ | 2.014 | 48.5 |
| 10 | $SiO_2$ | 1.476 | 144.9 |
| 11 | $SiN_x$ | 2.014 | 59.5 |
| 12 | $SiO_2$ | 1.476 | 171.6 |
| 13 | $SiN_x$ | 2.014 | 43.6 |
| 14 | $SiO_2$ | 1.476 | 167.5 |
| 15 | $SiN_x$ | 2.014 | 103.0 |
| 16 | $SiO_2$ | 1.476 | 178.4 |
| 17 | $SiN_x$ | 2.014 | 137.3 |
| 18 | $SiO_2$ | 1.476 | 183.4 |
| 19 | $SiO_xN_y$ | 1.943 | 2000.0 |
| 20 | $SiO_2$ | 1.476 | 93.9 |
|  | Air | 1 |  |

Many variations and modifications may be made to the above-described embodiments of the disclosure without departing substantially from the spirit and various principles of the disclosure. All such modifications and variations are intended to be included herein within the scope of this disclosure and protected by the following claims. For example, the various features of the disclosure may be combined according to the following embodiments.

Embodiment 1. An article for a display device, comprising: a translucent substrate comprising opposing major surfaces; and an optical film structure disposed on a first major surface of the substrate, the optical film structure comprising an outer surface opposing the first major surface and a plurality of periods such that each period comprises an alternating low refractive index layer and high refractive index layer, wherein each high refractive index layer has a refractive index of greater than 1.9 and each low refractive index layer has a refractive index of less than 1.7, wherein the article exhibits a hardness of 10 GPa or greater measured at an indentation depth of about 100 nm, the hardness measured by a Berkovich Indenter Hardness Test, wherein the article exhibits a single side average photopic light reflectance of at least 50% of non-polarized light as measured at the outer surface from near-normal incidence to an incident angle of 60 degrees over a portion of at least 10 nm within the visible spectrum from 400 nm to 700 nm, wherein the article further exhibits a single side average photopic reflectance of greater than 30% of s-polarized light emitted from the display device at incident angles from 40 degrees to 60 degrees over a portion of at least 10 nm within the visible spectrum from 400 nm to 700 nm, wherein the plurality of periods is at least five (5) periods, and further wherein each low refractive index layer comprises $SiO_2$ or doped-$SiO_2$ and each high refractive index layer comprises $AlO_xN_y$, $SiO_xN_y$, $Si_uAl_vO_xN_y$, $SiN_x$ or $ZrO_2$.

Embodiment 2. The article according to Embodiment 1, wherein the article exhibits a single side average photopic light reflectance of at least 70% of non-polarized light as measured at the outer surface from near-normal incidence to an incident angle of 60 degrees over a portion of at least 10 nm within the visible spectrum from 400 nm to 700 nm.

Embodiment 3. The article according to Embodiment 1 or Embodiment 2, wherein the article further exhibits a single side average photopic reflectance of greater than 50% of s-polarized light emitted from the display device at incident angles from 40 degrees to 60 degrees over a portion of at least 10 nm within the visible spectrum from 400 nm to 700 nm.

Embodiment 4. The article according to Embodiment 1 or Embodiment 2, wherein the article further exhibits a single side average photopic reflectance of greater than 75% of s-polarized light emitted from the display device at incident angles from 40 degrees to 60 degrees over a portion of at least 10 nm within the visible spectrum from 400 nm to 700 nm.

Embodiment 5. The article according to Embodiment 1 or Embodiment 2, wherein the article further exhibits a single side average photopic reflectance of greater than 90% of s-polarized light emitted from the display device at incident angles from 40 degrees to 60 degrees over a portion of at least 10 nm within the visible spectrum from 400 nm to 700 nm.

Embodiment 6. The article according to any one of Embodiments 1-5, wherein the article further exhibits a single side average photopic transmittance of less than 20% of s-polarized light emitted from the display device at incident angles from 40 degrees to 60 degrees over a portion of at least 10 nm within the visible spectrum from 400 nm to 700 nm.

Embodiment 7. The article according to any one of Embodiments 1-6, wherein the article exhibits a hardness of 14 GPa or greater measured at an indentation depth of about 100 nm, the hardness measured by a Berkovich Indenter Hardness Test.

Embodiment 8. The article according to any one of Embodiments 1-7, wherein the article further exhibits reflectance color coordinates at the outer surface from 0 degrees to 90 degrees in the (L*, a*, b*) colorimetry system such that $-20<a*<+80$ and $-5<b*<+130$.

Embodiment 9. The article according to any one of Embodiments 1-8, wherein the optical film structure comprises a physical thickness from 1000 nm to 5000 nm, and further wherein the plurality of periods is from ten (10) periods to fifteen (15) periods.

Embodiment 10. The article according to any one of Embodiments 1-9, wherein the optical film structure comprises a scratch resistant layer of $AlO_xN_y$, $SiO_xN_y$ or $SiN_x$ having a physical thickness from 1500 nm to 3000 nm.

Embodiment 11. A consumer electronic product, comprising: a housing having a front surface, a back surface and side surfaces; electrical components provided at least partially within the housing, the electrical components including at least a controller, a memory, and a display device, the display device being provided at or adjacent the front surface of the housing; and a cover substrate disposed over the display device, wherein at least one of a portion of the housing or the cover substrate comprises the article of any one of Embodiments 1-10, wherein the display device emits up-down, linearly polarized light.

Embodiment 12. An article for a display device, comprising: a translucent substrate comprising opposing major surfaces; and an optical film structure disposed on a first major surface of the substrate, the optical film structure comprising an outer surface opposing the first major surface and a plurality of periods such that each period comprises an alternating low refractive index layer and high refractive index layer, wherein each high refractive index layer has a refractive index of greater than 1.9 and each low refractive index layer has a refractive index of less than 1.7, wherein the article exhibits a hardness of 10 GPa or greater measured at an indentation depth of about 100 nm, the hardness measured by a Berkovich Indenter Hardness Test, wherein the article exhibits a single side average photopic light reflectance of at least 50% of non-polarized light as measured at the outer surface from near-normal incidence to an incident angle of 60 degrees over a plurality of portions of the visible spectrum from 400 nm to 700 nm, wherein each portion is at least 10 nm in width, wherein the article further exhibits a single side average photopic reflectance of greater than 30% of s-polarized light emitted from the display device at incident angles from 40 degrees to 60 degrees over a plurality of portions of the visible spectrum from 400 nm to 700 nm, wherein each portion is at least 10 nm in width, wherein the plurality of periods is at least ten (10) periods, and further wherein each low refractive index layer comprises $SiO_2$ or doped-$SiO_2$ and each high refractive index layer comprises $AlO_xN_y$, $SiO_xN_y$, $Si_uAl_vO_xN_y$, $SiN_x$ or $ZrO_2$.

Embodiment 13. The article according to Embodiment 12, wherein the article exhibits a single side average photopic light reflectance of at least 70% of non-polarized light as measured at the outer surface from near-normal incidence to an incident angle of 60 degrees over a plurality of portions of the visible spectrum from 400 nm to 700 nm, each portion at least 10 nm in width.

Embodiment 14. The article according to Embodiment 12 or Embodiment 13, wherein the article further exhibits a single side average photopic reflectance of greater than 50% of s-polarized light emitted from the display device at incident angles from 40 degrees to 60 degrees over a plurality of portions of the visible spectrum from 400 nm to 700 nm, each portion at least 10 nm in width.

Embodiment 15. The article according to Embodiment 12 or Embodiment 13, wherein the article further exhibits a single side average photopic reflectance of greater than 75% of s-polarized light emitted from the display device at incident angles from 40 degrees to 60 degrees over a plurality of portions of the visible spectrum from 400 nm to 700 nm, each portion at least 10 nm in width.

Embodiment 16. The article according to Embodiment 12 or Embodiment 13, wherein the article further exhibits a single side average photopic reflectance of greater than 90% of s-polarized light emitted from the display device at incident angles from 40 degrees to 60 degrees over a plurality of portions of the visible spectrum from 400 nm to 700 nm, each portion at least 10 nm in width.

Embodiment 17. The article according to any one of Embodiments 12-16, wherein the article further exhibits a single side average photopic transmittance of less than 20% of s-polarized light emitted from the display device at incident angles from 40 degrees to 60 degrees over a plurality of portions of the visible spectrum from 400 nm to 700 nm, each portion at least 10 nm in width.

Embodiment 18. The article according to any one of Embodiments 12-17, wherein the article exhibits a hardness of 14 GPa or greater measured at an indentation depth of about 100 nm, the hardness measured by a Berkovich Indenter Hardness Test.

Embodiment 19. The article according to any one of Embodiments 12-18, wherein the article further exhibits reflectance color coordinates at the outer surface from 0 degrees to 90 degrees in the (L*, a*, b*) colorimetry system such that $-10<a*<+15$ and $-30<b*<+20$.

Embodiment 20. The article according to any one of Embodiments 12-19, wherein the article further exhibits a single side average photopic reflectance of greater than 90% of s-polarized light emitted from the display device at incident angles from 40 degrees to 60 degrees over each of the wavelength ranges from 440 nm to 470 nm, from 520 nm to 545 nm and from 610 nm to 645 nm.

Embodiment 21. The article according to any one of Embodiments 12-20, wherein the article further exhibits a single side average photopic reflectance of greater than 60% of non-polarized light at incident angles from 40 degrees to 60 degrees over each of the wavelength ranges from 440 nm to 470 nm, from 520 nm to 545 nm and from 610 nm to 645 nm.

Embodiment 22. The article according to any one of Embodiments 12-21, wherein the optical film structure comprises a physical thickness from 3000 nm to 7500 nm, and further wherein the plurality of periods is from fifteen (15) periods to fifty (50) periods.

Embodiment 23. The article according to any one of Embodiments 12-22, wherein the optical film structure comprises a scratch resistant layer of $AlO_xN_y$, $SiO_xN_y$, or $SiN_x$ having a physical thickness from 1500 nm to 3000 nm.

Embodiment 24. A consumer electronic product, comprising: a housing having a front surface, a back surface and side surfaces; electrical components provided at least partially within the housing, the electrical components including at least a controller, a memory, and a display device, the display device being provided at or adjacent the front surface of the housing; and a cover substrate disposed over the display device, wherein at least one of a portion of the housing or the cover substrate comprises the article of any one of Embodiments 12-23, wherein the display device emits up-down, linearly polarized light.

Embodiment 25. An article for a display device, comprising: a translucent substrate comprising opposing major surfaces; and an optical film structure disposed on a first major surface of the substrate, the optical film structure comprising an outer surface opposing the first major surface and a plurality of periods such that each period comprises an alternating low refractive index layer and high refractive index layer, wherein each high refractive index layer has a refractive index of greater than 1.9 and each low refractive index layer has a refractive index of less than 1.7, wherein the article exhibits a hardness of 10 GPa or greater measured at an indentation depth of about 100 nm, the hardness measured by a Berkovich Indenter Hardness Test, wherein the article exhibits a single side average photopic light reflectance of greater than 12% of non-polarized light as measured at the outer surface from near-normal incidence to an incident angle of 90 degrees over the visible spectrum from 400 nm to 700 nm, wherein the article further exhibits a single side average photopic transmittance of greater than 80% of p-polarized light emitted from the display device at incident angles from 0 degrees to 90 degrees over the visible spectrum from 400 nm to 700 nm, wherein the plurality of periods is at least three (3) periods, and further wherein each low refractive index layer comprises $SiO_2$ or doped-$SiO_2$ and each high refractive index layer comprises $AlO_xN_y$, $SiO_xN_y$, $Si_uAl_vO_xN_y$, $SiN_x$ or $ZrO_2$.

Embodiment 26. The article according to Embodiment 25, wherein the article further exhibits reflectance color coordinates at the outer surface from 0 degrees to 90 degrees in the (L*, a*, b*) colorimetry system such that $-4<a*$ and $b*<+4$.

Embodiment 27. The article according to Embodiment 25 or Embodiment 26, wherein the article further exhibits a single side average photopic light reflectance of greater than 17% of non-polarized light as measured at the outer surface from near-normal incidence to an incident angle of 90 degrees over the visible spectrum from 400 nm to 700 nm.

Embodiment 28. The article according to any one of Embodiments 25-27, wherein the article further exhibits a single side average photopic transmittance of greater than 85% of p-polarized light emitted from the display device at incident angles from 0 degrees to 90 degrees over the visible spectrum from 400 nm to 700 nm.

Embodiment 29. The article according to any one of Embodiments 25-27, wherein the article further exhibits a single side average photopic transmittance of greater than 90% of p-polarized light emitted from the display device at incident angles from 50 degrees to 90 degrees over the visible spectrum from 400 nm to 700 nm.

Embodiment 30. The article according to any one of Embodiments 25-29, wherein the article exhibits a hardness of 14 GPa or greater measured at an indentation depth of about 100 nm, the hardness measured by a Berkovich Indenter Hardness Test.

Embodiment 31. The article according to any one of Embodiments 25-30, wherein the optical film structure comprises a physical thickness from 1500 nm to 5000 nm, and further wherein the plurality of periods is from five (5) periods to fifteen (15) periods.

Embodiment 32. The article according to any one of Embodiments 25-31, wherein the optical film structure comprises a scratch resistant layer of $AlO_xN_y$, $SiO_xN_y$ or $SiN_x$ having a physical thickness from 1500 nm to 3000 nm.

Embodiment 33. A consumer electronic product, comprising: a housing having a front surface, a back surface and side surfaces; electrical components provided at least partially within the housing, the electrical components including at least a controller, a memory, and a display device, the display device being provided at or adjacent the front surface of the housing; and a cover substrate disposed over the display device, wherein at least one of a portion of the housing or the cover substrate comprises the article of any one of Embodiments 25-32, wherein the display device emits left-right, linearly polarized light.

Embodiment 34. An article for a display device, comprising: a translucent substrate comprising opposing major surfaces; and an optical film structure disposed on a first major surface of the substrate, the optical film structure comprising an outer surface opposing the first major surface and a plurality of periods such that each period comprises an alternating low refractive index layer and high refractive index layer, wherein each high refractive index layer has a refractive index of greater than 1.9 and each low refractive index layer has a refractive index of less than 1.7, wherein the article exhibits a hardness of 10 GPa or greater measured at an indentation depth of about 100 nm, the hardness measured by a Berkovich Indenter Hardness Test, wherein the article exhibits a single side average photopic light reflectance of greater than 20% of non-polarized light as measured at the outer surface from near-normal incidence to an incident angle of 90 degrees over the visible spectrum from 400 nm to 700 nm, wherein the article further exhibits a single side average photopic transmittance of greater than 50% of p-polarized light emitted from the display device at incident angles from 0 degrees to 90 degrees over the visible spectrum from 400 nm to 700 nm, wherein the plurality of periods is at least five (5) periods, and further wherein each low refractive index layer comprises $SiO_2$ or doped-$SiO_2$ and each high refractive index layer comprises $AlO_xN_y$, $SiO_xN_y$, $Si_uAl_vO_xN_y$, $SiN_x$ or $ZrO_2$.

Embodiment 35. The article according to Embodiment 34, wherein the article further exhibits reflectance color coordinates at the outer surface from 0 degrees to 90 degrees in the (L*, a*, b*) colorimetry system such that $-3<a*<+3$ and $-4<b*<+4$.

Embodiment 36. The article according to Embodiment 34 or Embodiment 35, wherein the article further exhibits a single side average photopic transmittance of greater than 70% of p-polarized light emitted from the display device at incident angles from 0 degrees to 90 degrees over the visible spectrum from 400 nm to 700 nm.

Embodiment 37. The article according to any one of Embodiments 34-36, wherein the article exhibits a hardness of 14 GPa or greater measured at an indentation depth of about 100 nm, the hardness measured by a Berkovich Indenter Hardness Test.

Embodiment 38. The article according to any one of Embodiments 34-37, wherein the optical film structure comprises a physical thickness from 3000 nm to 7500 nm, and further wherein the plurality of periods is from five (5) periods to twenty (20) periods.

Embodiment 39. The article according to any one of Embodiments 34-38, wherein the optical film structure comprises a scratch resistant layer of $AlO_xN_y$, $SiO_xN_y$ or $SiN_x$ having a physical thickness from 1500 nm to 3000 nm.

Embodiment 40. A consumer electronic product, comprising: a housing having a front surface, a back surface and side surfaces; electrical components provided at least partially within the housing, the electrical components including at least a controller, a memory, and a display device, the display device being provided at or adjacent the front surface of the housing; and a cover substrate disposed over the display device, wherein at least one of a portion of the housing or the cover substrate comprises the article of any one of Embodiments 34-39, wherein the display device emits left-right, linearly polarized light.

What is claimed is:

1. An article for a display device, comprising:
a translucent substrate comprising opposing major surfaces; and
an optical film structure disposed on a first major surface of the translucent substrate, the optical film structure comprising an outer surface opposing the first major surface and a plurality of periods such that each period comprises an alternating low refractive index layer and high refractive index layer,
wherein each high refractive index layer has a refractive index of greater than 1.9 and each low refractive index layer has a refractive index of less than 1.7,
wherein the article exhibits a hardness of 10 GPa or greater measured from the outer surface of the optical film structure along an indentation depth of about 100 nm, the hardness measured by a Berkovich Indenter Hardness Test,
wherein the article exhibits a single side average photopic light reflectance of at least 50% of non-polarized light as measured at the outer surface from near-normal incidence to an incident angle of 60 degrees over a portion of at least 10 nm within the visible spectrum from 400 nm to 700 nm,
wherein the article further exhibits a single side average photopic reflectance of greater than 30% of s-polarized light emitted from the display device at incident angles from 40 degrees to 60 degrees over a portion of at least 10 nm within the visible spectrum from 400 nm to 700 nm,
wherein the plurality of periods is at least five (5) periods, and
further wherein each low refractive index layer comprises $SiO_2$ or doped-$SiO_2$ and each high refractive index layer comprises $AlO_xN_y$, $SiO_xN_y$, $Si_uAl_vO_xN_y$, $SiN_x$ or $ZrO_2$.

2. The article according to claim 1, wherein the article exhibits a single side average photopic light reflectance of at least 70% of non-polarized light as measured at the outer surface from near-normal incidence to an incident angle of 60 degrees over a portion of at least 10 nm within the visible spectrum from 400 nm to 700 nm.

3. The article according to claim 1, wherein the article further exhibits a single side average photopic reflectance of greater than 50% of s-polarized light emitted from the display device at incident angles from 40 degrees to 60 degrees over a portion of at least 10 nm within the visible spectrum from 400 nm to 700 nm.

4. The article according to claim 1, wherein the article further exhibits a single side average photopic reflectance of greater than 75% of s-polarized light emitted from the display device at incident angles from 40 degrees to 60 degrees over a portion of at least 10 nm within the visible spectrum from 400 nm to 700 nm.

5. The article according to claim 1, wherein the article further exhibits a single side average photopic reflectance of greater than 90% of s-polarized light emitted from the display device at incident angles from 40 degrees to 60 degrees over a portion of at least 10 nm within the visible spectrum from 400 nm to 700 nm.

6. The article according to claim 1, wherein the article further exhibits a single side average photopic transmittance of less than 20% of s-polarized light emitted from the display device at incident angles from 40 degrees to 60 degrees over a portion of at least 10 nm within the visible spectrum from 400 nm to 700 nm.

7. The article according to claim 1, wherein the optical film structure comprises a physical thickness from 1000 nm to 5000 nm, and further wherein the plurality of periods is from ten (10) periods to fifteen (15) periods.

8. The article according to claim 1, wherein the optical film structure comprises a scratch resistant layer of $AlO_xN_y$, $SiO_xN_y$, or $SiN_x$ having a physical thickness from 1500 nm to 3000 nm.

9. A consumer electronic product, comprising:
a housing having a front surface, a back surface and side surfaces;
electrical components provided at least partially within the housing, the electrical components including at least a controller, a memory, and a display device, the display device being provided at or adjacent the front surface of the housing; and
a cover substrate disposed over the display device, wherein at least one of a portion of the housing or the cover substrate comprises the article of claim 1,
wherein the display device emits up-down, linearly polarized light.

10. An article for a display device, comprising:
a translucent substrate comprising opposing major surfaces; and
an optical film structure disposed on a first major surface of the translucent substrate, the optical film structure comprising an outer surface opposing the first major surface and a plurality of periods such that each period comprises an alternating low refractive index layer and high refractive index layer,
wherein each high refractive index layer has a refractive index of greater than 1.9 and each low refractive index layer has a refractive index of less than 1.7,
wherein the article exhibits a hardness of 10 GPa or greater measured from the outer surface of the optical film structure along an indentation depth of about 100 nm, the hardness measured by a Berkovich Indenter Hardness Test,
wherein the article exhibits a single side average photopic light reflectance of at least 50% of non-polarized light as measured at the outer surface from near-normal incidence to an incident angle of 60 degrees over a plurality of portions of the visible spectrum from 400 nm to 700 nm, wherein each portion is at least 10 nm in width,
wherein the article further exhibits a single side average photopic reflectance of greater than 30% of s-polarized light emitted from the display device at incident angles from 40 degrees to 60 degrees over a plurality of portions of the visible spectrum from 400 nm to 700 nm, wherein each portion is at least 10 nm in width,
wherein the plurality of periods is at least ten (10) periods, and
further wherein each low refractive index layer comprises $SiO_2$ or doped-$SiO_2$ and each high refractive index layer comprises $AlO_xN_y$, $SiO_xN_y$, $Si_uAl_vO_xN_y$, $SiN_x$ or $ZrO_2$.

11. The article according to claim 10, wherein the article exhibits a single side average photopic light reflectance of at least 70% of non-polarized light as measured at the outer surface from near-normal incidence to an incident angle of 60 degrees over a plurality of portions of the visible spectrum from 400 nm to 700 nm, each portion at least 10 nm in width.

12. The article according to claim 10, wherein the article further exhibits a single side average photopic reflectance of greater than 50% of s-polarized light emitted from the display device at incident angles from 40 degrees to 60 degrees over a plurality of portions of the visible spectrum from 400 nm to 700 nm, each portion at least 10 nm in width.

13. The article according to claim 10, wherein the article further exhibits a single side average photopic reflectance of greater than 75% of s-polarized light emitted from the display device at incident angles from 40 degrees to 60 degrees over a plurality of portions of the visible spectrum from 400 nm to 700 nm, each portion at least 10 nm in width.

14. The article according to claim 10, wherein the article further exhibits a single side average photopic reflectance of greater than 90% of s-polarized light emitted from the display device at incident angles from 40 degrees to 60 degrees over a plurality of portions of the visible spectrum from 400 nm to 700 nm, each portion at least 10 nm in width.

15. The article according to claim 10, wherein the article further exhibits a single side average photopic transmittance of less than 20% of s-polarized light emitted from the display device at incident angles from 40 degrees to 60 degrees over a plurality of portions of the visible spectrum from 400 nm to 700 nm, each portion at least 10 nm in width.

16. The article according to claim 10, wherein the article further exhibits a single side average photopic reflectance of greater than 90% of s-polarized light emitted from the display device at incident angles from 40 degrees to 60 degrees over each of the wavelength ranges from 440 nm to 470 nm, from 520 nm to 545 nm and from 610 nm to 645 nm.

17. The article according to claim 10, wherein the article further exhibits a single side average photopic reflectance of greater than 60% of non-polarized light at incident angles from 40 degrees to 60 degrees over each of the wavelength ranges from 440 nm to 470 nm, from 520 nm to 545 nm and from 610 nm to 645 nm.

18. The article according to claim 10, wherein the optical film structure comprises a physical thickness from 3000 nm to 7500 nm, and further wherein the plurality of periods is from fifteen (15) periods to fifty (50) periods.

19. The article according to claim 10, wherein the optical film structure comprises a scratch resistant layer of $AlO_xN_y$, $SiO_xN_y$, or $SiN_x$ having a physical thickness from 1500 nm to 3000 nm.

20. A consumer electronic product, comprising:
a housing having a front surface, a back surface and side surfaces;
electrical components provided at least partially within the housing, the electrical components including at least a controller, a memory, and a display device, the display device being provided at or adjacent the front surface of the housing; and
a cover substrate disposed over the display device, wherein at least one of a portion of the housing or the cover substrate comprises the article of claim 10,
wherein the display device emits up-down, linearly polarized light.

* * * * *

UNITED STATES PATENT AND TRADEMARK OFFICE
CERTIFICATE OF CORRECTION

PATENT NO. : 11,378,719 B2  
APPLICATION NO. : 17/004562  
DATED : July 5, 2022  
INVENTOR(S) : Jaymin Amin et al.

Page 1 of 1

It is certified that error appears in the above-identified patent and that said Letters Patent is hereby corrected as shown below:

On the Title Page

Item (73), in Column 1, in "Assignee", Line 1, delete "Incorprated," and insert -- Incorporated, --.

Signed and Sealed this  
Eighth Day of August, 2023

Katherine Kelly Vidal  
*Director of the United States Patent and Trademark Office*